US010036900B2

(12) United States Patent
de Juan, Jr. et al.

(10) Patent No.: US 10,036,900 B2
(45) Date of Patent: *Jul. 31, 2018

(54) BIMODULAR CONTACT LENSES

(71) Applicant: NexisVision, Inc., Menlo Park, CA (US)

(72) Inventors: Eugene de Juan, Jr., San Francisco, CA (US); Cary J. Reich, Los Gatos, CA (US); Yair Alster, Palo Alto, CA (US); Matt Clarke, Mountain View, CA (US); Kuangmon Ashley Tuan, Mountain View, CA (US); Brian Levy, New York, NY (US); Raymond Lum, El Cerrito, CA (US); Jose D. Alejandro, Sunnyvale, CA (US)

(73) Assignee: NexisVision, Inc., Menlo Park, CA (US)

(*) Notice: Subject to any disclaimer, the term of this patent is extended or adjusted under 35 U.S.C. 154(b) by 3 days.

This patent is subject to a terminal disclaimer.

(21) Appl. No.: 15/253,183

(22) Filed: Aug. 31, 2016

(65) Prior Publication Data
US 2016/0370603 A1 Dec. 22, 2016

Related U.S. Application Data

(63) Continuation of application No. 14/532,707, filed on Nov. 4, 2014, now Pat. No. 9,465,233, which is a (Continued)

(51) Int. Cl.
G02C 7/00 (2006.01)
G02C 7/02 (2006.01)
(Continued)

(52) U.S. Cl.
CPC ............ G02C 7/047 (2013.01); G02C 7/049 (2013.01)

(58) Field of Classification Search
CPC .................................. G02C 7/04; G02B 3/14
(Continued)

(56) References Cited

U.S. PATENT DOCUMENTS 2,641,161 A 6/1953 Silverstein
3,246,941 A 4/1966 Moss
(Continued)

FOREIGN PATENT DOCUMENTS

CA 993401 A1 7/1976
CA 2174967 C 5/1995
(Continued)

OTHER PUBLICATIONS

Alio, Jorge L. et al. "Contact lens fitting to correct irregular astigmatism after corneal refractive surgery," Journal of Cataract & Refractive Surgery, vol. 28, No. 10, pp. 1750-1757, Oct. 2002.
(Continued)

Primary Examiner — James Greece

(57) ABSTRACT

Ophthalmic lenses for correcting refractive error of an eye are disclosed. Ophthalmic lenses include an inner optic portion configured to be disposed over the optical region of the cornea and having a central portion disposed between an anterior portion and a posterior portion. The inner optic portions configured to at least partially diverge from the shape of the cornea to provide at least one lenticular volume between a posterior surface of the inner optic portion and the cornea. The central portion may be characterized by a thickness from 50 μm to 900 μm and a modulus form 20 MPa to 1500 MPa.

21 Claims, 43 Drawing Sheets

Related U.S. Application Data continuation-in-part of application No. 13/865,780, filed on Apr. 18, 2013, now Pat. No. 9,423,632.

(60) Provisional application No. 61/900,947, filed on Nov. 6, 2013, provisional application No. 61/636,404, filed on Apr. 20, 2012.

(51) Int. Cl.
*G02C 7/06* (2006.01)
*G02C 7/04* (2006.01)

(58) Field of Classification Search
USPC .......... 351/159.01, 159.04, 159.02, 159.18, 351/159.23
See application file for complete search history.

(56) References Cited

U.S. PATENT DOCUMENTS

| | | |
|---|---|---|
| 3,488,111 A | 1/1970 | Isen |
| 3,489,491 A | 1/1970 | Creighton |
| 3,495,899 A | 2/1970 | Biri |
| 3,594,074 A | 7/1971 | Rosen |
| 3,619,044 A | 11/1971 | Kamath |
| 3,688,386 A | 9/1972 | Pereira |
| 3,833,786 A | 9/1974 | Brucker |
| 3,915,609 A | 10/1975 | Robinson |
| 3,944,347 A | 3/1976 | Barkdoll et al. |
| 3,973,837 A | 8/1976 | Page |
| 3,973,838 A | 8/1976 | Deichert et al. |
| 4,037,866 A | 7/1977 | Price |
| 4,053,442 A | 10/1977 | Jungr et al. |
| 4,068,933 A | 1/1978 | Seiderman |
| 4,071,272 A | 1/1978 | Drdlik |
| 4,121,885 A | 10/1978 | Erickson et al. |
| 4,166,255 A | 8/1979 | Graham |
| 4,171,878 A | 10/1979 | Kivaev et al. |
| 4,194,815 A | 3/1980 | Trombley |
| 4,200,320 A | 4/1980 | Durham |
| 4,208,362 A | 6/1980 | Deichert et al. |
| 4,211,476 A | 7/1980 | Brummel et al. |
| 4,268,133 A | 5/1981 | Fischer et al. |
| 4,312,575 A | 1/1982 | Peyman et al. |
| 4,381,007 A | 4/1983 | Doss |
| 4,487,905 A | 12/1984 | Mitchell |
| 4,593,981 A * | 6/1986 | Scilipoti ............... G02C 7/044 351/159.41 |
| 4,621,912 A | 11/1986 | Meyer |
| 4,640,594 A * | 2/1987 | Berger ................. G02C 7/04 351/159.04 |
| 4,666,249 A | 5/1987 | Bauman et al. |
| 4,666,267 A | 5/1987 | Wichterle |
| 4,701,288 A | 10/1987 | Cook et al. |
| 4,772,283 A | 9/1988 | White |
| 4,806,382 A | 2/1989 | Goldberg et al. |
| 4,810,082 A | 3/1989 | Abel, Jr. |
| 4,886,350 A | 12/1989 | Wichterle |
| 4,890,911 A | 1/1990 | Sulc et al. |
| 4,909,896 A | 3/1990 | Ikushima et al. |
| 4,940,751 A | 7/1990 | Frances et al. |
| 4,943,150 A | 7/1990 | Diechert et al. |
| 4,952,045 A | 8/1990 | Stoyan |
| 4,978,481 A | 12/1990 | Janssen et al. |
| 4,981,841 A | 1/1991 | Gibson |
| 4,997,583 A | 3/1991 | Itzhak |
| 5,008,289 A | 4/1991 | Bernstein |
| 5,073,021 A | 12/1991 | Marron |
| 5,104,213 A | 4/1992 | Wolfson |
| 5,143,660 A | 9/1992 | Hamilton et al. |
| 5,152,786 A | 10/1992 | Hanna |
| 5,159,360 A | 10/1992 | Stoy et al. |
| 5,166,710 A | 11/1992 | Hofer et al. |
| 5,191,365 A | 3/1993 | Stoyan |
| 5,213,720 A | 5/1993 | Civerchia |
| 5,236,236 A | 8/1993 | Girimont |
| 5,245,367 A | 9/1993 | Miller et al. |
| 5,246,259 A | 9/1993 | Hellenkamp et al. |
| 5,178,879 A | 11/1993 | Adekunle et al. |
| 5,293,186 A | 3/1994 | Seden et al. |
| 5,346,491 A | 9/1994 | Oertli |
| 5,347,326 A | 9/1994 | Volk |
| 5,349,395 A | 9/1994 | Stoyan |
| 5,397,848 A | 3/1995 | Yang et al. |
| 5,428,412 A | 6/1995 | Stoyan |
| 5,433,714 A | 7/1995 | Bloomberg |
| 5,433,898 A | 7/1995 | Thakrar et al. |
| 5,434,630 A | 7/1995 | Bransome |
| 5,472,436 A | 12/1995 | Fremstad |
| 5,496,084 A | 3/1996 | Miralles Medan |
| 5,517,260 A | 5/1996 | Glady et al. |
| 5,538,301 A | 7/1996 | Yavitz et al. |
| 5,570,144 A | 10/1996 | Lofgren-Nisser |
| 5,578,332 A | 11/1996 | Hamilton et al. |
| 5,598,233 A | 1/1997 | Haralambopoulos et al. |
| 5,612,432 A | 3/1997 | Taniguchi et al. |
| 5,628,794 A | 5/1997 | Lindstrom |
| 5,632,773 A | 5/1997 | Graham et al. |
| 5,649,922 A | 7/1997 | Yavitz |
| 5,662,706 A | 9/1997 | Legerton et al. |
| 5,671,038 A | 9/1997 | Porat |
| 5,712,721 A | 1/1998 | Large |
| 5,732,990 A | 3/1998 | Yavitz et al. |
| 5,757,458 A | 5/1998 | Miller et al. |
| 5,760,100 A | 6/1998 | Nicolson et al. |
| 5,760,870 A | 6/1998 | Payor et al. |
| 5,804,263 A | 9/1998 | Goldberg et al. |
| 5,820,624 A | 10/1998 | Yavitz |
| 5,854,291 A | 12/1998 | Laughlin et al. |
| 5,869,533 A | 2/1999 | Holt |
| 5,885,597 A | 3/1999 | Botknecht et al. |
| 5,905,561 A | 5/1999 | Lee et al. |
| 5,910,512 A | 6/1999 | Conant |
| 5,923,397 A | 7/1999 | Bonafini, Jr. |
| 5,929,968 A | 7/1999 | Cotie et al. |
| 5,953,098 A | 9/1999 | Lieberman et al. |
| 5,957,921 A | 9/1999 | Mirhashemi et al. |
| 5,962,532 A | 10/1999 | Campbell et al. |
| 5,971,541 A | 10/1999 | Danker et al. |
| 5,980,040 A | 11/1999 | Xu et al. |
| 5,986,001 A | 11/1999 | Ingenito et al. |
| 6,010,219 A | 1/2000 | Stoyan |
| 6,030,974 A | 2/2000 | Schwartz et al. |
| 6,036,314 A | 3/2000 | Wolfson et al. |
| 6,036,688 A | 3/2000 | Edwards |
| 6,048,855 A | 4/2000 | De Lacharriere et al. |
| 6,075,066 A | 6/2000 | Matsuda et al. |
| 6,092,898 A | 7/2000 | De Juan, Jr. |
| 6,099,121 A | 8/2000 | Chapman et al. |
| 6,217,171 B1 | 4/2001 | Auten et al. |
| 6,244,709 B1 | 6/2001 | Vayntraub et al. |
| 6,248,788 B1 | 6/2001 | Robbins et al. |
| 6,325,509 B1 | 12/2001 | Hodur et al. |
| 6,340,229 B1 | 1/2002 | Lieberman et al. |
| 6,361,169 B1 | 3/2002 | Tung |
| 6,364,482 B1 | 4/2002 | Roffman et al. |
| 6,406,145 B1 | 6/2002 | Jubin |
| 6,474,814 B1 | 11/2002 | Griffin |
| 6,520,637 B2 | 2/2003 | Hodur et al. |
| 6,541,028 B1 | 4/2003 | Kuri-Harcuch et al. |
| 6,551,307 B2 | 4/2003 | Peyman |
| 6,568,808 B2 | 5/2003 | Campin |
| 6,579,918 B1 | 6/2003 | Auten et al. |
| 6,593,370 B2 | 7/2003 | Tamura et al. |
| 6,652,095 B2 | 11/2003 | Tung |
| 6,659,607 B2 | 12/2003 | Miyamura et al. |
| 6,726,322 B2 | 4/2004 | Andino et al. |
| 6,726,684 B1 | 4/2004 | Woloszko et al. |
| 6,779,888 B2 | 8/2004 | Marmo |
| 6,843,563 B2 | 1/2005 | Richardson |
| 6,849,671 B2 | 2/2005 | Steffen et al. |
| 6,880,558 B2 | 4/2005 | Perez |
| 6,951,894 B1 | 10/2005 | Nicolson et al. |
| 7,018,039 B2 | 3/2006 | Legerton et al. |

(56) References Cited

U.S. PATENT DOCUMENTS

| | | |
|---|---|---|
| 7,025,455 B2 | 4/2006 | Roffman |
| 7,080,905 B2 | 7/2006 | Marmo et al. |
| 7,097,301 B2 | 8/2006 | Legerton et al. |
| 7,104,648 B2 | 9/2006 | Dahi et al. |
| 7,150,529 B2 | 12/2006 | Legerton et al. |
| 7,163,292 B2 | 1/2007 | Dahi et al. |
| 7,193,124 B2 | 3/2007 | Coffee |
| 7,216,974 B2 | 5/2007 | Meyers et al. |
| 7,249,849 B2 | 7/2007 | Marmo et al. |
| 7,270,412 B2 | 9/2007 | Legerton et al. |
| 7,322,694 B2 | 1/2008 | Dahi et al. |
| 7,329,001 B2 | 2/2008 | Benrashid et al. |
| 7,338,160 B2 | 3/2008 | Lieberman et al. |
| 7,360,890 B2 | 4/2008 | Back |
| 7,377,637 B2 | 5/2008 | Legerton et al. |
| 7,401,922 B2 | 7/2008 | Legerton |
| 7,404,638 B2 | 7/2008 | Miller et al. |
| 7,461,937 B2 | 12/2008 | Steffen et al. |
| 7,491,350 B2 | 2/2009 | Silvestrini |
| 7,530,689 B2 | 5/2009 | Berke |
| 7,537,339 B2 | 5/2009 | Legerton et al. |
| 7,543,936 B2 | 6/2009 | Legerton et al. |
| 7,559,649 B2 | 7/2009 | Cotie et al. |
| 7,585,074 B2 | 9/2009 | Dahi et al. |
| 7,594,725 B2 | 9/2009 | Legerton et al. |
| 7,628,810 B2 | 12/2009 | Christie et al. |
| 7,682,020 B2 | 3/2010 | Berke |
| 7,695,135 B1 | 4/2010 | Rosenthal |
| 7,699,465 B2 | 4/2010 | Dootjes et al. |
| 7,717,555 B2 | 5/2010 | Legerton et al. |
| 7,735,997 B2 | 6/2010 | Muckenhirn |
| 7,748,844 B2 | 7/2010 | Lai |
| 7,762,668 B2 | 7/2010 | Dai et al. |
| 7,828,432 B2 | 11/2010 | Meyers et al. |
| 7,859,769 B2 | 12/2010 | Zalevsky |
| 7,976,577 B2 | 7/2011 | Silvestrini |
| 7,984,988 B2 | 7/2011 | Berke |
| 8,137,344 B2 | 3/2012 | Jia et al. |
| 8,201,941 B2 | 6/2012 | Choo et al. |
| 8,459,793 B2 | 6/2013 | De Juan, Jr. et al. |
| 8,485,662 B2 | 7/2013 | Collins et al. |
| 8,591,025 B1 | 11/2013 | de Juan, Jr. |
| 8,678,584 B2 | 3/2014 | de Juan |
| 9,107,773 B2 | 8/2015 | de Juan, Jr. |
| 9,395,558 B2 | 7/2016 | de Juan, Jr. |
| 2002/0095199 A1 | 7/2002 | West, Jr. et al. |
| 2002/0164484 A1 | 11/2002 | Jiang et al. |
| 2004/0015163 A1 | 1/2004 | Buysse |
| 2004/0088050 A1 | 5/2004 | Norrby et al. |
| 2004/0141150 A1 | 7/2004 | Roffman et al. |
| 2004/0170666 A1 | 9/2004 | Keats et al. |
| 2004/0184158 A1 | 9/2004 | Shadduck |
| 2004/0212779 A1 | 10/2004 | Dahi et al. |
| 2005/0033420 A1 | 2/2005 | Christie et al. |
| 2005/0107775 A1 | 5/2005 | Huang et al. |
| 2005/0213030 A1 | 9/2005 | Meyers et al. |
| 2005/0259221 A1 | 11/2005 | Marmo |
| 2005/0288196 A1 | 12/2005 | Horn |
| 2006/0077581 A1 | 4/2006 | Schwiegerling |
| 2006/0083773 A1 | 4/2006 | Myung |
| 2006/0100617 A1 | 5/2006 | Boukhny |
| 2006/0132707 A1 | 6/2006 | Tung |
| 2006/0152673 A1 | 7/2006 | Cotie et al. |
| 2006/0197909 A1 | 9/2006 | Legerton |
| 2006/0197910 A1 | 9/2006 | Legerton |
| 2006/0235514 A1 | 10/2006 | Silvestrini |
| 2006/0238712 A1 | 10/2006 | Dahi |
| 2006/0241751 A1 | 10/2006 | Marmo |
| 2006/0250576 A1 | 11/2006 | Legerton et al. |
| 2006/0256283 A1 | 11/2006 | Legerton |
| 2006/0256284 A1 | 11/2006 | Dahi |
| 2006/0285071 A1 | 12/2006 | Erickson et al. |
| 2006/0285072 A1 | 12/2006 | Dahi et al. |
| 2006/0290882 A1 | 12/2006 | Meyers et al. |
| 2007/0013869 A1 | 1/2007 | Dahi |
| 2007/0014760 A1 | 1/2007 | Peyman |
| 2007/0037898 A1 | 2/2007 | Phelan et al. |
| 2007/0046894 A1 | 3/2007 | Muckenhirn |
| 2007/0106394 A1 | 5/2007 | Chen |
| 2007/0129720 A1 | 6/2007 | Demarias et al. |
| 2007/0132948 A1 | 6/2007 | Evans |
| 2007/0135915 A1 | 6/2007 | Klima |
| 2007/0182920 A1 | 8/2007 | Back et al. |
| 2007/0232755 A1 | 10/2007 | Matsushita et al. |
| 2007/0242216 A1 | 10/2007 | Dootjes et al. |
| 2007/0244559 A1 | 10/2007 | Shiuey |
| 2007/0273834 A1 | 11/2007 | Legerton |
| 2008/0039832 A1 | 2/2008 | Palanker et al. |
| 2008/0074611 A1 | 3/2008 | Meyers et al. |
| 2008/0100796 A1 | 5/2008 | Pruitt et al. |
| 2008/0243156 A1 | 10/2008 | John |
| 2008/0287915 A1 | 11/2008 | Rosenthal et al. |
| 2008/0291391 A1 | 11/2008 | Meyers et al. |
| 2009/0033864 A1 | 2/2009 | Shone et al. |
| 2009/0096987 A1 | 4/2009 | Lai et al. |
| 2009/0237612 A1 | 9/2009 | Cotie et al. |
| 2009/0244477 A1 | 10/2009 | Pugh et al. |
| 2009/0303434 A1 | 12/2009 | Tung |
| 2009/0303442 A1 | 12/2009 | Choo et al. |
| 2010/0036488 A1 | 2/2010 | De Juan, Jr. et al. |
| 2010/0060849 A1 | 3/2010 | Hibino |
| 2010/0128224 A1 | 5/2010 | Legerton |
| 2010/0157250 A1 | 6/2010 | Berke |
| 2010/0208196 A1 | 8/2010 | Benrashid et al. |
| 2010/0271589 A1 | 10/2010 | Legerton et al. |
| 2011/0034854 A1 | 2/2011 | Neuberger et al. |
| 2011/0071631 A1 | 3/2011 | Rosenthal |
| 2011/0208300 A1 | 8/2011 | De Juan, Jr. et al. |
| 2012/0105804 A1 | 5/2012 | Legerton |
| 2012/0113386 A1 | 5/2012 | Back |
| 2012/0169994 A1 | 7/2012 | Matsushita et al. |
| 2012/0310133 A1 | 12/2012 | De Juan, Jr. et al. |
| 2012/0327362 A1 | 12/2012 | Doraiswamy et al. |
| 2013/0025606 A1 | 1/2013 | De Juan, Jr. et al. |
| 2013/0066283 A1 | 3/2013 | De Juan, Jr. et al. |
| 2013/0070200 A1 | 3/2013 | De Juan, Jr. et al. |
| 2013/0077044 A1 | 3/2013 | De Juan, Jr. et al. |
| 2013/0201442 A1 | 8/2013 | Back |
| 2013/0201443 A1 | 8/2013 | Back et al. |
| 2013/0201454 A1 | 8/2013 | Back |
| 2013/0208236 A1 | 8/2013 | McCabe et al. |
| 2013/0208237 A1 | 8/2013 | Hawke et al. |
| 2013/0222761 A1 | 8/2013 | Hansen et al. |
| 2013/0242255 A1 | 9/2013 | Caldarise et al. |
| 2013/0258276 A1 | 10/2013 | Hansen et al. |
| 2013/0278890 A1 | 10/2013 | de Juan et al. |
| 2013/0293832 A1 | 11/2013 | de Juan et al. |
| 2014/0028979 A1 | 1/2014 | de Juan et al. |
| 2014/0043588 A1* | 2/2014 | Grant .............. G02C 7/047 351/247 |
| 2014/0069438 A1 | 3/2014 | de Juan et al. |
| 2014/0069439 A1 | 3/2014 | de Juan et al. |
| 2014/0155800 A1 | 6/2014 | de Juan et al. |
| 2014/0251347 A1 | 9/2014 | de Juan et al. |
| 2014/0362338 A1 | 12/2014 | de Juan et al. |
| 2015/0055081 A1 | 2/2015 | de Juan et al. |
| 2015/0077701 A1 | 3/2015 | de Juan et al. |
| 2016/0067109 A1 | 3/2016 | de Juan et al. |
| 2016/0170233 A1 | 6/2016 | De Juan et al. |
| 2016/0223835 A1 | 8/2016 | de Juan et al. |
| 2016/0334640 A1 | 11/2016 | de Juan et al. |
| 2017/0023800 A1 | 1/2017 | De Juan, Jr. et al. |
| 2017/0131566 A1 | 5/2017 | De Juan, Jr. et al. |
| 2017/0315380 A1 | 11/2017 | De Juan, Jr. et al. |
| 2017/0315381 A1 | 11/2017 | De Juan, Jr. et al. |

FOREIGN PATENT DOCUMENTS

| | | |
|---|---|---|
| DE | 3143839 A1 | 5/1983 |
| EP | 0042679 A2 | 12/1981 |
| EP | 0434205 A2 | 6/1991 |
| EP | 0574352 A1 | 12/1993 |
| EP | 0590772 | 4/1994 |
| EP | 0378512 A3 | 2/1995 |

(56) References Cited

FOREIGN PATENT DOCUMENTS

| | | |
|---|---|---|
| EP | 0378512 B1 | 2/1995 |
| EP | 0683416 A1 | 11/1995 |
| EP | 0985157 B1 | 12/1998 |
| EP | 1496388 B1 | 1/2005 |
| EP | 1664907 A1 | 6/2006 |
| FR | 2330025 A1 | 5/1977 |
| GB | 2107895 A | 5/1983 |
| JP | 52-78453 B2 | 7/1977 |
| JP | S55101125 U | 7/1980 |
| JP | S5727456 Y2 | 6/1982 |
| JP | S5727457 Y2 | 6/1982 |
| JP | 59-43931 | 3/1984 |
| JP | 2661909 B2 | 10/1997 |
| JP | H11151263 A | 6/1999 |
| JP | H11249048 A | 9/1999 |
| JP | 2003-107411 A | 4/2003 |
| JP | 2004504105 A | 2/2004 |
| JP | 2004-510199 A | 4/2004 |
| JP | 2009-098457 | 5/2009 |
| WO | 199014083 A1 | 11/1990 |
| WO | 199207617 A1 | 5/1992 |
| WO | 199307840 A1 | 4/1993 |
| WO | 199405225 A1 | 3/1994 |
| WO | 94/29756 A1 | 12/1994 |
| WO | 199513764 A1 | 5/1995 |
| WO | 199515134 A1 | 6/1995 |
| WO | 199627816 A1 | 9/1996 |
| WO | 199719381 A1 | 5/1997 |
| WO | 199803267 A1 | 1/1998 |
| WO | 199854603 A1 | 12/1998 |
| WO | 199930560 A1 | 6/1999 |
| WO | 199943354 A2 | 9/1999 |
| WO | 199943354 A3 | 9/1999 |
| WO | 199946631 A1 | 9/1999 |
| WO | 200009042 A1 | 2/2000 |
| WO | 200168082 A1 | 9/2001 |
| WO | 200206883 A2 | 1/2002 |
| WO | 200210841 A1 | 2/2002 |
| WO | 2002068008 A1 | 9/2002 |
| WO | 2003097759 A1 | 11/2003 |
| WO | 2004068196 A1 | 8/2004 |
| WO | 2004097502 A1 | 11/2004 |
| WO | 2004109368 A2 | 12/2004 |
| WO | 2005079290 A2 | 9/2005 |
| WO | 2005116729 A2 | 12/2005 |
| WO | 2006026666 A2 | 3/2006 |
| WO | 2006026666 A3 | 3/2006 |
| WO | 2006121591 A1 | 11/2006 |
| WO | 2006134649 A1 | 12/2006 |
| WO | 2007002231 A1 | 1/2007 |
| WO | 2007044513 A1 | 4/2007 |
| WO | 2007053297 A2 | 5/2007 |
| WO | 2007053297 A3 | 5/2007 |
| WO | 2009065061 A1 | 5/2009 |
| WO | 2009073213 A1 | 6/2009 |
| WO | 2006113149 A2 | 10/2009 |
| WO | 2006113149 A3 | 10/2009 |
| WO | 2009145842 A2 | 12/2009 |
| WO | 2010051172 A1 | 5/2010 |
| WO | 2010144317 A1 | 12/2010 |
| WO | 2011050327 A1 | 4/2011 |
| WO | 2011050365 A1 | 4/2011 |
| WO | 2012061160 A1 | 5/2012 |
| WO | 2012149056 A1 | 11/2012 |
| WO | 2011/004800 | 12/2012 |
| WO | 2013184239 A1 | 12/2013 |

OTHER PUBLICATIONS

Bausch & Lomb Inc., Boston® Materials & Solutions: Product Guide, 2009.

Bissen-Miyajima, Hiroko et al., "Role of the endothelial pump in flap adhesion after laser in situ keratomileusis," Journal of Cataract & Refractive Surgery, vol. 30, No. 9, pp. 1989-1992, Sep. 2004.

Schimmelpfenning, B. et al., "A technique for controlled sensory denervation of the rabbit cornea," Database Accession No. NLM7129102, Graefe's Archive for Clinical and Experimental Opthalmology, vol. 218, No. 6, pp. 287-293, Jun. 1982 (abstract only).

SynergEyes, Inc., "SynergEyes® A Practitioner Training," Mar. 2011, retrieved from the Internet at <http://www.fitsynergeyes.com/syn_a/synergeyesA_presentation.pdf>.

SynergEyes, Inc., "SynergEyes® A," package insert, P/N 70008 Rev. I, Oct. 2008.

SynergEyes®, Inc., Product Overview of CLEARKONE® and SYNERGEYES® PS, retrieved from the Internet at http://www.synergeyes.com/index.html on May 29, 2012.

Australian Examination Report for Application No. 2012249773, dated Jun. 23, 2016, 4 pages.

Canadian Examination Report for Application No. 2,816,031, dated Aug. 31, 2017, 3 pages.

Canadian Examination Report for Application No. 2,916,885, dated Jan. 24, 2017, 5 pages.

European Patent Application No. 10825787.4, Examination Report dated Aug. 12, 2014.

European Patent Application No. 10825787.4, Search Report dated Jun. 18, 2013.

European Patent Application No. 98936282.7, Examination Report dated Mar. 26, 2004.

Examination Search Report for European Application No. 10825813.8, dated Feb. 20, 2017, 7 pages.

International Application No. PCT/US2009/002166, International Preliminary Report on Patentability dated Oct. 5, 2010.

International Application No. PCT/US2009/002166, International Search Report and Written Opinion dated Nov. 19, 2009.

International Application No. PCT/US2010/053854, International Preliminary Report on Patentability dated Apr. 24, 2012.

International Application No. PCT/US2010/053854, International Search Report and Written Opinion dated Mar. 1, 2011.

International Application No. PCT/US2010/053975, International Preliminary Report on Patentability dated Apr. 24, 2012.

International Application No. PCT/US2010/053975, International Search Report and Written Opinion dated Feb. 11, 2011.

International Application No. PCT/US2011/057755, International Search Report dated Feb. 7, 2012.

International Application No. PCT/US2012/035050, International Search Report and Written Opinion dated Oct. 3, 2012.

International Application No. PCT/US2013/037219, International Search Report and Written Opinion dated Sep. 30, 2013.

International Application No. PCT/US2013/059244, International Search Report and Written Opinion dated Nov. 26, 2013.

International Application No. PCT/US2014/044136, International Search Report and Written Opinion dated Jan. 16, 2015.

International Application No. PCT/US2014/064391, International Search Report and Written Opinion dated Jan. 26, 2015.

International Application No. PCT/US2014/065543, International Search Report and Written Opinion dated Feb. 25, 2015.

International Application No. PCT/US2014/065543, International Preliminary Report in Patentability dated May 17, 2016.

International Application No. PCT/US2015/013006, International Search Report and Written Opinion dated Apr. 2, 2015.

Japanese Patent Application No. 2011-502997, Office Action dated Jun. 14, 2013.

Japanese Patent Application No. 2011-502997, Office Action dated Mar. 3, 2014.

Non-Final Office Action for U.S. Appl. No. 15/096,442, dated Dec. 28, 2016, 16 pages.

U.S. Appl. No. 12/384,659, Non-Final Office Action dated Jan. 21, 2016.

Non-Final Office Action for U.S. Appl. No. 12/384,659, dated May 30, 2017, 5 pages.

U.S. Appl. No. 13/456,168, Non-Final Office Action dated Sep. 12, 2013.

U.S. Appl. No. 13/456,168, Notice of Allowance dated May 30, 2014.

U.S. Appl. No. 13/503,841, Final Office Action dated Nov. 26, 2014.

(56) References Cited

OTHER PUBLICATIONS

U.S. Appl. No. 13/503,841, Non-Final Office Action dated Jun. 27, 2014.
U.S. Appl. No. 13/503,841, Non-Final Office Action dated Nov. 16, 2015.
U.S. Appl. No. 13/503,841, Final Office Action dated Jun. 9, 2016.
Non-Final Office Action for U.S. Appl. No. 13/503,841, dated Mar. 1, 2017, 12 pages.
U.S. Appl. No. 13/503,842, Final Office Action dated Aug. 13, 2014.
U.S. Appl. No. 13/503,842, Non-Final Office Action dated Apr. 3, 2014.
U.S. Appl. No. 13/503,842, Non-Final Office Action dated Nov. 25, 2015.
U.S. Appl. No. 13/503,842, Notice of Allowance dated Jul. 11, 2016.
U.S. Appl. No. 13/555,056, Final Office Action dated Sep. 5, 2014.
U.S. Appl. No. 13/555,056, Non-Final Office Action dated Mar. 28, 2014.
U.S. Appl. No. 13/615,111, Notice of Allowance dated Apr. 23, 2013.
U.S. Appl. No. 13/715,917, Notice of Allowance dated Aug. 1, 2013.
U.S. Appl. No. 13/865,780, Notice of Allowance dated Mar. 28, 2016.
U.S. Appl. No. 13/885,135, Non-Final Office Action dated Nov. 18, 2014.
U.S. Appl. No. 13/885,135, Notice of Allowance dated Mar. 16, 2016.
Non-Final Office Action for U.S. Appl. No. 15/184,922, dated Jun. 2, 2017, 22 pages.
U.S. Appl. No. 13/894,176, Non-Final Office Action dated Aug. 5, 2013.
U.S. Appl. No. 13/894,176, Notice of Allowance dated Feb. 26, 2014.
U.S. Appl. No. 13/928,077, Notice of Allowance dated Jan. 15, 2014.
U.S. Appl. No. 14/061,311, Non-Final Office Action dated Apr. 21, 2016.
Final Office Action for U.S. Appl. No. 14/061,311, dated Mar. 9, 2017, 16 pages.
U.S. Appl. No. 14/286,605, Non-Final Office Action dated Dec. 18, 2014.
U.S. Appl. No. 14/468,075, Final Office Action dated Apr. 1, 2016.
U.S. Appl. No. 14/532,707, Non-Final Office Action dated Feb. 25, 2016.
U.S. Appl. No. 14/532,707, Notice of Allowance dated Jun. 8, 2016.
U.S. Appl. No. 14/532,732, Non-Final Office Action dated Apr. 11, 2016.
U.S. Appl. No. 14/532,732, Final Office Action dated Oct. 3, 2016.
U.S. Appl. No. 14/539,698, Notice of Allowance dated Jan. 21, 2016.
Non-Final Office Action for U.S. Appl. No. 14/468,075, dated Nov. 7, 2016.
U.S. Appl. No. 14/793,965, Non-Final Office Action dated Dec. 31, 2015.
Non-Final Office Action for U.S. Appl. No. 14/966,918, dated Nov. 18, 2016.
Non-Final Office Action for U.S. Appl. No. 14/173,516, dated Feb. 8, 2017, 11 pages.
Extended European Search Report for EP Application No. 17183160.5, dated Sep. 12, 2017, 6 pages.

* cited by examiner

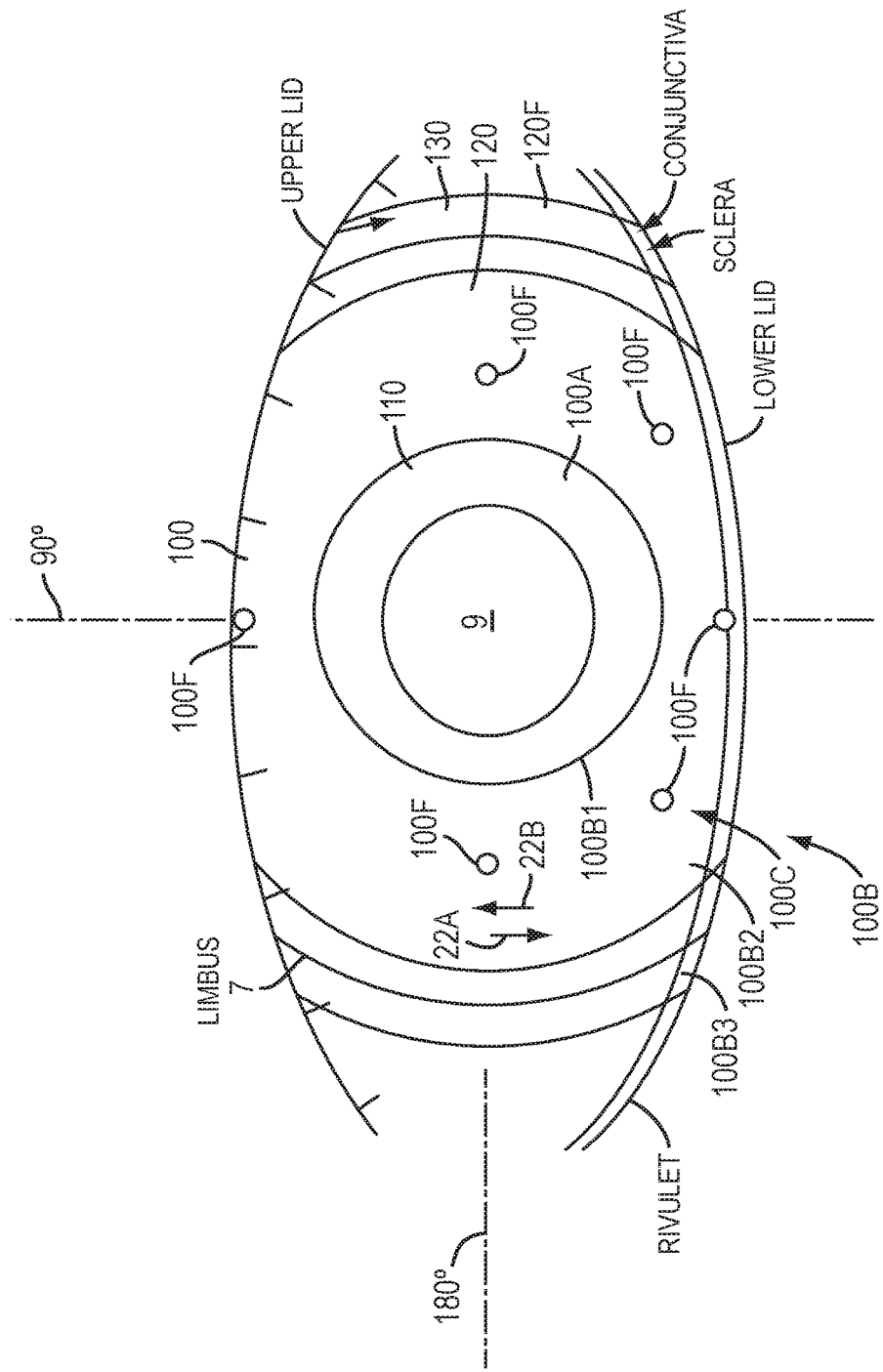
FIG. 1A1

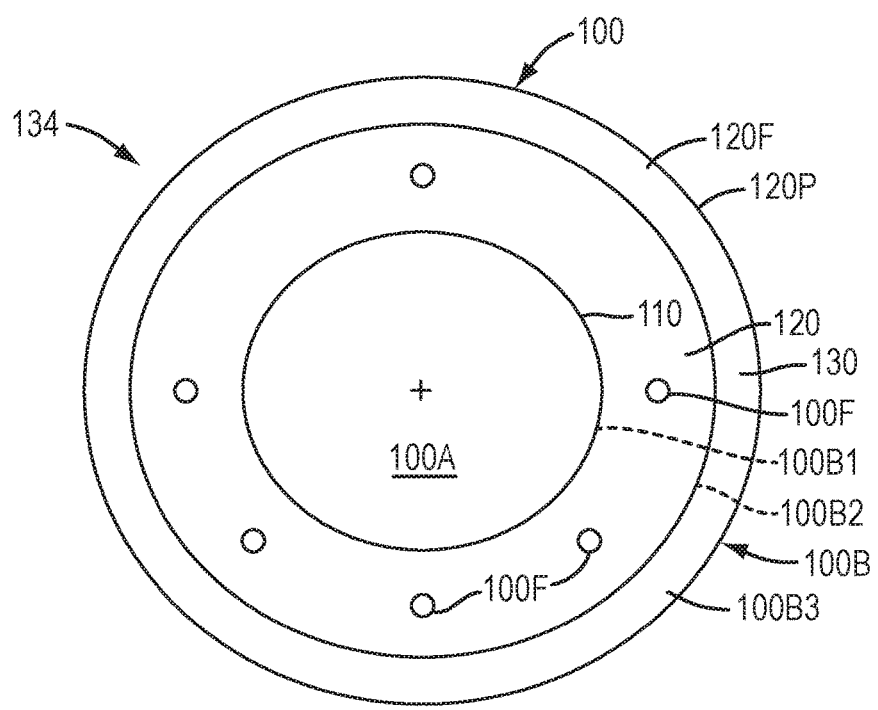
FIG. 1A2

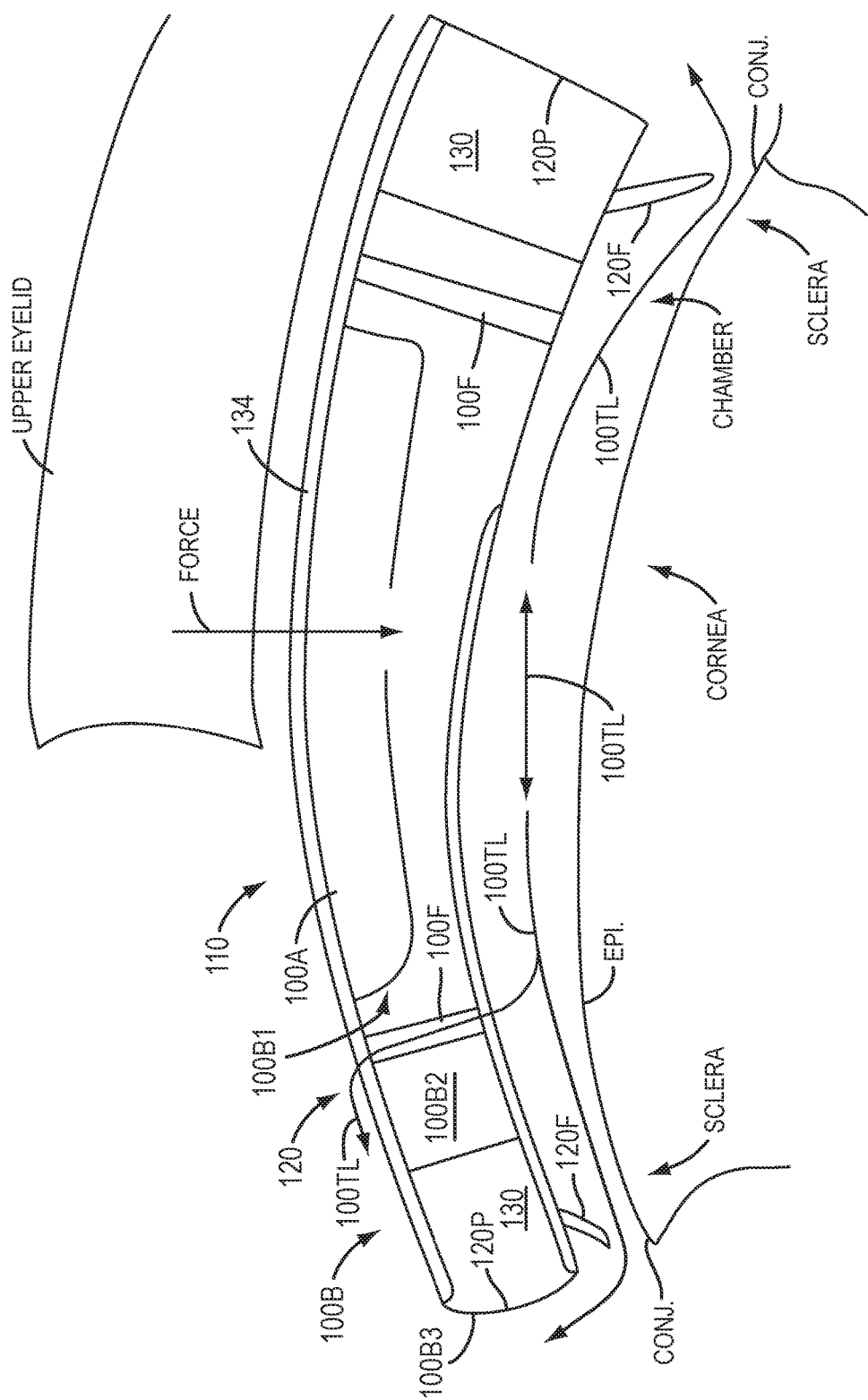
FIG. 1A3

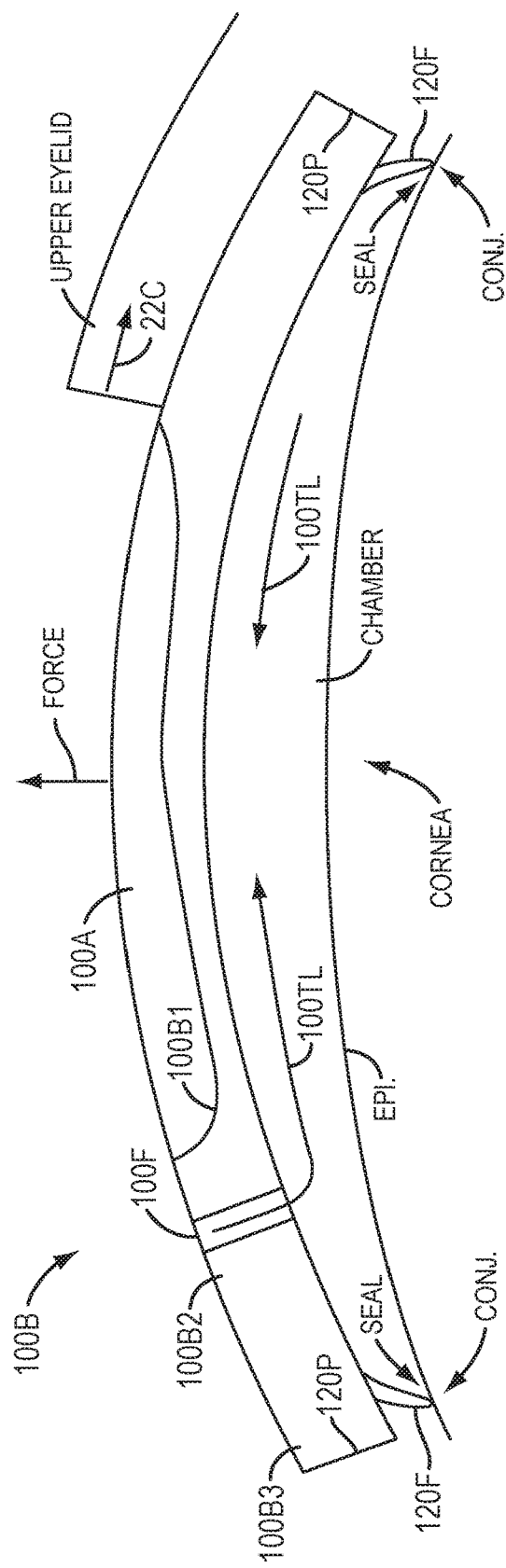
FIG. 1A4

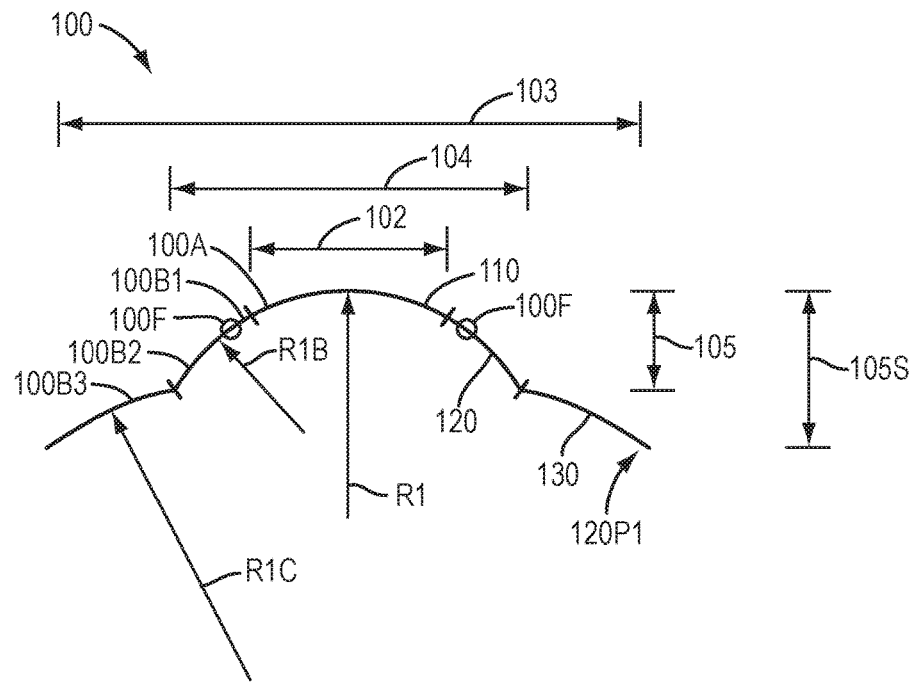
FIG. 1B1
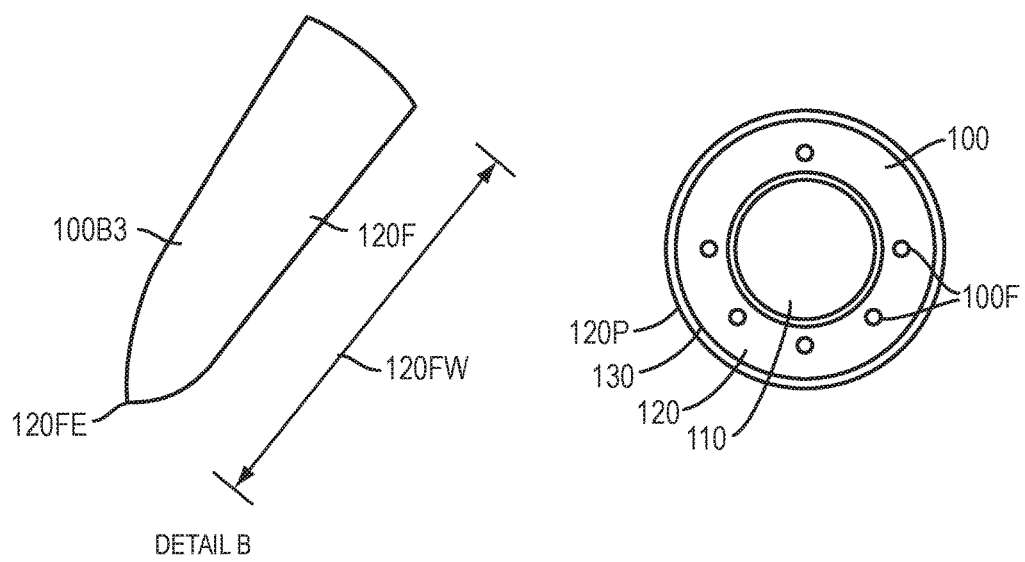
DETAIL B
FIG. 1B3
FIG. 1B4

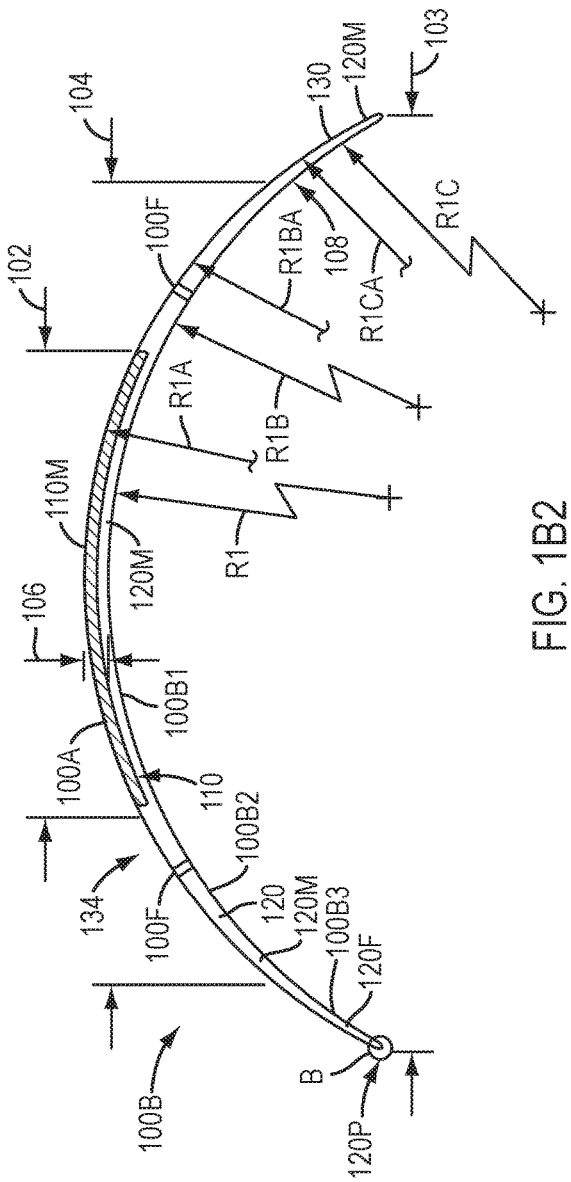
FIG. 1B2
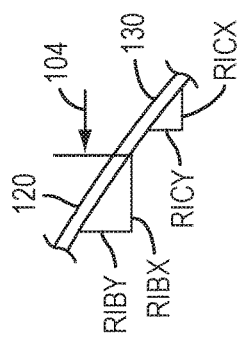
FIG. 1B2-1

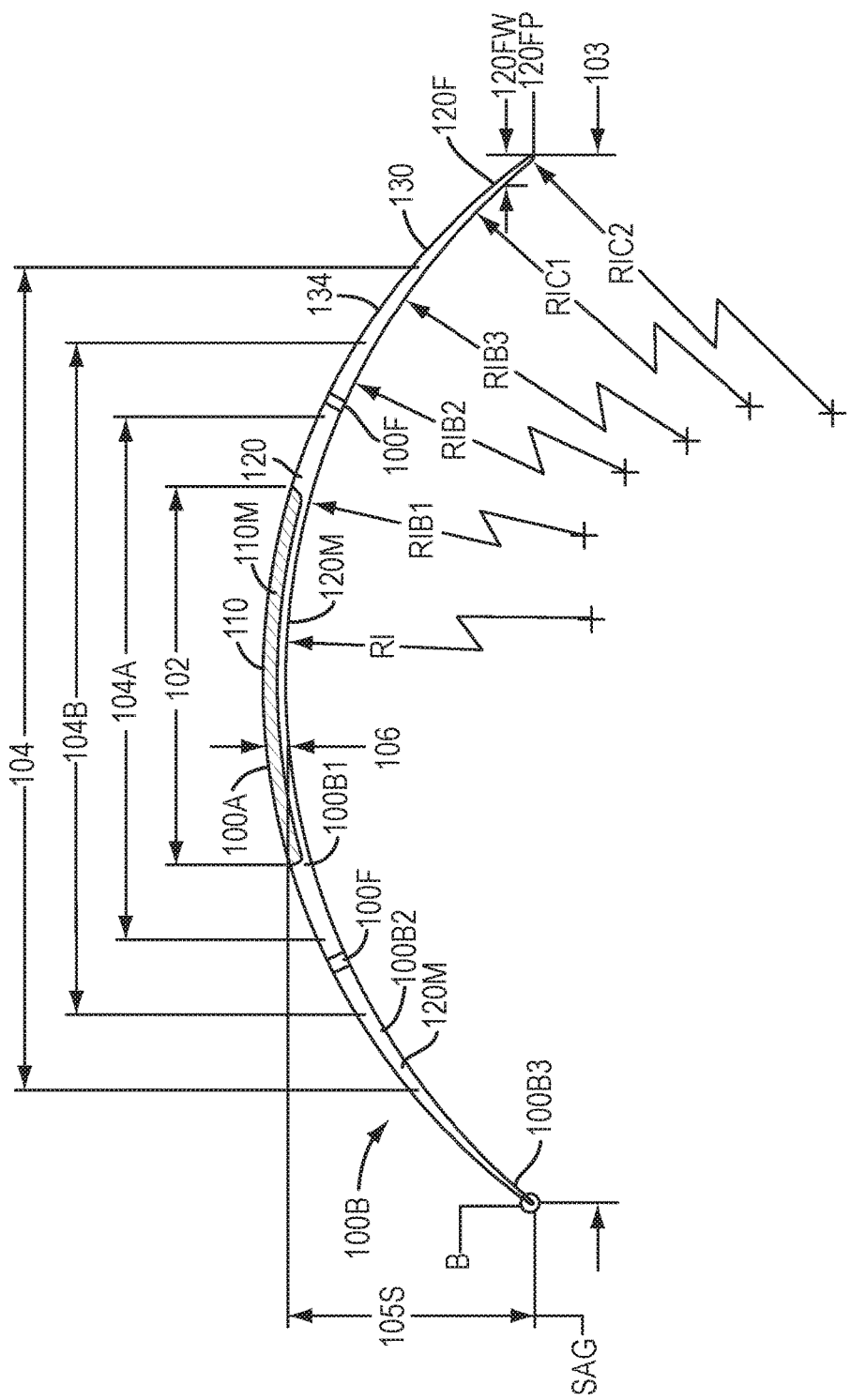
FIG. 1B5

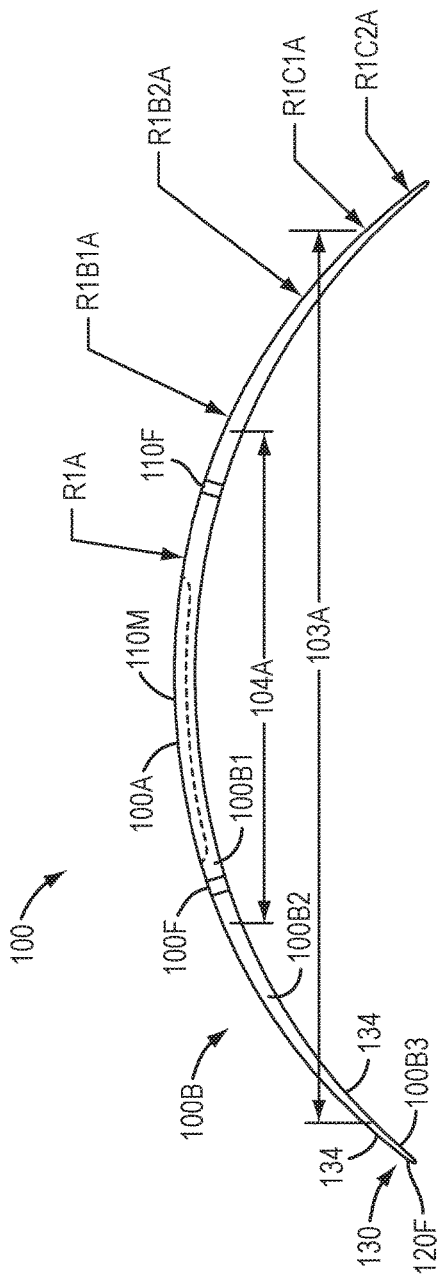
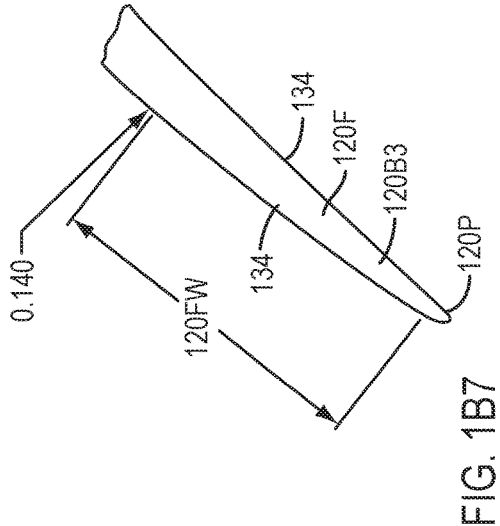
FIG. 1B6
FIG. 1B7

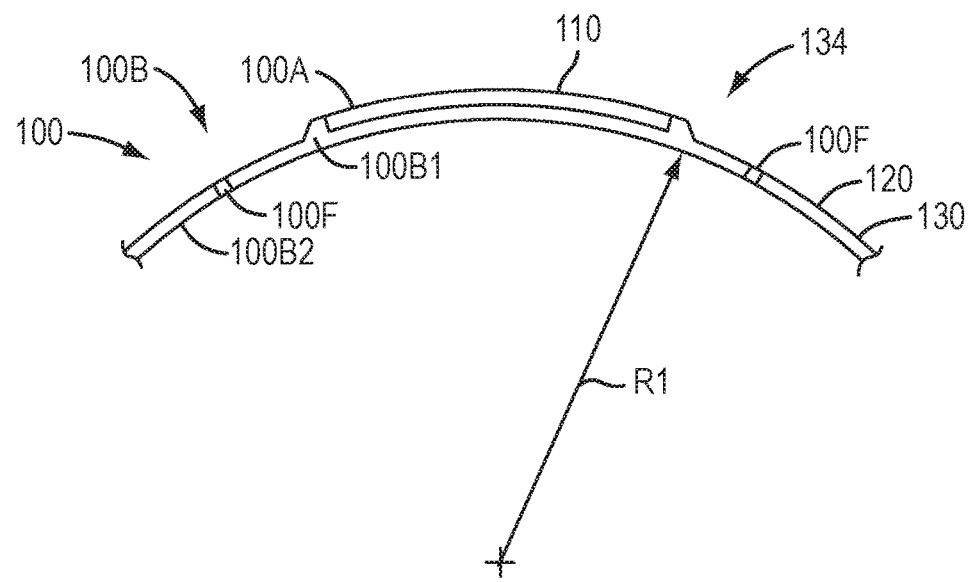
FIG. 1C
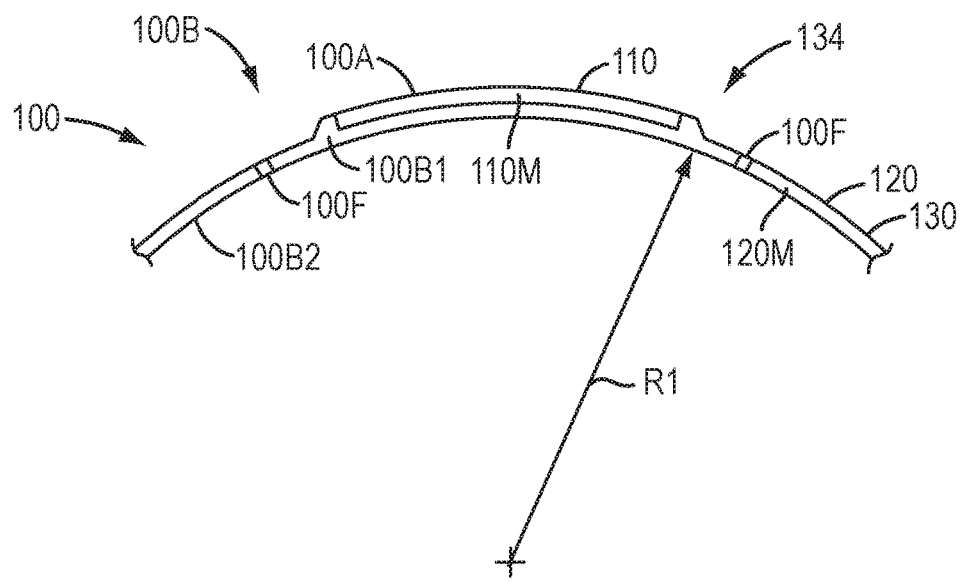
FIG. 1C1

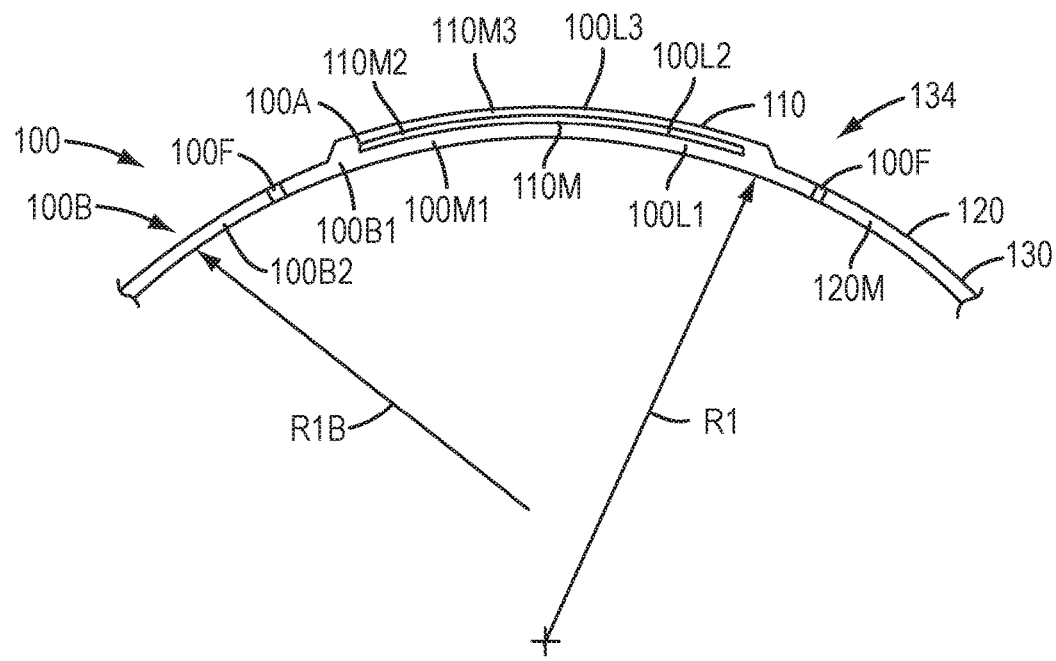
FIG. 1C2
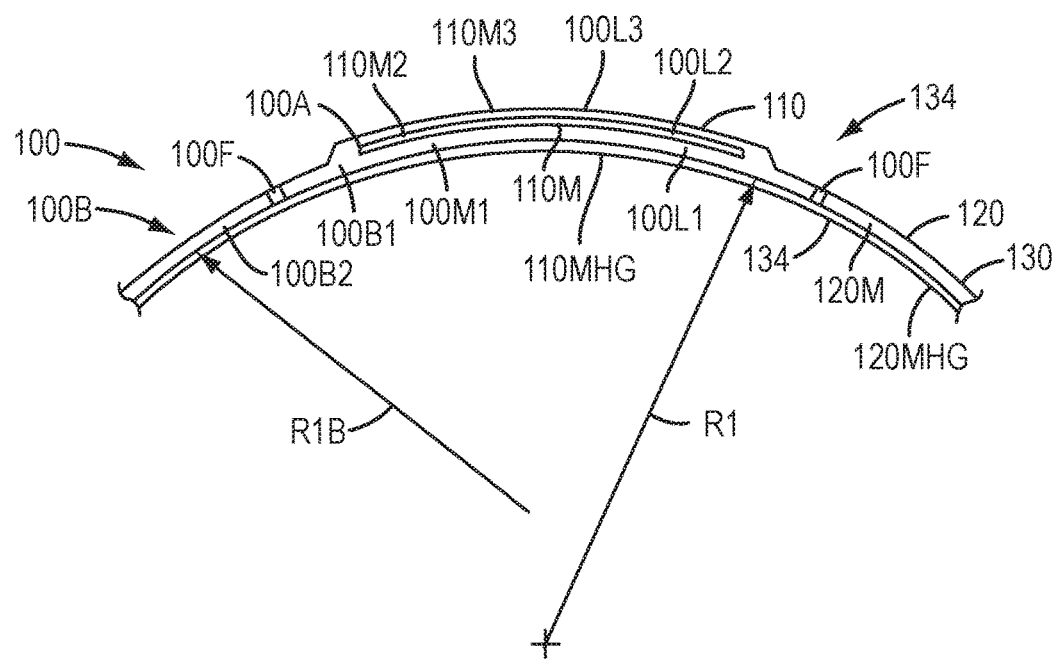
FIG. 1C2A

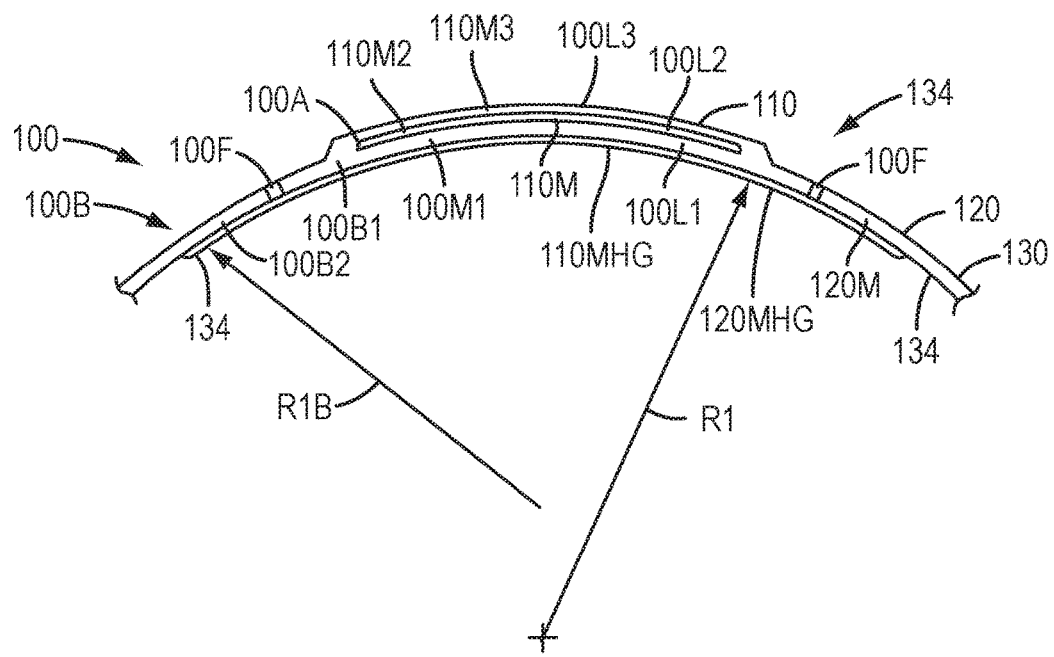
FIG. 1C2B
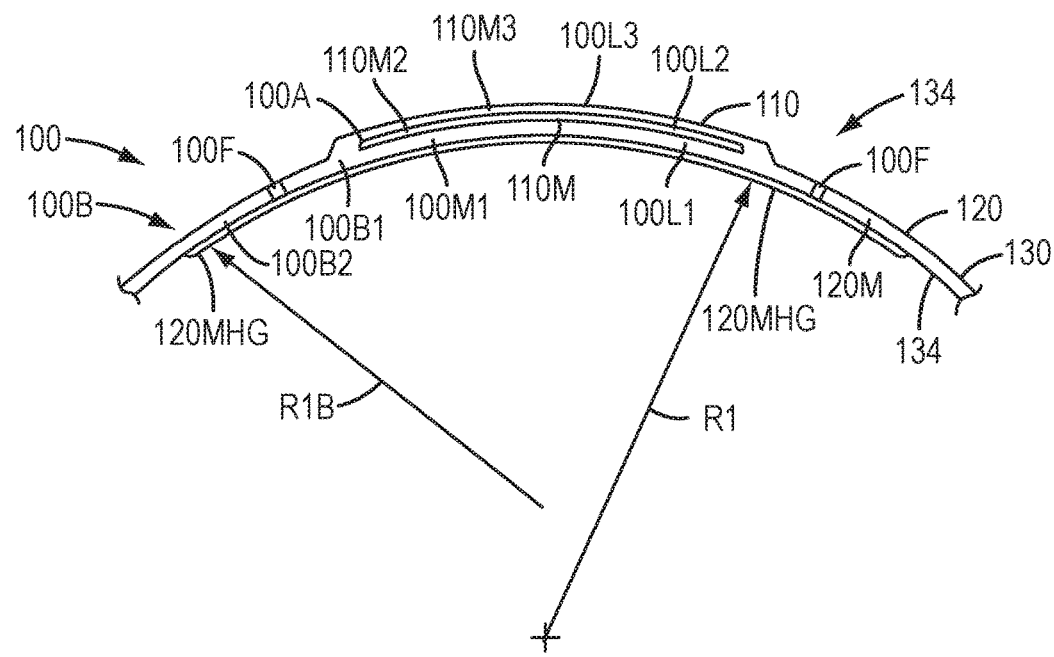
FIG. 1C2C

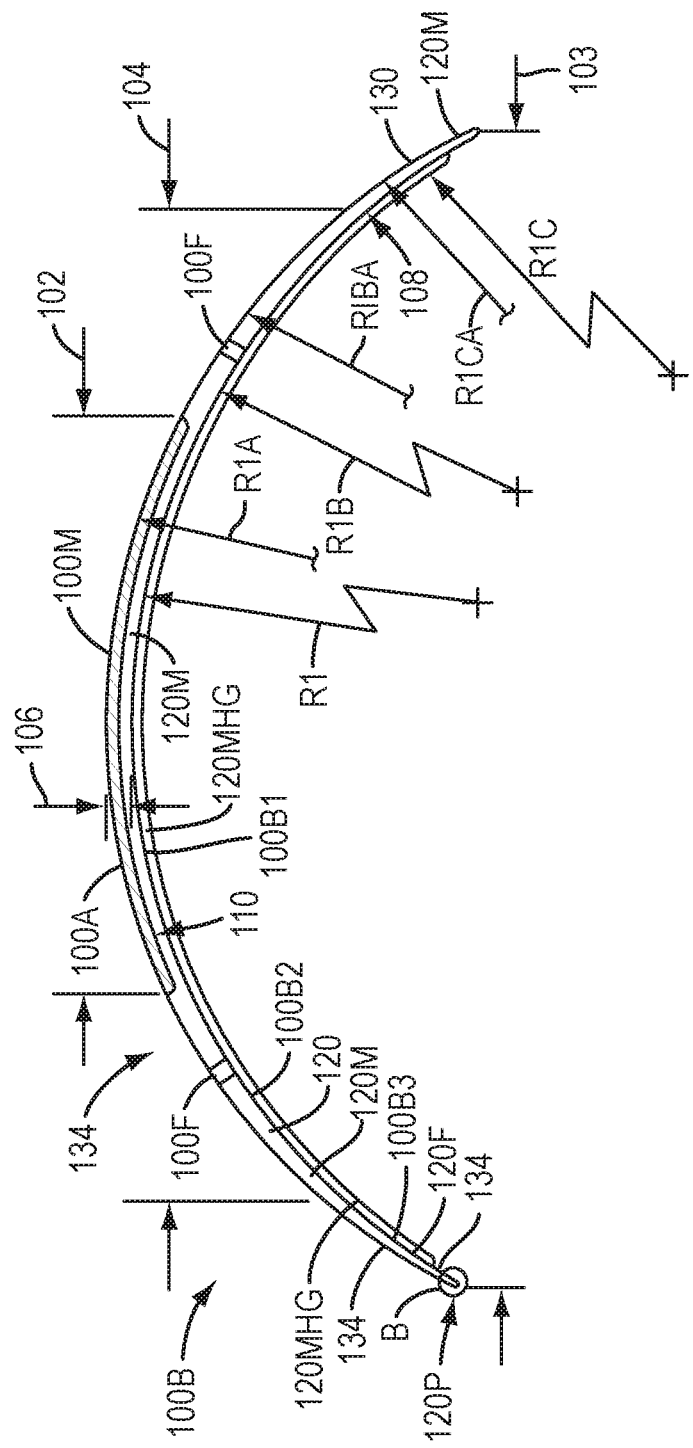
FIG. 1C3

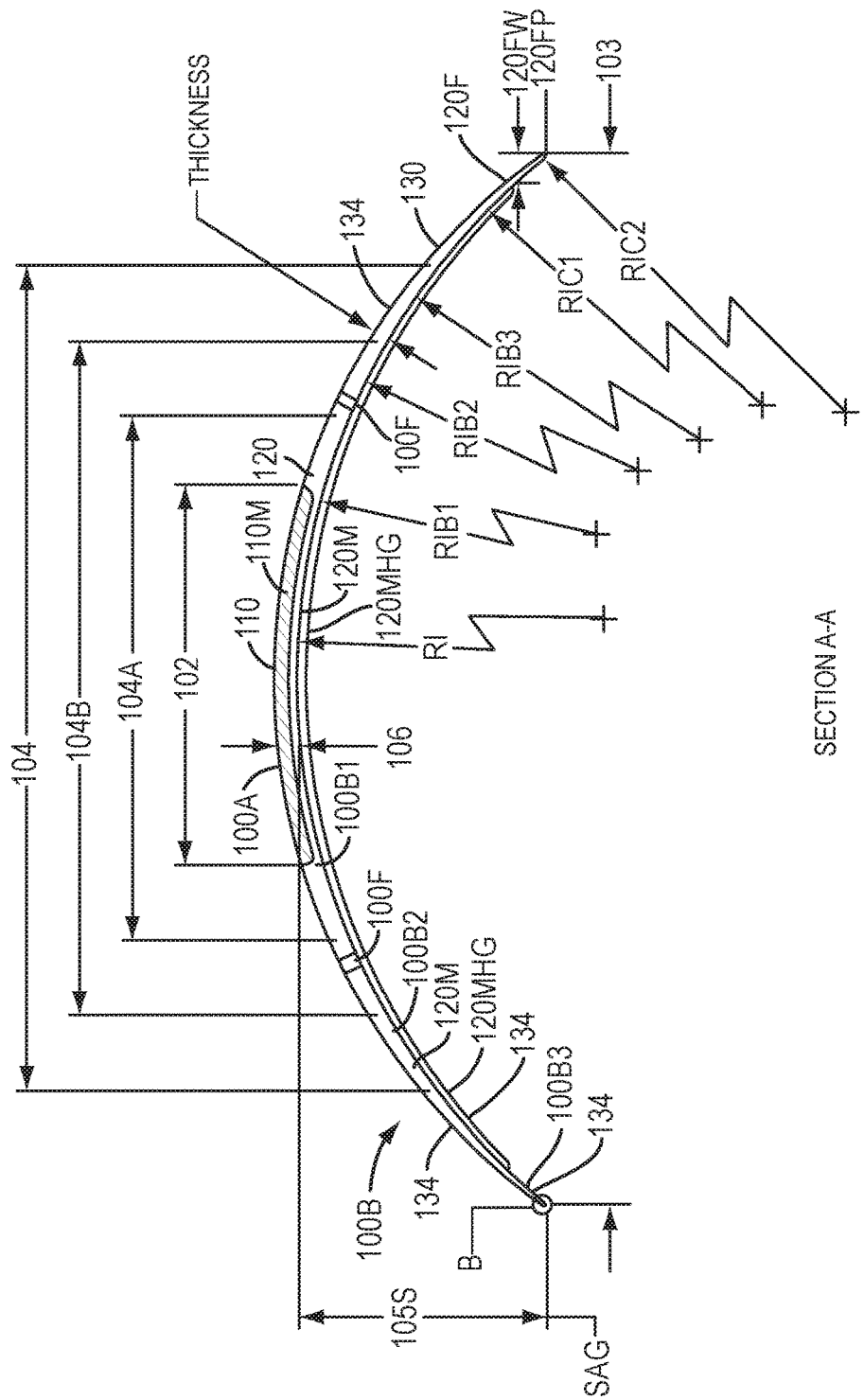
FIG. 1C4

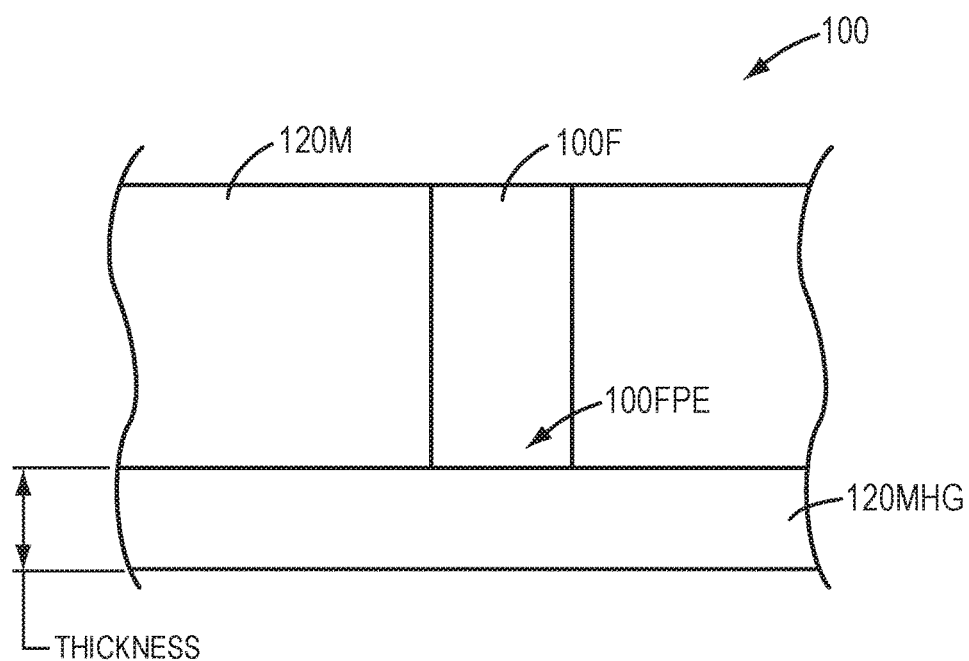
FIG. 1C5
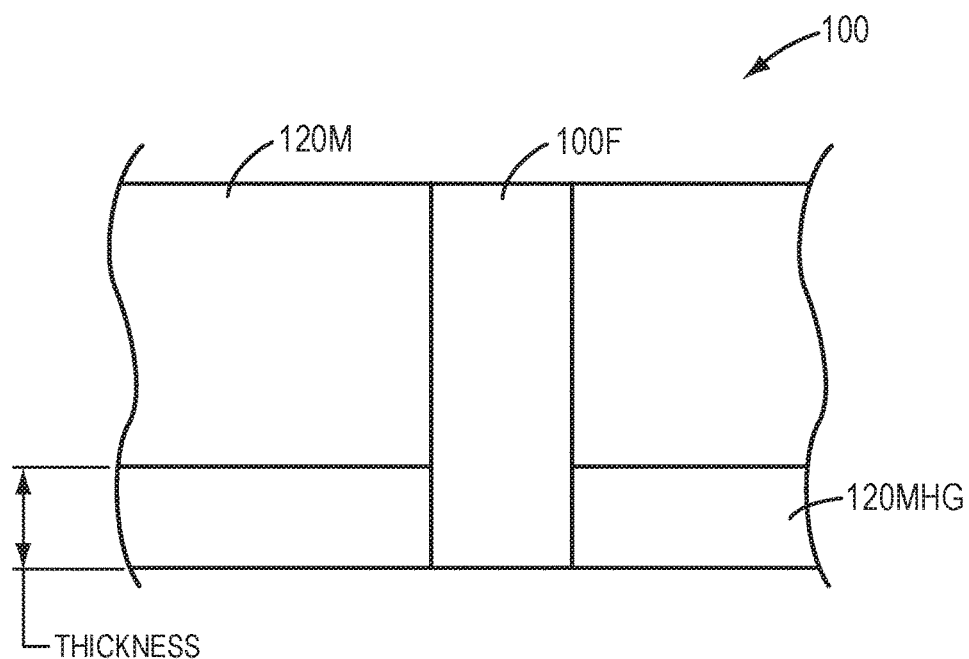
FIG. 1C6

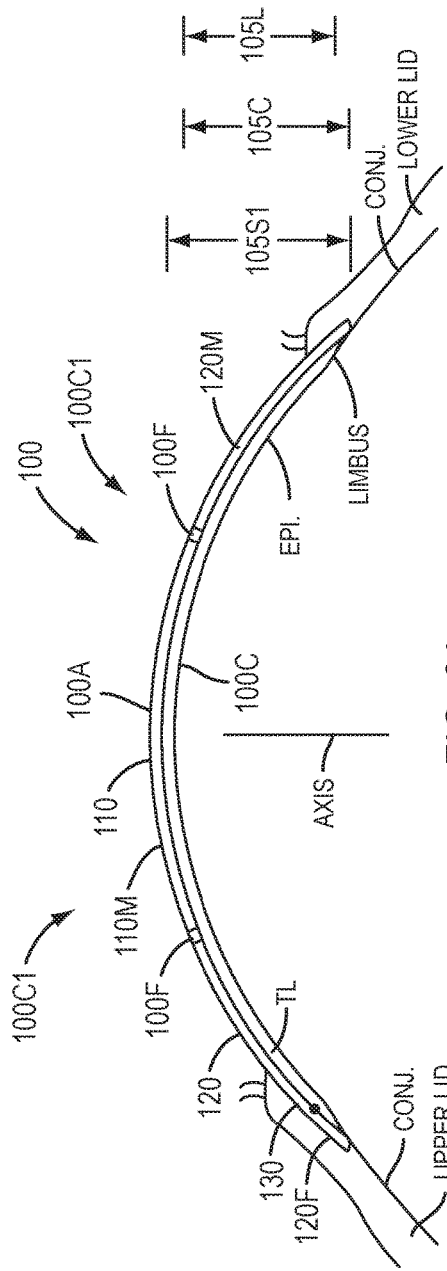
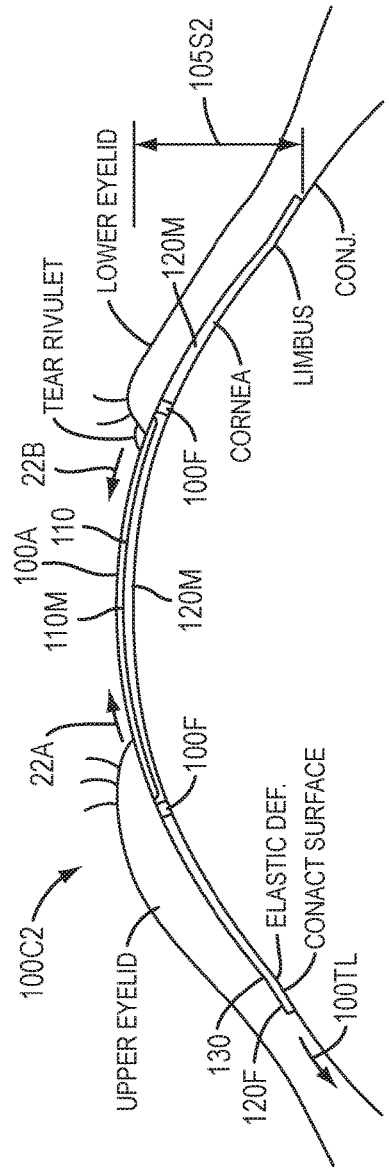
FIG. 2A
FIG. 2B

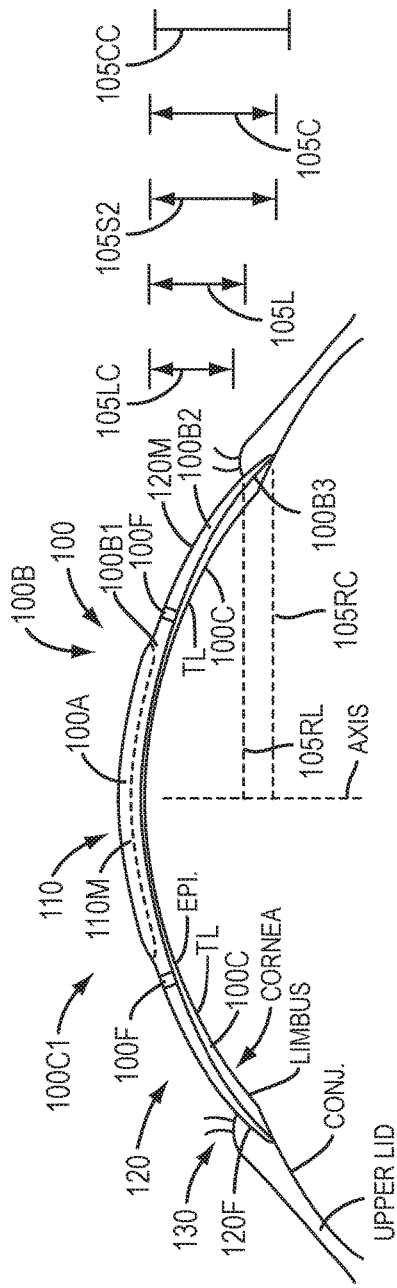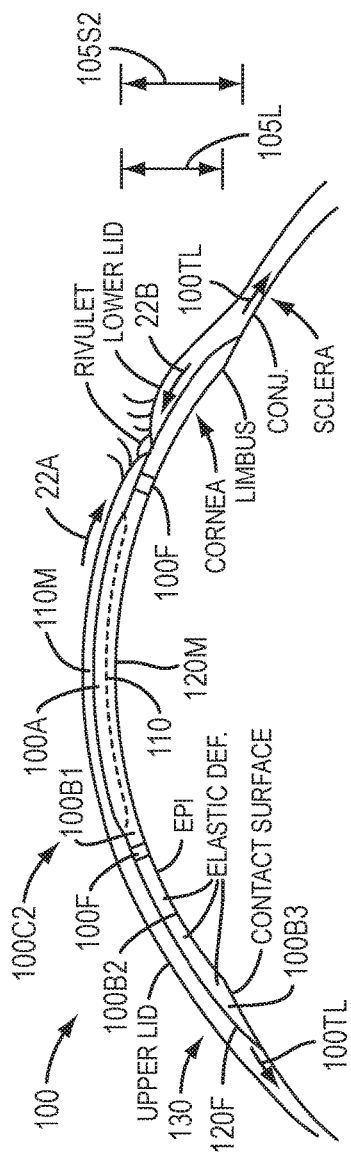
FIG. 2E
FIG. 2F

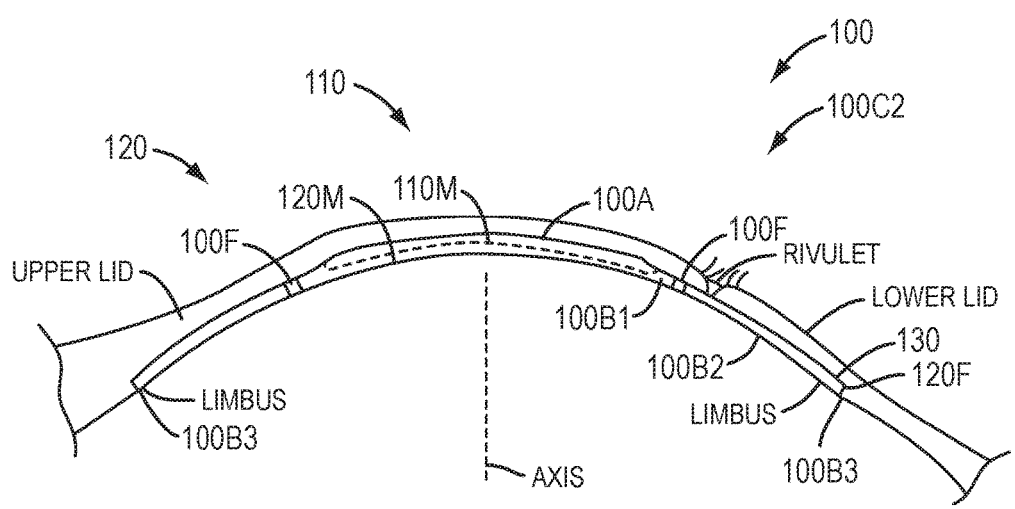
FIG. 2F1

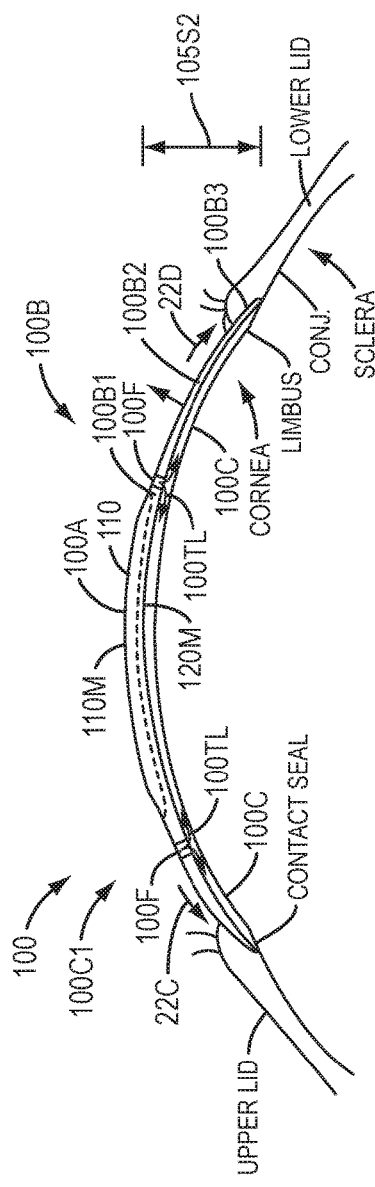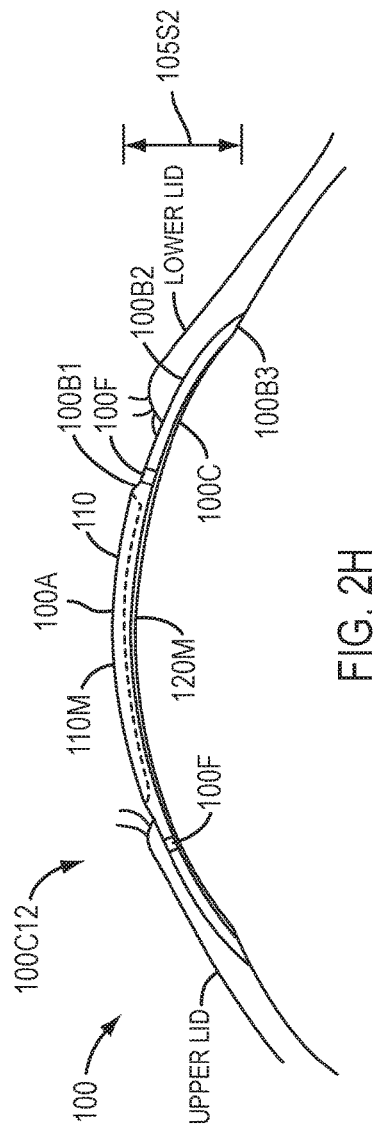
FIG. 2G
FIG. 2H

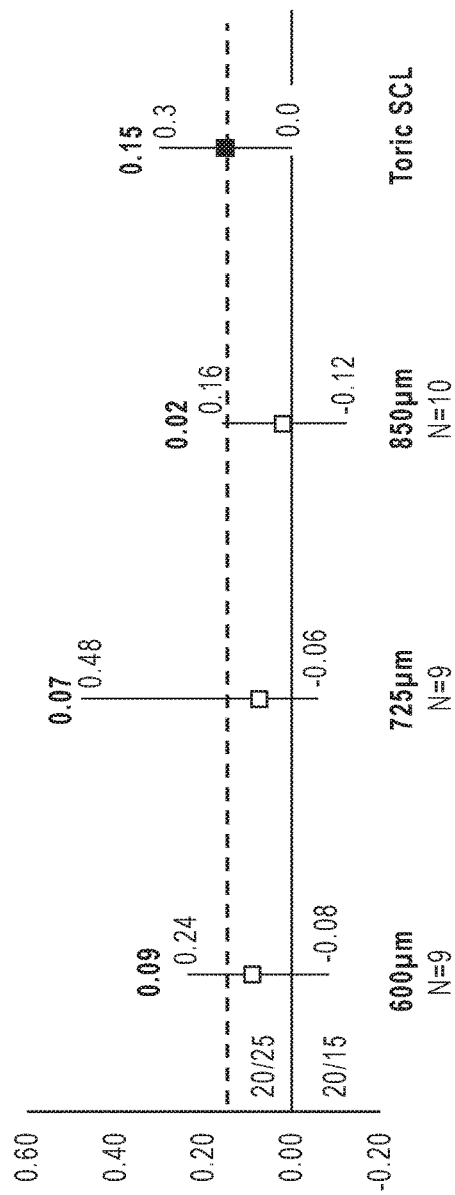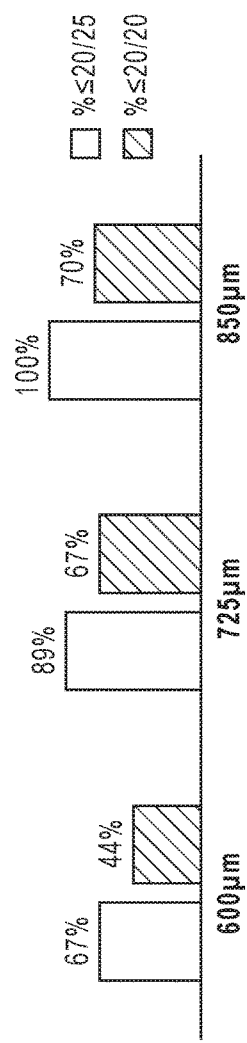
FIG. 9A
FIG. 9B

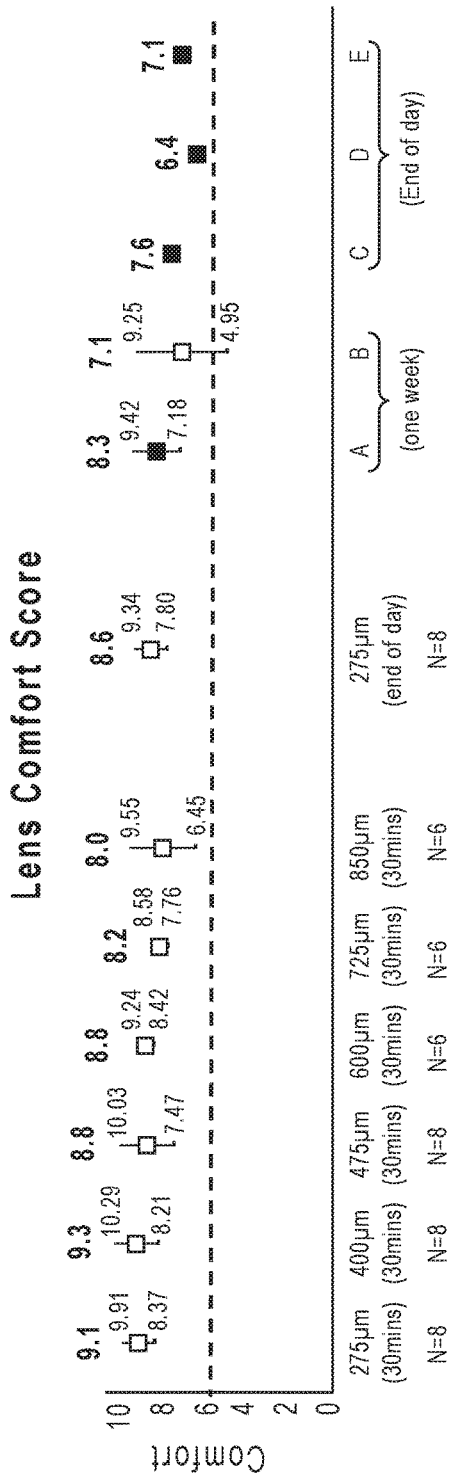
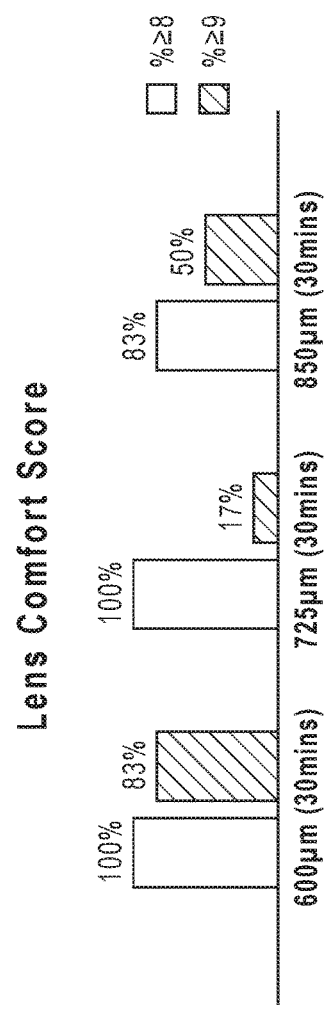
FIG. 10A
FIG. 10B

BIMODULAR CONTACT LENSES

This application is a continuation of U.S. application Ser. No. 14/532,707, filed on Nov. 4, 2014, which claims benefit under 35 U.S.C. § 119(e) of U.S. Provisional Application No. 61/900,947, filed on Nov. 6, 2013, and U.S. application Ser. No. 14/532,707 is a continuation-in-part of U.S. application Ser. No. 13/865,780, filed on Apr. 18, 2013, now issued as U.S. Pat. No. 9,423,632, which claims benefit under 35 U.S.C. § 119(e) of U.S. Provisional Application No. 61/636,404, filed on Apr. 20, 2012, and, each of which is incorporated by reference in its entirety.

FIELD

The disclosure relates to ophthalmic lenses for correcting refractive error of an eye are disclosed. Ophthalmic lenses include a deformable inner portion and a deformable peripheral portion. When disposed over the optical region of an eye, the inner portion is configured so that engagement of the posterior surface against the eye deforms the posterior surface so that the posterior surface has a shape diverging form the refractive shape of the epithelium when viewing with the eye through the ophthalmic lens. The modulus of the inner portion is greater than the modulus of the peripheral portion and the ophthalmic lenses are configured to allow movement relative to the eye upon blinking of the eye and to be substantially centered on the optical region of the cornea following the blinking of the eye. When applied to the eye, the lenses are configured to provide one or more lenticular volumes between the posterior surface of the lens and the cornea. The disclosure further relates to methods of correcting refractive errors of an eye such as astigmatism or spherical aberration using the ophthalmic lenses.

BACKGROUND

The eye includes several tissues that allow patients to see. The cornea of the eye is an anterior tissue of the eye that is clear in healthy eyes and refracts light so as to form an image on the retina. The retina is a posterior tissue of the eye that senses light from the image formed thereon and transmits signals from the image to the brain. The cornea includes an outer layer of tissue, the epithelium, which protects the underlying tissues of the cornea, such as Bowman's membrane, the stroma, and nerve fibers that extend into the stroma and Bowman's membrane. The healthy eye includes a tear film disposed over the epithelium. The tear film can smooth small irregularities of the epithelium so as to provide an optically smooth surface and maintain eye health. The tear film is shaped substantially by the shape of the underlying epithelium, stroma, and Bowman's membrane, if present. The tear film comprises a liquid that is mostly water and does include additional components, such as mucoids and lipids. The many nerve fibers of the cornea provide sensation to promote blinking that can cover the cornea with the tear film. The never fibers also sense pain so that one will normally avoid trauma to the cornea and also avoid direct contact of an object to the cornea so as to protect this important tissue.

In the healthy cornea, the proper amount of hydration of the cornea, sometimes referred to as dehydration of the cornea, is maintained such that the cornea remains clear. The cornea includes a posterior endothelial layer that pumps water from the cornea into the adjacent anterior chamber. The epithelium inhibits flow of water from the tear liquid into the cornea, such that the corneal stroma can be maintained with the proper amount of hydration with endothelial pumping. The endothelial pumping of water from the cornea to maintain the proper hydration and thickness of the eye is referred to as deturgescence. When the corneal epithelium heals, the layer of cells forming over the defect can be at least somewhat irregular in at least some instances, such that the vision of the patient can be less than ideal.

Following corneal surgery, such as refractive keratectomy, the post-ablation cornea may have a complex shape, and many of the prior commercially available lenses may not fit the ablated cornea as well as would be ideal, and in at least some instances fitting of lenses can be time consuming and awkward. Commercially available contact lenses having a rigid gas permeable (RGP) central portion and a soft peripheral skirt can be difficult and/or time consuming to fit to the ablated cornea and may not fit very well in at least some instances. The ablated cornea may comprise an abrupt change in curvature near the edge of the ablation, and in at least some instances it can be difficult to fit such lenses near the edge of the ablation. Also, at least some of the commercially available contact lenses may not be suitable for extended wear and may be removed each day, which can be somewhat awkward for a patient and can result in lack of compliance and lenses remaining in the eye longer than would be ideal in at least some instances.

Hybrid or bimodular contact lenses, lenses having a comparatively rigid central porition and a soft skirt are also used to correct refractive error of the eye such as astigmatism. Current products such as RGP and soft toric lenses for correcting refractive error include a cylindrical component in addition to any spherical corrective component that must be determined for each patient and oriented with respect to the optical region of the cornea to maintain optimal vision correction. Features are incorporated into the lens to maintain centration and radial orientation of the lens of the eye during wear. Because of the need to fit and orient the cylindrical corrective component, a large number of lenses must be maintained in inventory and individually fit and selected for each patient.

In light of the above, it is desirable to provide improved contact lenses for vision correction and coverings for treatments related to epithelial defects of the cornea, such as epithelial defects following PRK. Ideally, these contact lenses and coverings would provide treatments that improve tear flow and avoid at least some of the deficiencies of known techniques while providing improved patient comfort and/or vision. It is also desirable to provide improved contact lenses for correcting refractive error that only require a spherical fit and provide comfort and vision correction as good as or better than current toric lens products.

SUMMARY

Embodiments of the present invention provide improved ophthalmic devices that provide improved vision for extended amounts of time and can be used to correct refractive error or to treat normal eyes or eyes having an epithelial defect, such as an epithelial defect subsequent to refractive surgery such as PRK. The device may comprise a contact lens and can provide improved tear flow such that the device can be left on the eye to correct vision for an extended time. Devices may comprise a water inhibiting layer and one or more structures to pump tear liquid under the water inhibiting layer of the device such that the device can remain in the eye and correct vision for an extended amount of time. Alternatively or in combination, the device may comprise, for example, a silicone or hydrogel layer extending along a posterior surface of the device coupled to fenestrations to provide hydration and patient comfort. The silicone or hydrogel layer may fluidly couple the cornea to the fenestrations so as to pass tear liquid and therapeutic agents from an anterior surface of the device through the fenestrations and silicone or hydrogel to the cornea. In certain embodiments, the device comprises a material having fenestrations and an outer portion shaped to contact the conjunctiva to pump tear liquid when the eye blinks. The device may comprise a deflectable outer portion having a resistance to deflection such that a chamber or lenticular volume is formed when the device is placed on the eye and the eye is open with the eyelids separated. A silicone or hydrogel layer coupled to the fenestrations may extend along a lower surface of the device at least a portion of the chamber. The resistance to deflection of the deflectable outer portion can be configured such that the outer portion deflects inward toward the cornea when the eyelid closes to pump tear liquid. The fenestrations can draw tear liquid into the chamber located under the device when the eye opens and the chamber can expands. The fenestrations may extend through the silicone or hydrogel layer to provide pumping. Alternatively or in combination, the silicone or hydrogel layer may cover the posterior end of the fenestrations and the deflection of the outer portion can encourage movement of liquid and medicament along the silicone or hydrogel. The outer portion of the device comprises a sclera coupling portion shaped to contact the conjunctiva to define the chamber when the device is placed on the eye. The fenestrations and sclera coupling portion of the device can pass tear liquid away from the chamber when the eye closes and pressure of one or more eyelids urges the device toward the cornea such that the chamber volume decreases. In certain embodiments, opening of the eye so as to separate the eyelids reduces pressure on the outer portion of the device such that the outer portion of the device over an outer portion of the cornea can separate from the outer portion of the cornea so as to draw liquid through the fenestrations and into the chamber located under the device. The sclera coupling portion of device may contact the conjunctiva to inhibit the flow of tear liquid under the sclera coupling portion when the eye opens and tear liquid is drawn through the fenestrations, for example with formation of a seal where the device contacts the conjunctiva. When the eye blinks subsequently, the pressure of the one or more eyelids can urge the device toward the cornea such that tear liquid can pass through the fenestrations, and the sclera coupling portion may separate slightly from the conjunctiva to pass tear liquid under the sclera coupling portion, so as to rinse the cornea, the limbus, the conjunctiva and the underside of the device with the pumped tear liquid. The device may comprise a material having high oxygen permeability such as silicone such that the device may provide improved tear flow and high oxygen permeability. This improved flow of tear liquid can allow the device such as a contact lens to be worn for an extended time of at least about one week, for example thirty days or sixty days or more. The improved tear flow can improve healing and vision of eyes with epithelial defects, for example epithelial defects following PRK. Improved tear flow can also maintain health of the eye and facilitate longer wear.

In certain embodiments, a device comprises an inner optical component for vision, such as a lens, and an outer coupling component to hold the inner component in relation to the pupil to improve vision. The coupling component may comprise a deflectable material that inhibits passage of the tear liquid through the material such that the tear liquid passes through fenestrations when the eye blinks and an eyelid exerts pressure on the optical component. The outer coupling component may comprise fenestrations to pass the tear liquid and the outer sclera coupling portion to contact the conjunctiva. The optical component may comprise a first material characterized by a first modulus and first thickness corresponding to a first rigidity. The coupling component may comprise a second material characterized by a second modulus and a second thickness corresponding to a second rigidity. The second material can be softer, e.g., have a lower modulus, than that of the first material and the second thickness can be less than the first thickness such that the coupling component can be deflected with the eyelid, and such that the coupling component can be deflected by an amount greater than the optical component when the eyelids close to cover the first component and the second component. The optical component can be more rigid than the coupling component, such that the optical component can provide vision when the outer portion is deflected with one or more eyelids. In certain embodiments, the optical component is configured to have sufficient rigidity to maintain a lenticular volume between the posterior surface of the lens and the cornea.

The alignment of the optical component to the pupil provided with the coupling to the conjunctiva and underlying sclera can be beneficial for vision. In certain embodiments, the optical component can be held at a substantially fixed location in relation to the pupil so as to provide improved vision such as presbyopia correction and vision correction of aberrations that may depend on location of the pupil such as measured wavefront aberrations, spherical aberration, coma, and trefoil.

The optical component and the coupling component can be helpful to improve vision and regeneration of the epithelium in eyes with epithelial defects. The optical component can smooth the cornea and may smooth irregularities of the epithelium and ablated stroma. The coupling component can support the optical component so as to resist sliding movement of the optical component and provide an environment to promote regeneration of the epithelium. The pumping of the tear liquid may improve tear flow to the regenerating epithelium near the epithelial defect so as to promote regeneration of the epithelium over the defect. The pumping of the tear liquid can also promote delivery of a medicament, for example a steroid, to the ablated region so as to inhibit corneal infiltrates and haze.

In a first aspect, ophthalmic lenses for correcting a refractive error of an eye are provided, the eye having a cornea with a refractive shape extending across an optical region of the eye, the ophthalmic lens comprising an inner optic portion configured to be disposed over the optical region of the cornea; a posterior surface extending along the inner optic portion and configured so that engagement of the posterior surface against the eye deforms the posterior surface and so that the posterior surface has a shape diverging from the refractive shape of the cornea; and a peripheral portion of the ophthalmic lens disposed radially outward of the inner optic portion; wherein, the inner optic portion comprises an inner material characterized by an inner modulus and the peripheral portion comprises a peripheral material characterized by a peripheral modulus; the inner modulus is greater than the peripheral modulus; and the inner modulus is from about 20 MPa to about 1500 MPa.

In a second aspect, methods for correcting a refractive error of an eye are provided, the eye having a cornea with a refractive shape extending across an optical region of the cornea, the method comprising positioning an ophthalmic lens on the eye so that an inner optic portion of the ophthalmic lens is disposed over the optical region of the cornea, wherein at least a portion of a posterior surface of the positioned ophthalmic lens extends adjacent the eye and is deformed by the eye; and wherein a shape of the posterior surface diverges from the refractive shape of the cornea so that the ophthalmic lens mitigates the refractive error.

In a third aspect, ophthalmic lenses for correcting a refractive error of an eye are provided, the eye having a cornea with a refractive shape extending across an optical region of the eye, the ophthalmic lens comprising an inner optic portion configured to be disposed over the optical region of the cornea, wherein the inner optic portion comprises a central portion, an anterior portion disposed anteriorly to the central portion, and a posterior portion disposed posteriorly to the central portion; a peripheral portion of the ophthalmic lens disposed radially outward of the inner optic portion; a plurality of fenestrations disposed within the inner optic portion, the peripheral portion, or both the inner optic portion and the peripheral portion; and at least some of the plurality of fenestrations are configured to maintain tear fluid within one or more lenticular volumes between the posterior surface of the inner optic portion and the cornea; a posterior surface extending along the inner optic portion adjacent the eye and configured so that engagement of the posterior surface against the eye deforms the posterior surface and so that the posterior surface has a shape diverging from the refractive shape of the cornea; and an anterior surface characterized by a spherical profile without a cylindrical component; and wherein the central portion comprises a material characterized by a modulus from about 20 MPa to about 1500 MPa.

In a fourth aspect, ophthalmic lenses for correcting a refractive error of an eye are provided, the eye comprising a cornea with a refractive shape extending across an optical region of the cornia, the ophthalmic lens comprising: an inner optic portion configured to be disposed over the optical region of the cornea, wherein the inner optic portion comprises a central portion, an anterior portion disposed anteriorly to the central portion, and a posterior portion disposed posteriorly to the central portion; a posterior surface extending along the inner optic portion adjacent the eye and configured so that engagement of the posterior surface against the cornea deforms the posterior surface and so that the posterior surface has a shape diverging from the refractive shape of the cornea and providing at least one lenticular volume between the posterior surface and the cornea; an anterior surface extending along the inner optic portion characterized by a spherical profile without a cylindrical component; a peripheral portion of the ophthalmic lens disposed radially outward of the inner optic portion; and a plurality of fenestrations disposed within the inner optic portion, the peripheral portion, or both the inner optic portion and the peripheral portion; and at least some of the plurality of fenestrations are configured to maintain tear fluid within one or more lenticular volumes between the posterior surface of the inner optic portion and the cornea; wherein the central portion comprises a material characterized by a modulus from about 20 MPa to about 1500 MPa.

In a fifth aspect, methods for correcting a refractive error of an eye are provided, the eye having a cornea with a refractive shape extending across an optical region of the cornea, the method comprising positioning an ophthalmic lens provided by the present disclosure on an eye comprising a refractive error, to correct the refractkive error.

In certain embodiments, a device comprises an inner portion comprising an optical component and an outer portion comprising an coupling component. An outer portion of the device may comprise an intermediate portion of a coupling component and an outer portion of the coupling component.

BRIEF DESCRIPTION OF THE DRAWINGS

FIG. 1-1A shows an ablated eye immediately following refractive surgery resulting in an epithelial defect, suitable for remediation in accordance with embodiments of the present invention.

FIG. 1A1 shows a device positioned on an eye and blinking of the eye, in accordance with embodiments of the present invention.

FIG. 1A2 shows the device of FIG. 1A1 that is capable of pumping tear liquid under the device, in accordance with embodiments of the present invention.

FIG. 1A3 shows a schematic illustration of the devices of FIG. 1A1 and FIG. 1A2 pumping tear liquid when the eye closes, in accordance with embodiments of the present invention.

FIG. 1A4 shows a schematic illustration of the device of FIG. 1A1 and FIG. 1A2 pumping tear liquid when the eye opens, in accordance with embodiments of the present invention.

FIG. 1B 1 shows a device having a tricurve profile to fit the sclera of an eye, which device may be used to fit an ablated cornea, in accordance with embodiments of the present invention.

FIG. 1B2 shows a device having a tricurve profile to fit the sclera of an eye with slopes of the curved profiles aligned so as to inhibit ridges at the boundaries of the curved portions, in accordance with embodiments of the present invention.

FIG. 1B2-1 shows alignment of the slope of the lower surface of the corneal contacting portion with the slope of the lower surface of the sclera coupling portion, such that pressure to the limbus is decreased substantially, in accordance with embodiments of the present invention.

FIG. 1B3 shows a tapered edge of the device of FIG. 1B1, in accordance with embodiments of the present invention.

FIG. 1B4 shows a plan view device having a tricurve profile to fit the cornea, limbus, and sclera with slopes of the curved profiles aligned so as to inhibit ridges at the boundaries of the curved portions, in accordance with embodiments of the present invention.

FIG. 1B5 shows a side sectional view of the device of FIG. 1B4 and corresponding curved portions to couple to the cornea, limbus, and sclera, in accordance with embodiments of the present invention.

FIG. 1B6 shows a side sectional view of the device of FIG. 1B4 and corresponding curved portions of the upper surface, in accordance with embodiments of the present invention.

FIG. 1B7 shows a tapered edge of the device of FIG. 1B4, in accordance with embodiments of the present invention.

FIG. 1C shows a device comprising a single piece of material having an inner thickness greater than an outer thickness, in accordance with embodiments of the present invention.

FIG. 1C1 shows a device as in FIGS. 1-2A to 1B2 having an inner portion comprising an inner thickness and an inner material and an outer portion comprising an outer thickness and an outer material, in which the inner thickness is greater than the outer thickness, in accordance with embodiments of the present invention.

FIG. 1C2 shows a device as in FIGS. 1-2A to 1B2 having an inner portion comprising an inner thickness and an inner material and an outer portion comprising an outer thickness and an outer material, in which the inner thickness is greater than the outer thickness and the outer material extends around the inner material, in accordance with embodiments of the present invention.

FIG. 1C2A shows a device as in one or more of FIGS. 1-2A to 1B7 having a layer of silicone or hydrogel material on a posterior surface of the device, in accordance with embodiments of the present invention.

FIG. 1C2B shows a device as in one or more of FIGS. 1-2A to 1B7 having a layer of silicone or hydrogel material on a posterior surface of the device extending less than a maximum distance across the device such that end portions of the device are configured to engage the epithelium of the eye away from the silicone or hydrogel layer and inhibit movement of the device when placed on the eye, in accordance with embodiments of the present invention.

FIG. 1C2C shows a device as in one or more of FIGS. 1-2A to 1B7 having an annular layer of silicone or hydrogel material on a posterior surface of the device such that an inner portion of the device contacts the cornea away from the silicone or hydrogel layer and an outer portion of the device contacts the cornea away from the device when placed on the eye, in accordance with embodiments of the present invention.

FIG. 1C3 shows a shows a device having a tricurve profile to fit sclera with slopes of the curved profiles aligned so as to inhibit ridges at the boundaries of the curved portions as in FIG. 1B2 and having a layer of silicone or hydrogel material on a lower surface, in accordance with embodiments of the present invention.

FIG. 1C4 shows a plan view device having a tricurve profile to fit the cornea, limbus, and sclera with slopes of the curved profiles aligned so as to inhibit ridges at the boundaries of the curved portions as in FIG. 1B4 and having a silicone or hydrogel material on a lower surface extending less than a maximum distance across the device to engage the conjunctiva with the device away from the silicone or hydrogel material, in accordance with embodiments of the present invention.

FIG. 105 shows a fenestration having a posterior end covered with a layer of silicone or hydrogel extending along the posterior surface of the device, in accordance with embodiments of the present invention.

FIG. 106 shows a fenestration extending through a layer of silicone or hydrogel extending along the posterior surface of the device, in accordance with embodiments of the present invention.

FIG. 2A shows a device comprising a contact lens placed on the eye with the eyelids separated, in accordance with embodiments.

FIG. 2B shows a profile view of the device of FIG. 2A with the eyelids closing, in accordance with embodiments.

FIG. 2C shows a front view the device of FIG. 2A with the eyelids closing, in accordance with embodiments.

FIG. 2E shows a device comprising a contact lens placed on the eye such that the device is supported with an inner portion of the cornea and the conjunctiva with the device separated from an outer portion of the cornea so as to define a chamber when the eyelids are separated, in accordance with embodiments.

FIG. 2F shows a profile view of the device of FIG. 2E with the eyelids closing, in accordance with embodiments.

FIG. 2F1 shows a profile view of the device of FIG. 2F with rotation of the eye when the lids close such that sliding of the device along the epithelium is inhibited when tear liquid is pumped, in accordance with embodiments.

FIG. 2G shows a profile view of the device of FIG. 2E with the eyelids opening, in accordance with embodiments.

FIG. 2H shows a profile view of the device of FIG. 2E with the eyelids located at an intermediate location such that the chamber comprises an intermediate volume, in accordance with embodiments.

FIG. 2I shows a profile view of the device of FIG. 1C4 placed on the eye with silicone or hydrogel contacting the eye, in accordance with embodiments.

FIG. 5 shows a device in accordance with certain embodiments.

FIG. 7 shows a cross-sectional view of an ophthalmic device according to certain embodiments of the present disclosure.

FIG. 9A shows the average spherical lens corrected visual acuity (Log MAR) for a population of patients having eyes with 2.25DC to 3.00DC of uncorrected cylindrical error and wearing an ophthalmic lens provided by the present disclosure characterized by different thickness of the inner optical region.

FIG. 9B shows the percent of patients in a population of patients having a visual acuity of less than 20/25 or less than 20/20 when wearing ophthalmic lenses provided by the present disclosure having different thicknesses and where the patients have eyes with uncorrected cylindrical error of 2.25DC to 3.00DC.

FIG. 10A shows a comparison of the comfort score for patients wearing an ophthalmic lens provided by the present disclosure having different thicknesses of the inner optical portion compared to the comfort score for patients wearing commercially available toric contact lenses for astigmatic correction.

FIG. 10B shows histograms of the percent of patients having a comfort score equal to or greater than 8 and a comfort score equal to or greater than 9 after wearing an ophthalmic lens provided by the present disclosure with different inner optical region thickness for 30 minutes.

Figure 1:
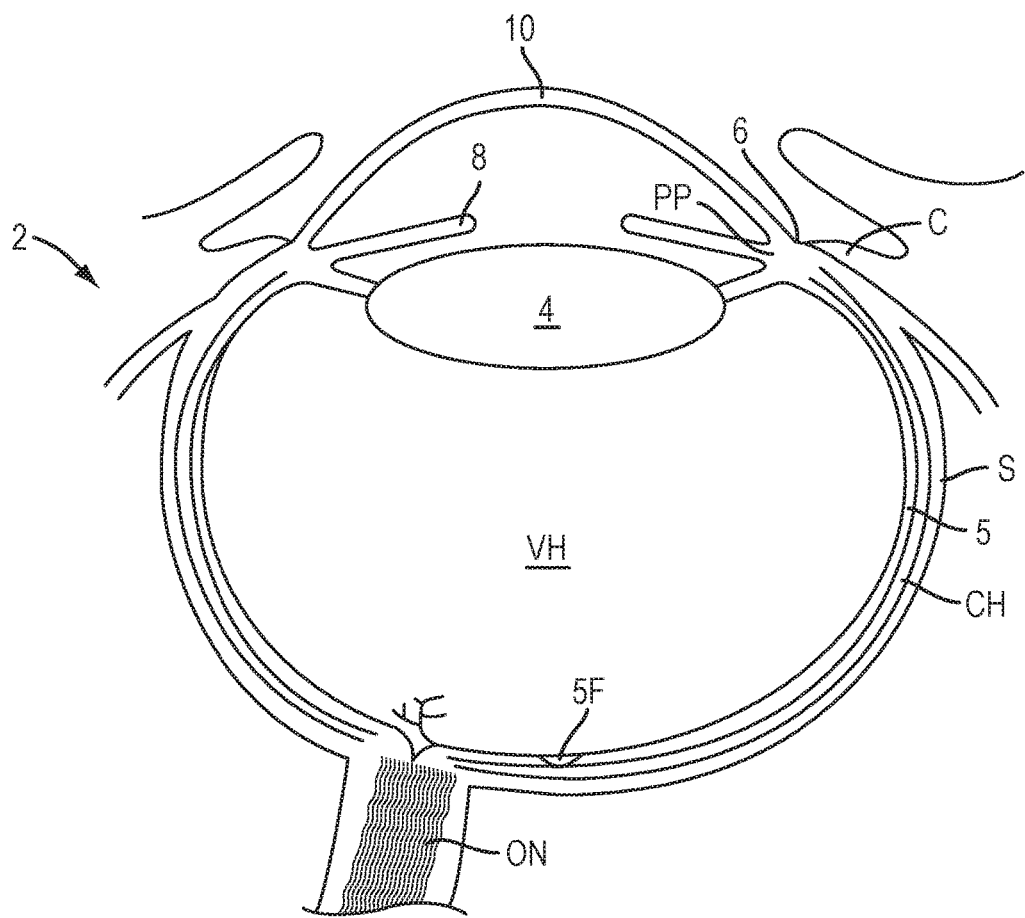
FIG. 1 shows an eye suitable for use with an ophthalmic device as described herein, in accordance with embodiments of the present invention.

Reference is now made in detail to embodiments provided by the present disclosure. The disclosed embodiments are not intended to be limiting of the claims.

DETAILED DESCRIPTION

Embodiments of the present invention as described herein can be combined with a therapeutic e device for pain management and vision as described in U.S. Publication No. 2010/0036488, the full disclosure of which is incorporated by reference and is suitable for combination in accordance with some embodiments of the present invention as described herein.

An ophthalmic device or device encompasses both ophthalmic coverings and ophthalmic lenses. As used herein, a covering is used to refer to an ophthalmic device that covers an eye of a patient and that does not by itself provide refractive vision correction. Ophthalmic devices that provide refractive correction are referred to herein as contact lenses or ophthalmic lenses. A lens may include certain features as disclosed herein for coverings and coverings may include certain features as disclosed herein for lenses.

Certain embodiments described herein can be used to treat eyes in many ways with a device such as a contact lens. A device described herein can be used for long term vision correction with extended wear contact lenses that inhibit swelling of the cornea when the device is positioned on the eye for an extended period, and may also be combined with many forms of ocular surgery, such as photorefractive keratectomy. Certain embodiments of the present disclosure may be use to correct refractive error.

As used herein, mathematical equations and scientific notation can be used to identify values in many ways understood by a person of ordinary skill in the art, for example so as to express data in accordance with notations used in many commercially available spreadsheets such as Excel™ commercially available from Microsoft. As used herein the symbol "E" can be used to express an exponent in base 10, such that 1E1 equals about 10, 2E1 equals about 20, and 4E2 equals about 400. As used herein the symbol "^" can be used to express an exponent, such that A^B equals $A^B$. Units can be expressed in many ways and as would be understood by a person of ordinary skill in the art, for example "m" as meters, "Pa" as the Pascal unit for pressure, "MPa" as Mega Pascal.

As used herein, a siloxane bond encompasses a covalent —Si—O—Si— bond, for example of a silicone elastomer.

As used herein, an on K fit of a device such as a contact lens encompasses fitting the contact lens to the flattest meridian of the cornea and the on K fit can be flatter than the flattest meridian within about 1.5 D. For example, for a cornea having keratometer values (hereinafter "K's") of about 44 D axis 90 and 43 D axis 180, the on K fit would provide a device having a curvature corresponding to an optical power within a range from about 43 D to about 41.5 D for the region of the eye measured. The on K fit as described herein can allow for tear liquid to form under the device such that the tear liquid can be pumped in accordance with embodiments as described herein.

The optical power of the cornea in Diopters ("D") can be related to the radius R of curvature of the cornea with the formula D=(1.3375−1)/R, where 1.3375 corresponds to the index of refraction of the aqueous humora. The curvature of the cornea is inversely related to the radius of curvature R such that as the radius of curvature increases the curvature of the cornea decreases and such that as the radius of curvature decreases, the curvature of the cornea increases.

As used herein the terms outer portion of a lens and peripheral portion of a lens are used interchangeably. The outer or peripheral portion is disposed radially around and connected to the inner portion of a covering or lens. In general, the outer or peripheral portion tapers from a thickness at the interface with the inner portion toward the outer or peripheral edge of the covering or lens. The outer or peripheral portion may be further characterized by sub-portions characterized by, for example, different radii of curvature, thickness, rigidity, and material. The sub-portions may be configured radially around the center optic porition. Furthermore, the outer or peripheral portion is typically disposed outside the optical region of the cornea with the covering or lens centered on the cornea of an eye. The inner portion is also referred to herein as the inner or optical component or button. The outer portion is also referred to herein as the outer or coupling component.

FIG. 1 shows an eye 2 suitable for use with the device 100 (not shown) as described herein. In certain embodiments, device 100 comprises a contact lens. The eye has a cornea 10 and a lens 4 configured to form an image on the retina 5, and the image can form on a fovea 5F corresponding to high visual acuity. The cornea can extend to a limbus 6 of the eye, and the limbus can connect to a sclera S of the eye. The eye 2 has a pars plana PP located near limbus 6. A conjunctiva C of the eye can be disposed over the sclera. The lens can accommodate to focus on an object seen by the patient. The eye has an iris 8 that defines a pupil 9 that may expand and contract in response to light. The eye also comprises a choroid CH disposed the between the sclera 7 and the retina 5. The eye has a vitreous humor VH extending between the lens and the retina. The retina 5 senses light of the image and converts the light image to neural pulses that are processed and transmitted along an optic nerve ON to the brain of the patient.

Figures 1, 1A:
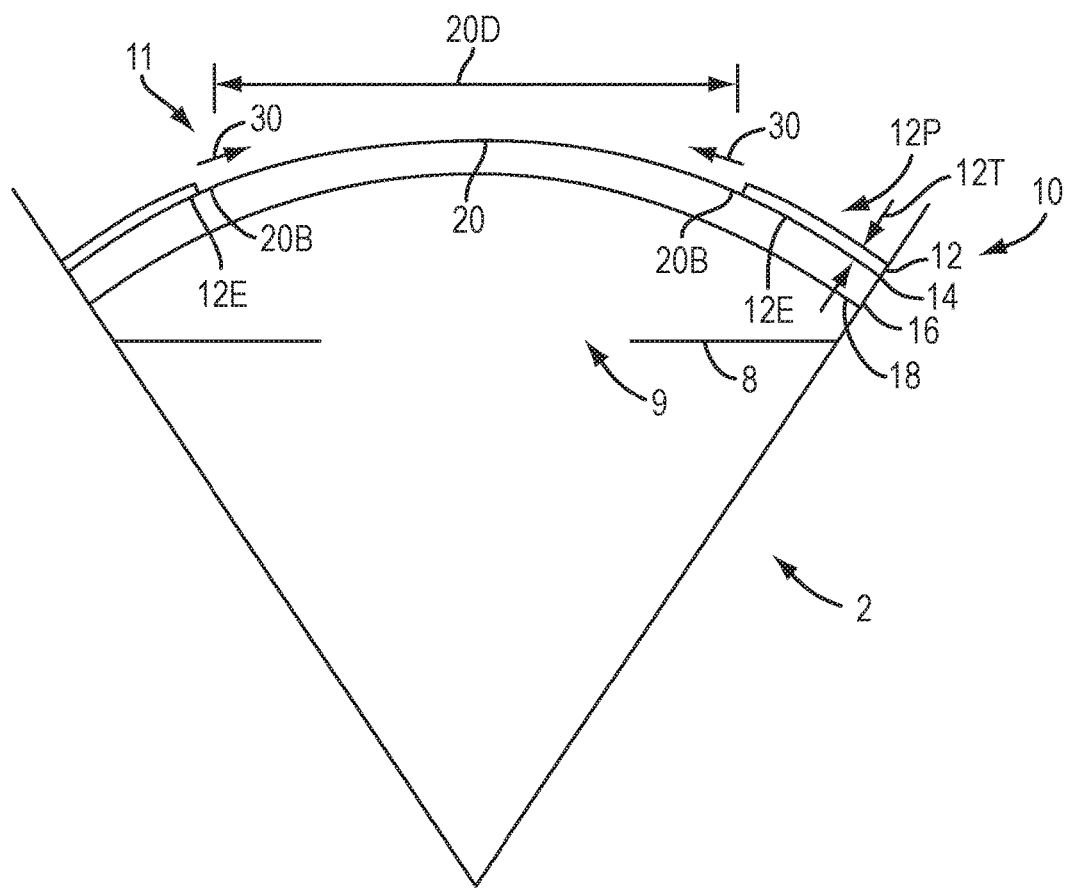

FIG. 1-1A shows an ablated eye immediately following refractive surgery, for example PRK surgery resulting in an epithelial defect. The device comprising a contact lens as described herein can be placed over the ablated cornea and coupled to the conjunctiva to provide improved vision. The eye 2 comprises an iris 8 that defines a pupil 9, through which light passes such that the patient can see. Cornea 10 includes an epithelium 12 disposed over a stroma 16. The epithelium 12 comprises a thickness 12T that can be about 50 μm. A tear liquid covers the anterior surface of epithelium 12. In at least humans, primates and some birds, a Bowman's membrane 14 is disposed between epithelium 12 and stroma 16. Bowman's membrane 14 comprises an acellular substantially collagenous tissue with a thickness of about 5 to 10 microns. Stroma 16 comprises a substantially collagenous tissue with keratocytes disposed therein. In some animals, Bowman's membrane may be absent and the epithelium may be disposed adjacent to the stromal layer. An endothelium 18 is disposed under stroma 16. Endothelium 18 comprises a layer of cells that pump water from cornea 10 toward iris 8. Tear liquid also covers surfaces of the cornea that are exposed by the epithelial defect, such as an exposed surface of Bowman's membrane and an exposed stromal surface.

With refractive surgery, for example PRK, the epithelium can be removed to ablate a refractive correction into Bowman's membrane 14 and/or stroma 16. An initial profile of the anterior surface of stroma and/or Bowman's membrane is ablated to an ablated profile 20 to correct the patient's vision. The profile of tissue removed to correct vision is described in U.S. Pat. No. 5,163,934, entitled "Photorefractive keratectomy", the disclosure of which may be suitable for combination in accordance with some embodiments of the present invention described herein. Ablated profile 20 generally comprises an optical zone that extends across the cornea to correct refractive error of the eye and may correct aberrations of the eye, for example wavefront aberrations. Ablated profile 20 is bounded by boundary 20B that may circumscribe the ablated profile. The ablation profile 20 comprises a maximum dimension across, for example a diameter 20D.

The epithelium may comprise an inner boundary that moves centripetally inward as indicated by arrows 30.

In certain embodiments as described herein, irregularities of the cornea are decreased when the epithelium regenerates so as to provide one or more of improved vision or comfort. The devices as described herein can be configured so as to decrease an effect on vision of corneal irregularities.

FIG. 1A1 shows device 100 positioned on a blinking eye. An upper lid and a lower lid can blink over the eye. Work in relation to embodiments suggests that the upper lid can exert a downward movement 22A and that the lower lid can exert an upper movement 22B on the eye. The downward movement 22A can be greater than the upper movement 22B. The wettable coating material as described herein can decrease force and movement transferred from the lids to the device so as to inhibit motion of the device.

FIG. 1A2 shows the device of FIG. 1A1 that is capable of pumping tear liquid under the device. The device 100 has inner portion 110 and outer portion 120, and fenestrations 100F extending through the thickness of the device on the outer portion so as to allow tear liquid TL to move through the device, which may comprise a medicament. The medicament may comprise an anesthetic, an analgesic, or other medication, for example.

The device 100 comprises an optical component 100A and a coupling component 100B. The optical component 100A may comprise an inner portion 110 of device 100 and the coupling component 100B may comprise an outer portion 120 of device 100. The optical component 100A comprises rigidity sufficient to resist deformation such that the optical component 100 can correction vision of the eye. The optical component 100A may comprise a single layer of material, or a plurality of layers of materials. The coupling component 100B may comprise a rigidity less than optical component 100A, such that the coupling component can one or more of deflect or elastically deform so as to conform to the cornea when covered with the eyelid. The coupling component 100B may comprise an inner component 100B1 to couple to the optical component, an outer portion 100B3 to couple to the sclera, and an intermediate portion 100B2. The intermediate portion 100B2 can extend between the inner component 100B1 and the outer component 100B3 so as define a chamber when placed on the eye.

The optical component 100A and the coupling component 100B can pump tear liquid to the cornea when the eye closes and opens, for example when the eye blinks. The outer component 100B comprising outer portion 120 may comprise fenestrations 100F. For example, the intermediate portion 100B2 may comprise fenestrations 100F. The outer portion 120 may comprise outer portion 100B3 comprising a sclera coupling portion 130 to contact the conjunctiva over the sclera and peripheral portion 120P. The sclera coupling portion 130 may comprise a thin flange portion extending to the peripheral portion 120P. The sclera coupling portion may comprise a thin elastic portion capable of elastic deformation when the eye blinks to allow the optical component to move downward. Alternatively or in combination, the outer portion 120 may comprise a rigidity sufficient to deflect when the eye blinks.

FIG. 1A3 shows a schematic illustration of the device of FIGS. 1A1 and 1A2 pumping tear liquid when the eye closes, in accordance with certain embodiments of the present invention.

When placed on the eye, the device 100 can define a chamber with the lower surface of the device extending along the cornea, the limbus and conjunctiva over the sclera. When the eyelids are separated, the device 100 is held loosely on the eye with slight pressure from the eyelids extending under the outer portion of the device. When the eye blinks, the lids extend over the outer portion 120 of the device and inner portion 110 so as to exert pressure on the device such that the device is urged downward toward the cornea and the volume of the chamber under the device is decreased. The downward movement of the optical component 100A of the inner portion 110 of the device 100 can move the device downward so as to pass pumped tear liquid 100TL through the fenestrations, and in certain embodiments the pumped tear liquid 100TL can pass under the peripheral portion 120P.

FIG. 1A4 shows a schematic illustration of the device of FIGS. 1A1 and 1A2 pumping tear liquid when the eye opens, in accordance with embodiments of the present invention.

When the eyelids open, the pressure on the device is decreased, such that the device can move away from the cornea and increase the volume of the chamber. The movement of the optical portion 100A away from the cornea can draw pumped tear liquid 100TL into the device through the fenestrations, and contact of the peripheral portion 120P and sclera coupling portion 130 with the conjunctiva can inhibit flow of tear liquid under the peripheral portion 120P. In certain embodiments, the peripheral portion 120P and sclera coupling portion 130 can contact the conjunctiva so as to form a seal when the eyelids open and the optical portion 100A moves away from the cornea.

The fenestrations 100F can be located away from the optical component, for example about 3.5 mm to about 4.5 mm from a center of the optical component to decrease optical artifacts of the fenestrations 100F. However, the fenestrations may be located within the optical component when of a sufficiently small diameter and sufficiently few so as to not produce perceptible visual artifacts. The fenestrations may comprise a pattern to indicate the orientation of the device 100 on the cornea. For example, the upper fenestrations and lower fenestrations may indicate a 90 degree axis on the patient and horizontal fenestrations can be provided to indicate the location of the 180 degree axis on the eye of the patient. The fenestrations may comprise additional fenestrations to be located inferiorly to indicate that the device is not flipped by 180 degrees on the patient, for example upside down. The additional inferior fenestrations may also couple to the rivulet comprising tear liquid that forms near the lower lid, so as to facilitate pumping of tear liquid. For example, when the eye blinks the lower lid may extend over the inferior fenestrations and the upper lid may extend downward to couple to the lower rivulet. When the eye opens and the eyelids separate the upper eyelid can draw tear liquid of the rivulet over the upper fenestration and the lower eyelid can move inferiorly so as to pass the rivulet over the inferior rivulets.

A device may comprise one or more of many optically clear materials, for example synthetic materials or natural material such as collagen-based materials, and combinations thereof, such as described in U.S. Publication No. U.S. 2010/0036488. For example, a device may comprise a naturally occurring material, such as collagen-based material. Alternatively or in combination, a device material may comprise a known synthetic material, for example hydroxyethyl methacrylate (HEMA) hydrogel, hydrogel, silicone hydrogel, silicone, for example hydrated silicone and derivatives thereof. For example, the optically clear material may comprise one or more of silicone, silicone hydrogel, silicone comprising resin, silicone comprising silicate, acrylate, collagen, or a combination of any of the foregoing. The cured silicone may comprise silicone that is two-part, heat-curable and RTV (room temperature vulcanized). For example, polydimethyl siloxane such as NuSil, or poly(dimethyl)(diphenyl) siloxane may be used to mold the device, for example with less than 10% water content so as to increase oxygen diffusion through the device. A device may comprise perfluoropolyethers or fluorofocal. The material may comprise, for example, silicone elastomer having optically clear silicate disposed therein and a water content of no more than about 10%, for example no more than about 5%, or no more than about 1%, such that the device has a very high Dk exceeding $150 \times 10^{-11}$ and in certain embodiments exceeding $300 \times 10^{-11}$, and the silicone lens comprising silicate can be treated to provide a wettable surface. A device may comprise hydrogel, for example silicone hydrogel, or silicone and can be formed with a water content within a range from about 5% to about 35% and a modulus within a range or a combination of ranges from about 0.1 MPa to about 40 MPa, such that the device conforms at least partially to the anterior surface of the cornea. In certain embodiments, devices provided by the present disclosure do not contain water and provide a barrier for the flow of fluid across the device. For example, when applied to the cornea, devices minimize or prevent the flow of fluid from the cornea and the flow of fluid such as tea fluid from the outer surface of the device to the cornea. The devices provide a fluid seal and the material or materials forming a device are selected to minimize or prevent moisture transport across the device thickness.

In certain embodiments, the materials forming devices provided by the present disclosure are characterized by a high oxygen permeability (Dk, $cm^2 \cdot mL\ O_2/sec \cdot mL \cdot mm\ Hg$) such as from $100 \times 10^{-11}$ to $500 \times 10^{-11}$, from $200 \times 10^{-11}$ to $500 \times 10^{-11}$, from $250 \times 10^{-11}$ to $450 \times 10^{-11}$, from $300 \times 10^{-11}$ to $400 \times 10^{-11}$, and in certain embodiments, about 350. In certain embodiments, devices provided by the present disclosure are characterized by a high oxygen permeability (Dk) such as at least about $250 \times 10^{-11}$, at least about $300 \times 10^{-11}$, at least about $350 \times 10^{-11}$, and in certain embodiments, at least about $400 \times 10^{-11}$.

A device may comprise silicone or silicone hydrogel having a low ionoporosity. For example, a device may comprise silicone hydrogel or silicone comprising a low ion permeability, and the range of water can be from about 5% to about 35%, such that the Dk is $100 \times 10^{-11}$ or more. In certain embodiments, the low ion permeability may comprise an Ionoton Ion Permeability Coefficient of no more than about $0.25 \times 10^{-3}\ cm^2/sec$, for example no more than about $0.08 \times 10^{-3}\ cm^2/sec$. In certain embodiments, the low ion permeability comprises an Ionoton Ion Permeability Coefficient of no more than about $2.6 \times 10^{-6}\ mm^2/min$, for example no more than about $1.5 \times 10^{-6}\ mm^2/min$.

A device 100 may comprise a wettable surface coating 134 disposed on at least the upper side (anterior surface) of the device, such that the tear film of the patient is smooth over the device and the patient can see. The wettable surface coating may comprise a lubricious coating for patient comfort, for example to lubricate the eye when the patient blinks. The wettable coating may comprise a contact angle no more than about 80 degrees. For example, the coating may comprise a contact angle no more than about 70 degrees, and the contact angle can be within a range from about 55 to 65 degrees to provide a surface with a smooth tear layer for vision. For example, the wettable coating can be disposed both an upper surface and a lower surface of the device. The upper surface may comprise the wettable coating extending over at least the inner portion 110.

A wettable coating 134 may comprise one or more of many materials. For example, the wettable coating 134 may comprise polyethylene glycol (PEG), and the PEG coating can be disposed on Parylene™. Alternatively, the wettable coating 134 may comprise a plasma coating, and the plasma coating may comprise a luminous chemical vapor deposition (LCVD) film. For example, the plasma coating comprises at least one of a hydrocarbon, for example $CH_4$, $O_2$ or fluorine containing hydrocarbon, for example $CF_4$ coating. Alternatively or in combination, the wettable coating may comprise a polyethylene glycol (PEG) coating or 2-hydroxyethyl-methacrylate (HEMA). For example, the wettable coating may comprise HEMA disposed on a Parylene™ coating, or the wettable coating may comprise N-vinylpyrrolidone (NVP) disposed on a Parylene™ coating.

The device 100 may comprise a base radius R1 of curvature corresponding to a curvature of a central portion of the cornea. The device 100 comprises a first configuration 100C1 when placed on the cornea and the eyelids are spaced apart and a second configuration 100C2 when placed on the cornea and the blinks such that the eyelids. The first configuration 100C1 and the second configuration 100C2 pump tear liquid under the device 100.

The device 100 may comprise a lower surface corresponding to one or more of many suitable shapes to fit the device to the cornea, such as a natural unablated cornea or an ablated cornea following refractive surgery such as PRK. The lower surface of the inner portion 110 of the device 100 may correspond to base radius of curvature. With post-ablation corneas, the device can resist deformation and smooth the epithelium over about 3 mm and may deflect so as conform substantially to the ablated cornea over a larger dimension such as 6 mm. The device may comprise a second curve in combination with a first curve, such that the lower surface comprises a bicurve surface. Alternatively, the lower surface may correspond to an aspheric surface. For example an aspheric surface may comprise an oblate shape and conic constant to fit a post PRK eye. The curved and aspheric surfaces as described herein can fit non-ablated eyes and the device can be selected by based on the curvature of an un-ablated central region of the cornea. Also, it may be helpful to identity a device that fits the cornea, for example with selection of one device from a plurality of sizes.

A device 100 may comprise an inner portion 110 having an optical component 1 100A. The optical component 100A may comprise an inner portion 110 of the device 100. The optical component may have a modulus within a range from about 5 MPa to about 40 MPa, and a thickness within a range from about 100 μm to about 300 μm such that the central portion can have sufficient rigidity to resist deformation and smooth irregularities and correct vision. A device may comprise an elastomeric stretchable material such that the device can stretch to fit the cornea, for example. A device having the modulus within a range from about 4 MPa to about 40 MPa can be formed in many ways as described herein. For example, the device may comprise a single piece of material having a non-uniform thickness extending across the cornea. A device can be shaped in many ways and may comprise a single piece of one material, or may comprise a single piece composed of two similar materials, or may comprise a plurality of materials joined together.

FIG. 1B1 shows device 100 having a tricurve profile to fit a sclera and cornea. The tricurve profile can be used to fit an unablated natural eye, in which the base curvature R1 corresponds to the optically used central portion of the cornea. For ablated corneas, the base curvature R1 may correspond to the ablated cornea. The tricurve device may comprise an inner portion with an inner lower surface having radius of curvature R1 and an outer portion comprising an outer lower surface having radius of curvature R1B. The outer portion 130 may comprise the sclera coupling portion 130 having a third radius of curvature R1C sized to fit the conjunctiva located over the sclera and contact the conjunctiva so as to inhibit sliding movement of inner portion 110. Work in relation to embodiments suggests that coupling to the sclera may improve alignment of the lens on the cornea.

The device 100 having the tricurve profile may comprise dimensions sized to fit the cornea and sclera of the eye 2. The device 100 having the at least a tricurve profile may comprise an inner portion 110 and an outer portion 120 as described herein. The outer portion 120 may comprise the third sclera coupling portion 130 having curvature R1C shaped to fit the sclera of the eye, for example shaped so as to contact the conjunctiva of the eye such that the conjunctiva is located between the sclera and the sclera coupling portion 130. The inner portion 110 may comprise a dimension 102 and the outer portion 120 may comprise a dimension 104 as described herein. The device 100 may comprise a sag height 105 extending between an upper location of the inner portion 110 and the outer boundary of outer portion 120 shaped to fit the cornea. The sclera coupling portion 130 may comprise a dimension across 103.

The dimension 102, the dimension 104, the dimension 103, the dimension 105 and the dimension 105S can be sized to the eye based on measurements of the eye. The dimension 103 may correspond to an annular region of the sclera extending from the limbus to the outer boundary of the sclera coupling portion across a distance within a range from about 1 to 4 mm, for example within a range from about 1.5 to 2 mm. The size of the limbus of the eye can be measured so as to correspond to dimension 104, for example, and can be within a range from about 11 to 13 mm. The dimension 105 may correspond to a height of the eye from the vertex of the cornea to the limbus, and the dimension 105S may correspond to the sag height were the outer location of the device couples to the conjunctiva device the sclera.

The dimension 102 may correspond to an inner region of the natural cornea or the dimension across an ablation. Dimension 102 may correspond to the more rigid inner portion 110 can be sized about 0.5 to about 2 mm less than the dimension across the ablation zone, such that the soft and less rigid outer portion 120 contacts the eye near the edge of the ablation and the epithelial debridement.

The radius of curvature R1C of portion 130 can be determined so as to fit the eye, and can be within a range from about 12 mm±3 mm. The radius R1B of the outer portion can be fit to within about ±0.5 mm, for example to within about ±0.25 mm.

The dimensions of the device 100 can be determined in many ways, for example with topography measurements of the cornea and sclera. The corneal and scleral topography can be measured with many instruments, such as with the Orbscan™ topography system commercially available from Bausch and Lomb, and the Pentacam™ Scheimpflug camera system commercially available from Oculus, and commercially available optical coherence tomography (OCT). The ablation profile can be combined with the topography to determine the shape of the eye.

The dimensions of device 100 can be sized to one or more of the cornea and sclera based on tolerances that may be determined clinically.

The outer portion 120 and sclera coupling portion 130 may comprise a silicone or hydrogel material, for example a silicone or silicone hydrogel material, and the inner portion 110 may comprise the rigid material 110M, for example second layer 110L2 and second material 110M2 between first layer 110L1 of first material 110M1 and third layer 110L3 of third material 110M3 as described herein.

The portions of devices as described herein, for example the inner portion and the outer portion, may comprise a junction wherein a first portion connects with a second portion, and the junction may have the modulus as described herein. A device may comprise a contact lens having a central lens portion having a center stiffness of at least about 2 psi-mm$^2$ coupled to an outer lenticular junction portion having a lenticular junction stiffness of at least about 5 psi-mm$^2$.

FIG. 1B2 shows device 100 having a tricurve profile to fit sclera with slopes of the curved profiles aligned so as to inhibit ridges at the boundaries of the curved portions, in accordance with embodiments of the present invention. An inner portion 110 comprises the optical component 100A and the outer portion 120 comprises the coupling component 100B. A coupling component 100B may comprise a thin layer of material 120M extending under the optical component 100A for improved comfort and support of the optical component. An outer portion 120 comprising coupling component 100B may comprise fenestrations 100F as described herein. An inner portion 120 comprises first radius R1 along the lower surface and a first anterior radius R1A along the upper surface. An outer portion 120 couples to the inner portion with a second radius R1B aligned with the first radius R1A at a boundary corresponding to dimension 102. The outer portion 120 has a second anterior radius R1BA extending along the anterior surface. The outer portion 120 comprising second radius R1B along the lower surface to contact the cornea may couple to sclera coupling portion 130 at a location corresponding to the limbus of the eye, for example along a boundary corresponding to dimension 104. Work in relation to embodiments suggests that formation of a ridge near the boundary of the cornea contacting portion and sclera coupling portion may decrease epithelial cell migration somewhat more than would be ideal, and the alignment of the curved profiles to inhibit ridge formation can provide a smooth transition over the limbus and may decrease mechanical pressure to the limbus. The sclera contacting portion 130 comprises an upper surface having an anterior radius of curvature R1CA.

The inner portion 110 can be curved to fit an ablated eye or a non-ablated eye. The modulus and thickness of the sclera coupling portion can be configured in many ways to fit may eyes with comfort and so as to resist movement of the inner portion 120. The modulus of sclera coupling portion 130 may be no more than about 5 MPa and the thickness no more than about 200 μm, for example no more than 100 μm, so as to stretch substantially for comfort and resist movement of the inner portion when the placed on the sclera.

The dimension 103 of sclera coupling portion 130 may correspond to an annular region of the sclera extending from the limbus to the outer boundary of the sclera coupling portion across a distance within a range from about 1 to 4 mm, such that the dimension 103 can be from about 12 mm to about 16 mm, for example from about 14 mm to about 16 mm.

The radius of curvature R1C, thickness and modulus of the portion 130 can be configured so as to fit the eye to resist movement of inner portion 110 and with comfort. The radius of curvature R1C can be sized less than the radius of curvature of the sclera and conjunctiva. For example, the radius of curvature R1C can be no more than about 10 mm, for example no more than about 9 mm when the curvature of the sclera portion of the eye is at least about 12 mm for example. The third relative rigidity may comprise no more than about 4E-5 Pa-m$^3$ so as to stretch substantially for comfort and resist movement of the inner portion when the outer portion is placed on the sclera.

The thickness of the sclera coupling portion having radius of curvature R1C can vary, for example from a thickness of about 100 μm to a tapered edge.

FIG. 1B2-1 shows alignment of the slope of the lower surface of the corneal contacting portion comprising second radius R1B with the slope of the lower surface of the sclera coupling portion 130 comprising radius R1C, such that pressure to the limbus is decreased substantially. The second slope corresponding to second radius R1B is given by a height R1BY and a length R1BX, and the third slope corresponding to third radius R1C is given by height R1CY and width R1CX. The second slope is aligned with the third slope such that no substantial ridge is formed at the location corresponding to the limbus. For example, the first slope can be substantially equal to the second slope. The slope of the inner portion 110 can be aligned with the slope of the second portion 120 at a location corresponding to dimension 102 in a similar manner.

FIG. 1B3 shows a tapered edge of the device of FIG. 1B1 having a tricurve profile to fit sclera and cornea. The sclera coupling portion 130 may comprise a flange 120F having a narrowing taper extending a distance 120FW to a chamfer 120FE. The chamfer 120FE can be defined along an outer rim where a first convexly curved lower surface joins a second convexly curved upper surface. The convex surfaces along the outer rim allow the device to slide along the conjunctiva and the narrowing taper permits the sclera coupling portion of the device to stretch substantially and couple to the sclera and conjunctiva with decreased resistance for comfort.

The dimensions of the device 100 can be determined in many ways, for example with one or more topography measurements or tomography measurements of the cornea and sclera. The corneal and sclera topography can be measured with many instruments, such as with the Orbscan™ topography system commercially available from Bausch and Lomb, and the Pentacam™ Scheimpflug camera system commercially available from Oculus. The tomography can be measured with optical coherence tomography (hereinafter "OCT") so as to determine the sag height of the limbus and conjunctiva, for example with OCT measurement systems commercially available from Zeiss/Humphrey. The ablation profile can be combined with the topography to determine the shape of the eye.

FIG. 1B4 shows a plan view device 100 having a multi-curve profile to fit the cornea, limbus and sclera with slopes of the curved profiles aligned so as to inhibit ridges at the boundaries of the curved portions, in accordance with embodiments of the present invention. The device 100 comprises fenestrations 100F and optical component 100A for vision correction and outer coupling component 100B that may pump tear liquid as described herein.

Figure 4A:
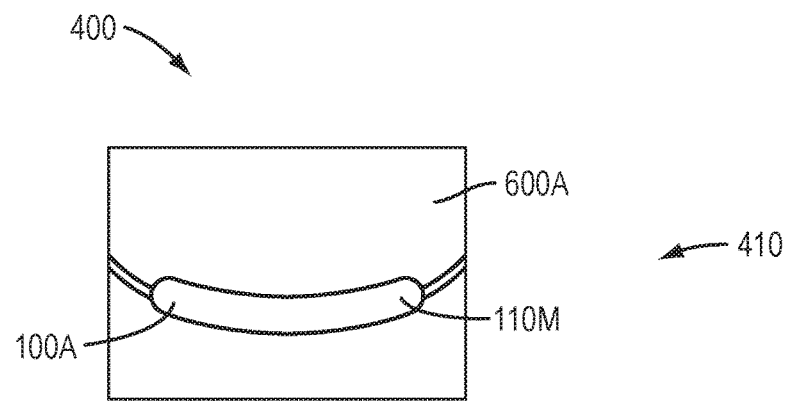
FIG. 4A shows a mold suitable to form an optical component of a device.
Figure 4B:
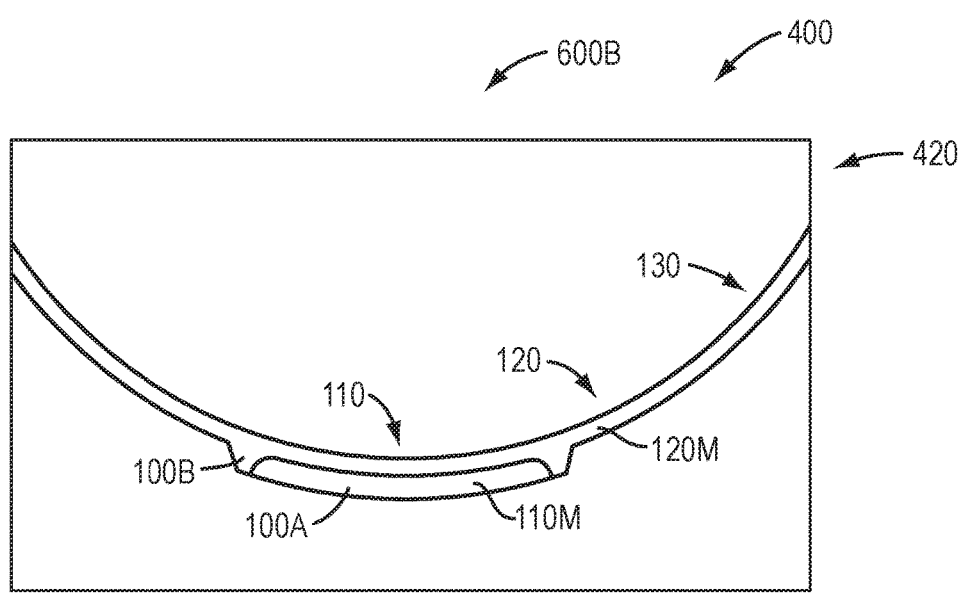
FIG. 4B shows a mold suitable to form a device comprising the optical component of FIG. 4A.
Figure 4C:
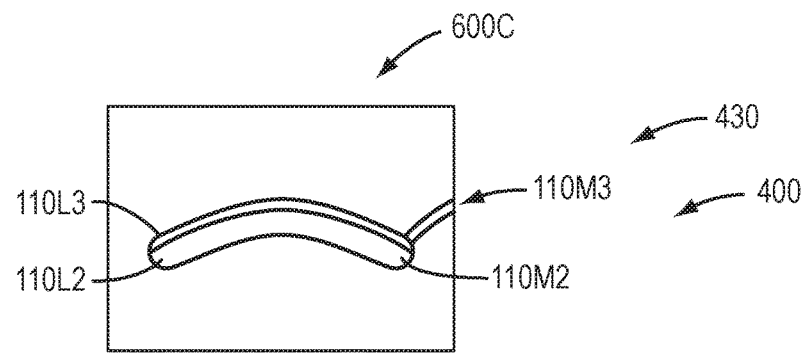
FIG. 4C shows a mold suitable to form a device comprising the optical component of FIG. 4A and a layer of a soft material of the device.
Figure 4D:
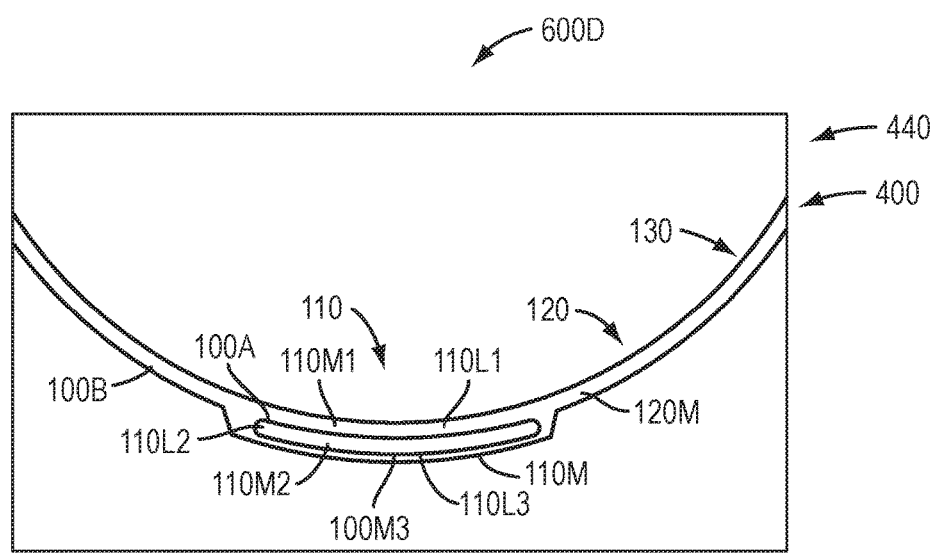
FIG. 4D shows a mold to form a device and having a solid inner material component comprising the rigid material placed therein prior to injection of a flowable material, in accordance with embodiments of the present invention.
Figure 4E:
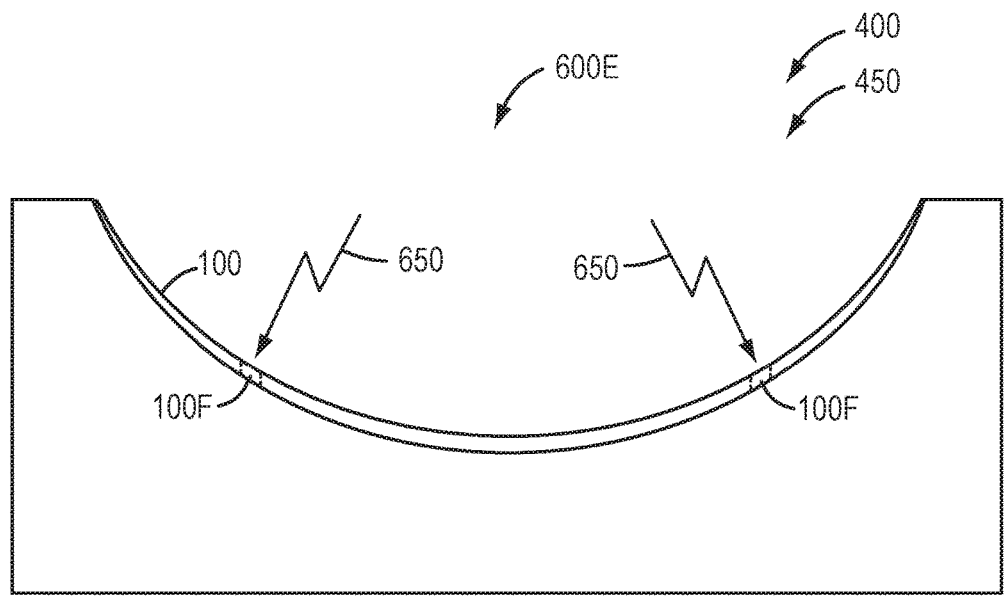
FIG. 4E shows formation of fenestrations in a device with energy, in accordance with embodiments of the present invention.
Figure 4F:
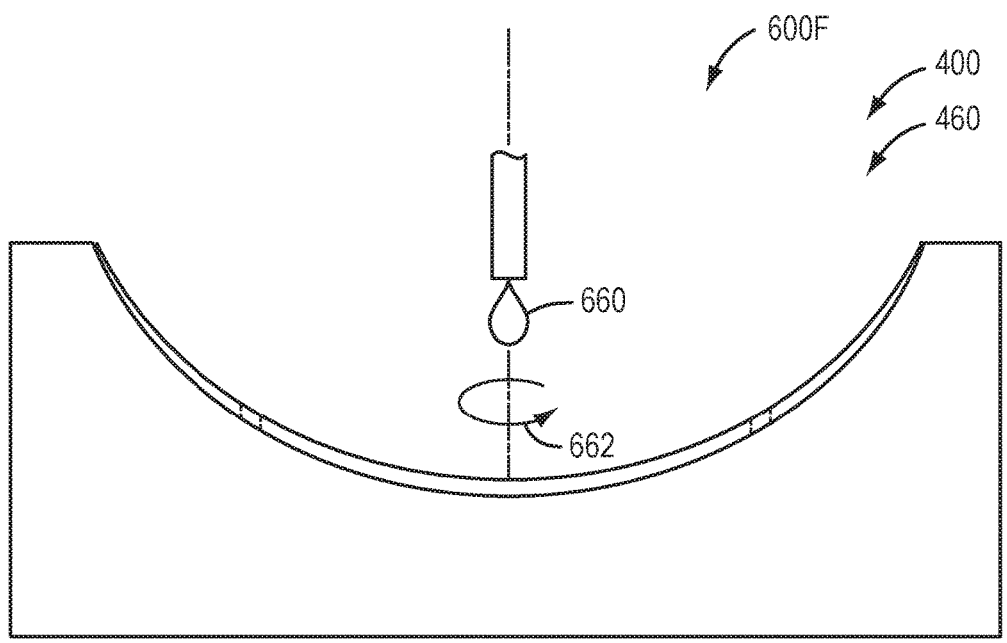
FIG. 4F shows spin coating of a silicone or hydrogel material on a posterior surface of the device, in accordance with embodiments of the present invention.
Figure 4G:
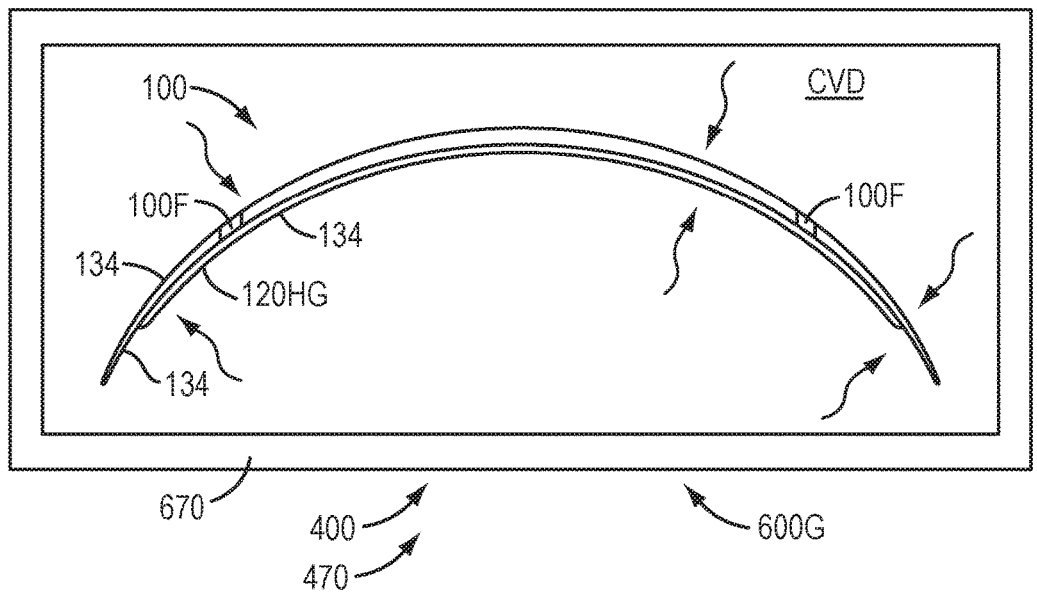
FIG. 4G shows chemical vapor deposition on the device having the silicone or hydrogel material formed thereon, in accordance with embodiments of the present invention.
Figure 4H:
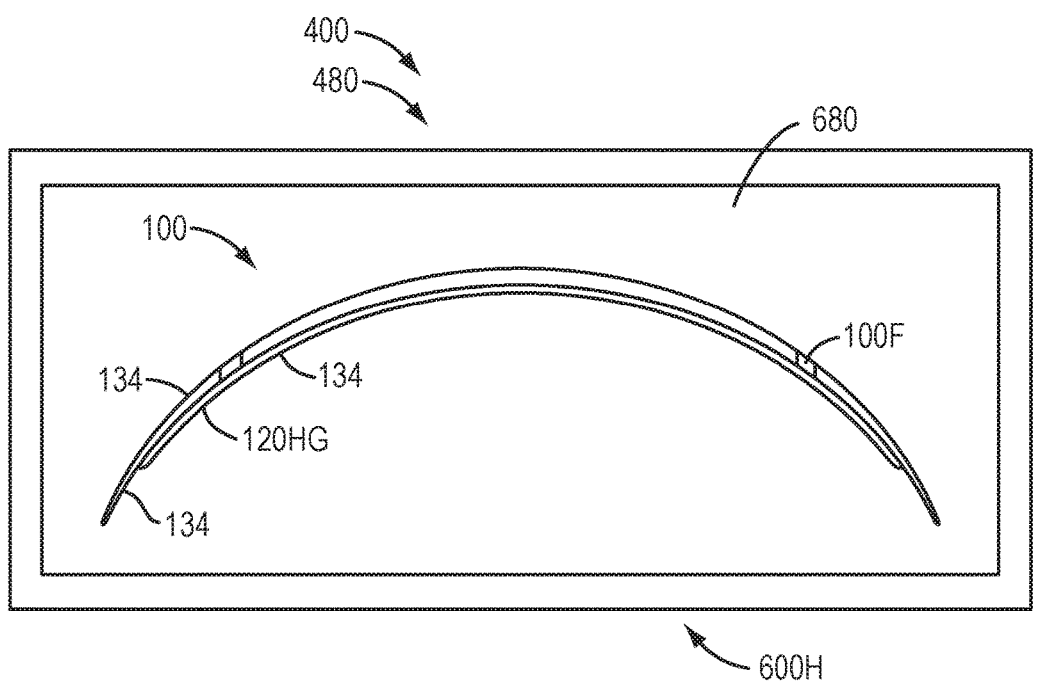
FIG. 4H shows a device comprising the silicone or hydrogel material packaged in a container, in accordance with embodiments of the present invention.
Figure 5:
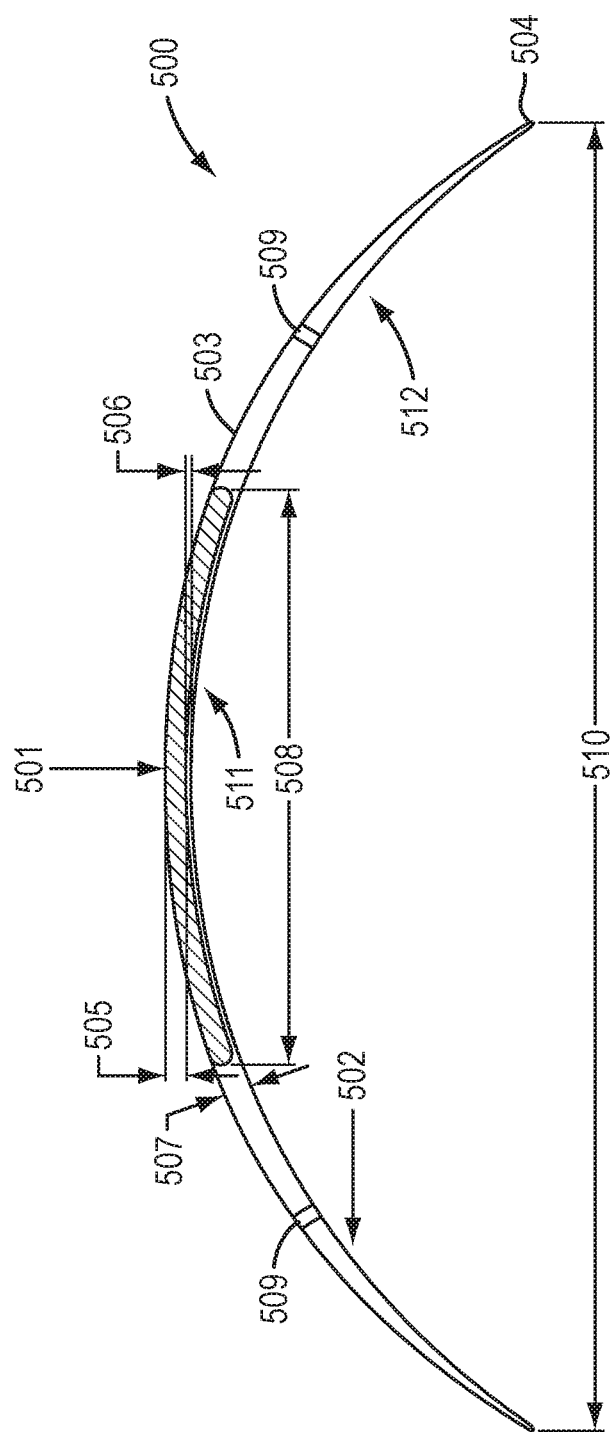

FIG. 1B5 shows a side sectional view of the device of FIG. 1B4 and corresponding curved portions to couple to the cornea, limbus, and sclera, in accordance with embodiments of the present invention.

The inner portion 110 comprises optical component 100A, which may comprise material 110M. The outer portion 120 comprises coupling component 100B, which may comprise outer material 120M. The inner portion 110 is coupled to the outer portion along a boundary corresponding to dimension 102. The lower surface of inner portion 110 has a shape profile corresponding to a first radius R1. The outer portion 120 couples to the inner portion with a first outer radius R1B1 of curvature, such that the slopes are aligned as described herein at a location corresponding to dimension 102. The outer portion 120 comprises a second outer radius R1B2 of curvature coupled to the first outer radius of curvature R1B1. The first outer radius R1B1 of curvature is coupled to the second outer radius R1B2 of curvature with the slopes aligned as described herein at a location corresponding to dimension 104A. The outer portion 120 comprises a third outer radius R1B3 of curvature coupled to the second outer radius of curvature R1B2. The second outer radius R1B2 of curvature is coupled to the third outer radius R1B3 of curvature with the slopes aligned as described herein at a location corresponding to dimension 104B.

The first outer radius of curvature R1B1, the second outer radius of curvature R1B2, and the third outer radius of curvature R1B3 may comprise values determined from a patient population. The first radius of curvature R1 may comprise a value determined based on the patient population. Alternatively or in combination, the first radius of curvature R1 may correspond to a post ablation profile.

The first outer radius of curvature R1B1, the second outer radius of curvature R1B2, and the third outer radius of curvature R1B3 can be combined or replaced with an aspheric surface such as a conic surface. The conic surface can be determined in accordance with the first outer radius of curvature R1B1, the second outer radius of curvature R1B2, and the third outer radius of curvature R1B3, such that the conic surface corresponds to values determined from a patient population.

The sclera coupling portion 130 may have a lower surface comprising a first sclera coupling radius R1C1 of curvature and a second sclera coupling portion having a second sclera coupling radius R1C2 of curvature. The first sclera coupling portion comprising radius R1C1 can be aligned to the third radius R1B3 at a location corresponding to dimension 104. The second sclera coupling portion comprising radius R1C2 can be aligned to the first sclera coupling portion having radius R1C1 at a location corresponding to dimension 120FW corresponding to an inner boundary of tapering flange 120F.

FIG. 1B6 shows a profile view of the device of FIG. 1B4 and corresponding curved portions of the upper surface, in accordance with embodiments of the present invention. The upper surface may comprise an inner anterior radius of curvature R1A, a first outer anterior radius of curvature R1B1A, a second outer anterior radius of curvature R1B2A. The sclera coupling portion 130 may comprise a first anterior radius R1C1A of curvature and a second anterior coupling radius R1C2A of curvature.

Figure 7:
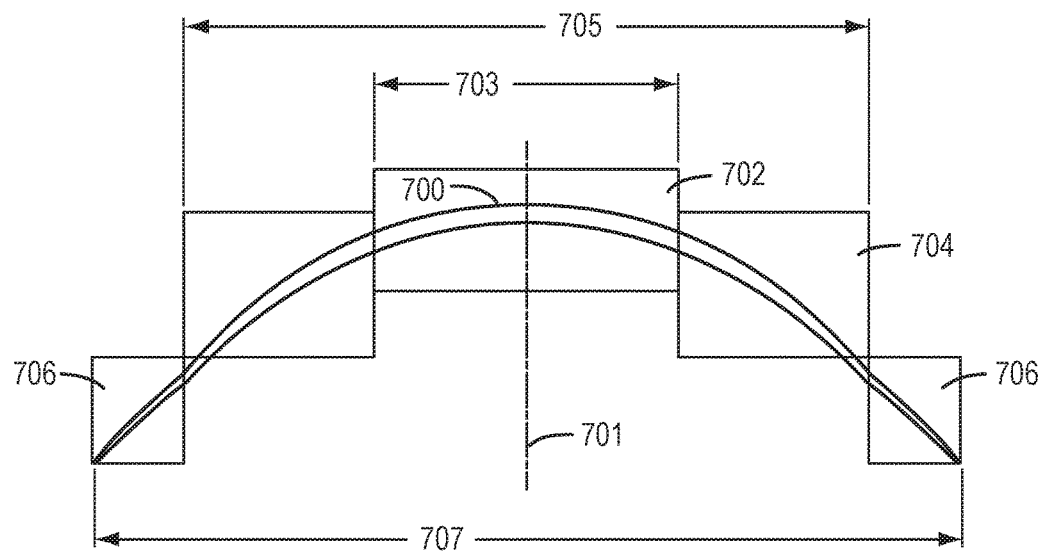

FIG. 1B7 shows a tapered edge of the device of FIG. 1B4, in accordance with embodiments of the present invention.

FIG. 1C shows device 100 comprising a device molded with a homogeneous material, in which the outer portion comprises a thickness configured to conform to the surface of the cornea and in which the inner portion 110 comprises a thickness configured to smooth the epithelium and cornea. The inner portion 110 comprises optical component 100A, and the outer portion 120 comprises coupling component 100B. The inner portion 110 may comprise a thickness of no more than about 300 microns, for example no more than about 200 microns. Many materials can be used as described herein, and the device may comprise one or more materials. For example, the device may comprise a single piece of material such as silicone having a water content within a range from about 0.1% to about 10%, for example no more than about 1%, and a hardness Shore A durometer parameter within a range from about 5 to about 90, for example within a range from about 40 to about 85.

FIG. 1C1 shows a device 100 having an inner portion 110 comprising an inner thickness and an inner material 110M and an outer portion 120 comprising an outer thickness and an outer material 120M, in which the inner thickness is greater than the outer thickness. The inner material 110M may comprise many materials and may comprise an optically clear silicone, for example silicone with resin. The inner material may comprise silicone positioned in a mold with the outer portion 120 formed around the inner portion. The inner portion may comprise a hardness similar to the outer portion. The outer material 120M of the outer portion 120 may comprise a material similar to the inner portion. For example the outer material 120M may comprise silicone and the inner material 110M may comprise silicone. This use of similar materials on the inner and outer portion can improve adhesion of the inner portion to the outer portion. The outer material 120M may extend along the inner portion 110, for example along the underside of the inner portion 110, such that the inner material 110M is held in a pocket of the outer material 120M. Alternatively, the inner material 110M may extend substantially across the thickness of the inner portion 110, such that the outer material 120M comprises a substantially annular shape with the inner material 110M comprising a disc shaped portion disposed within the annulus and extending substantially from the upper surface coating to the lower surface coating when present.

FIG. 1C2 shows device 100 having inner portion 110 comprising an inner thickness and inner material 110M and outer portion 120 comprising an outer thickness and outer material 120M, in which the inner thickness can be greater than the outer thickness and the outer material 120M extends around the inner material 110M. The inner portion 110 comprises the optical component 100A and the outer portion 120 comprises the coupling component 100B. The device 100 may comprise at least a bicurve device having at least a second radius R1B. The inner portion 110M may comprise three layers of material, a first layer 110L1 of a first material 110M1, a second layer 110L2 of a second material 110M2 and a third layer 110L3 of a third material 110M3. The second material 110M2 may comprise a rigid material, for example one or more of a rigid gas permeable material, a rigid silicone, or a rigid silicone acrylate. The first material 110M1 and the third material 110M3 may comprise a soft material, for example a soft elastomer, soft hydrogel, or soft silicone such as one or more of a soft optically clear silicone or a soft silicone hydrogel. The first material, the third material, and the outer material 120M may comprise similar materials, such that the second layer of rigid material 110M2 is encapsulated with the first soft material 110M1, the third soft material 110M3 and on the perimeter with the soft outer material 120M. In certain embodiments, the second rigid material 110M2 comprises a material similar to each of the first material 110M1, the third material 110M3 and the outer material 120M, for example each may comprise silicone, such that the corresponding portions of the device 100 can be bonded together with the silicone similar silicone elastomer material, for example. In certain embodiments, the device 100 can be formed in a mold with rigid second material 110M2 placed in the mold and encapsulated within a single piece of material comprising first material 110M1, third material 110M3 and outer material 120M, such that first material 110M1, third material 110M3 and outer material 120M comprise substantially the same material, for example silicone elastomer. The rigid second material 110M2 may comprise silicone bonded to each of first material 110M1, third material 110M3 and the outer material 120M, for example with curing such that first material 110M1, third material 110M3 and outer material 120M comprise the same soft silicone material bonded to the second material 110M2 comprising rigid silicone.

The soft material comprising soft outer portion 120 composed of soft material 120M, first layer 110L1 composed of soft material 110M1 and third layer 110L3 composed of soft material 120M3 can provide improved comfort and healing for the patient, and can extend the amount of time the device can be worn in the eye when combined with the fenestrations 100F and sclera coupling component 130 and peripheral portion 120P and flange 120F as described herein. The soft material can deflect, bend or indent so as to conform at least partially to the tissue of the eye when the rigid portion comprising rigid material 110M2 corrects vision of the patient. The dimension 102 across inner portion 110 can be sized to substantially cover one or more of the entrance pupil of the eye or ablation zone. With ablated eyes, the dimension 102 can be sized slightly smaller than the ablation dimensions, such as ablation diameter 20D, so that the epithelium can grow inward and contact the layer 110L1 of soft first material 110M1 without substantial disruption from the rigid material 120M2 when the inner portion 110M corrects vision with the layer of rigid material 110M2. The eyelid can also move over the third layer 110M3 for improved comfort. The soft first material 110M1 and soft third material 110M3 may comprise soft elastomer, soft hydrogel, or soft silicone, for example, and may each comprise the same material so as to encapsulate the second layer 110L2 of rigid second material 110M2.

The soft material comprising soft outer portion 120 composed of soft material 120M, first layer 110L1 composed of soft material 110M1 and third layer 110L3 composed of soft material 120M3 can have a modulus within a range from about 1 to 20 MPa, for example within a range from about 1 to 5 MPa.

The material inner material 120M and 120M2 of second layer 120L2 can have a modulus within a range from about 5 MPa to about 35 MPa or more, for example as set forth in Table A below. For example, when material 120M comprises silicone elastomer or layer 110L2 of material 120M2 comprises silicone elastomer, the modulus can be within a range from about 5 MPa to about 35 MPa, for example within a range from about 20 MPa to about 35 MPa.

The layers of device 100 can comprise dimensions so as to provide therapeutic benefit when placed on eye 2. The thickness of layer 110L1 can be from about 5 µm to about 50 µm, for example, within a range from about 10 µm to 30 µm, such that the layer 110L1 can provide a soft at least partially conformable material to receive the lens. The middle layer 110L2 can be from about 20 µm to about 150 µm, for example, and material M2 can have a modulus greater than first material 110M1 of first layer 110L1, so as to deflect the epithelium of the eye when the middle layer is deflected. The third layer 110L3 can be within a range from about 5 µm to 50 µm, for example within a range from about 10 µm to about 30 µm, and can cover second layer 110L2 so as to retain the second layer in the inner portion 110 of the device 100.

The therapeutic device 100 may comprise a first inner material 110M and a second outer material 120M, in which the outer portion 120 comprises a hardness configured to stretch elastically and conform with one or more of epithelium of the cornea or the conjunctiva, and in which the inner portion 110 comprises second hardness configured to smooth the cornea to provide optical benefit. The outer material 120M may comprise many materials as herein. The Shore A hardness of each of the inner portion and the outer portion can be within a range from about 5 to about 90. For example, the outer material 120M may comprise silicone having a hardness Shore A durometer from about 20 to about 50, for example from about 20 to about 40, and the inner material 110M may comprise silicone having a Shore A hardness from about 40 to about 90, for example from about 50 to about 90. The outer portion comprises a perimeter 120P, and the perimeter may comprise a peripheral and circumferential edge structure to abut the epithelium to form a seal with the epithelium, for example when the base radius of the device is less than the cornea. The peripheral and circumferential edge structure can be shaped in many ways to define an edge extending around the perimeter to abut the epithelium, for example with one or more of a taper of the edge portion extending to the perimeter, a bevel of the edge portion extending to the perimeter or a chamfer of the edge portion extending to the perimeter. The inner portion 110 may comprise inner thickness and inner material 110M and the outer portion 120 may comprise an outer thickness and outer material 120M, in which the inner thickness is substantially similar to the outer thickness.

The peripheral edge structure to abut the epithelium can be used with many configurations of the inner portion as described herein. For example, the inner portion may comprise an RGP lens material having a lower rigid surface to contact and smooth the cornea and an upper rigid optical surface. Alternatively, the inner portion may conform to the cornea as described herein. The outer portion may comprise a skirt, and the skirt may comprise the peripheral edge structure to abut and seal the cornea, such as the chamfer. The rigidity of the outer portion comprising the edge structure can be determined to seal the cornea with one or more of hardness and thickness, as described herein.

FIG. 1C2A shows a device as in one or more of FIGS. 1-2A to 1B7 having a layer of silicone or hydrogel material on a posterior surface of the device. The device 100 may comprise a wettable surface coating 134 disposed on at least the upper side of the device as described herein. The layer of silicone or hydrogel material may comprise an inner portion of the layer of silicone or hydrogel material 110MHG and an outer portion of the layer of silicone or hydrogel material 120MHG. The layer of silicone or hydrogel material extends to the fenestration so as to couple the silicone or hydrogel material to the fenestration. The silicone or hydrogel material can be coupled to the fenestration in many ways. For example, the layer of silicone or hydrogel material may cover the fenestration, or the fenestration 100F may extend through the silicone or hydrogel material. The fenestration 100F extending through the layer of silicone or hydrogel material can encourage pumping of the tear liquid as described herein. Alternatively or in combination, the layer of silicone or hydrogel material device a posterior surface of the fenestration 100F to couple the fenestration 100F to the silicone or hydrogel layer may encourage movement of a therapeutic agent along the silicone or hydrogel layer toward a central portion of the cornea for example. The silicone or hydrogel may extend along a deflectable portion of the device so as to exert at least some pressure on the silicone or hydrogel layer to encourage movement of one or more of tear liquid or the therapeutic agent along the silicone or hydrogel layer when the patient blinks, for example.

The silicone or hydrogel layer as described herein may encourage regeneration of the epithelium and may provide a soft surface to contact the epithelium regenerating over the ablation so as to encourage epithelial regeneration under the optical component as described herein, and the optical component can resist deformation so as to protect the epithelium and provide an environment to encourage regeneration of the epithelium.

The silicone or hydrogel material may comprise one or more of the silicone or hydrogel materials as described herein. The silicone or hydrogel material extending along the lower surface can increase comfort of the device when placed on the eye. The silicone or hydrogel material may comprise a substantially uniform thickness within a range from about 1 µm to about 100 µm, for example from about 2 µm to about 50 µm and in certain embodiments within a range from about 5 µm to about 20 µm. The silicone or hydrogel material extending along the posterior surface may comprise one or more of the silicone or hydrogel materials as described herein combined with one or more of materials 110M, 110M1, 110M2, 110M3 or 120M as described herein. For example the one or more of materials 110M, 110M1, 110M2, 110M3 or 120M may comprise silicone such as silicone elastomer comprising siloxane, and the silicone or hydrogel may comprise a silicone or hydrogel such as silicone or hydrogel material as described herein.

FIG. 1C2B shows a device as in one or more of FIGS. 1-2A to 1B7 having a layer of hydrogel material on a posterior surface of the device extending less than a maximum distance across the device such that end portions of the device are configured to engage the epithelium of the eye away from the hydrogel layer and inhibit movement of the device when placed on the eye. In certain embodiments, the material 120M can couple to the surface of the eye, for example the epithelium so as to inhibit movement of the device. The material 120M may comprise a sticky tacky hydrophobic material such as silicone to engage the epithelium to inhibit movement, and the material 120M may be coated with one or more coatings as described herein, for example with vapor deposition. The silicone or hydrogel material can be coupled to the fenestration in many ways. For example, the layer of silicone or hydrogel material may cover the fenestration, or the fenestration 100F may extend through the silicone or hydrogel material.

Figure 2C:
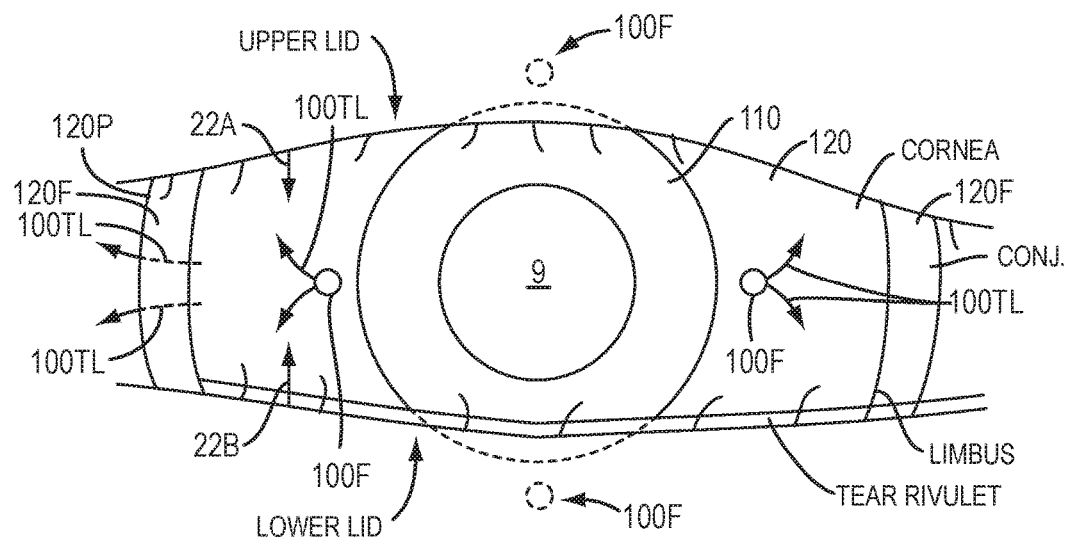

FIG. 1C2C shows a device 100 as in one or more of FIGS. 1-2A to 1B7 having an annular layer of silicone or hydrogel material 120MHG on a posterior surface of the device such that an inner portion of the device contacts the cornea away from the silicone or hydrogel layer and an outer portion of the device contacts the cornea away from the device when placed on the eye. Work in relation to embodiments suggests that the annular silicone or hydrogel layer can provide an environment to encourage growth of the epithelium along the posterior surface of inner material 110M1 as described herein, and the lower surface of material 110M1 can be coated with a material having a thickness less than the silicone or hydrogel, for example.

FIG. 1C3 shows a device having a tricurve profile to fit sclera with slopes of the curved profiles aligned so as to inhibit ridges at the boundaries of the curved portions as in FIG. 1B2 and having a layer of silicone or hydrogel material 120MHG on a lower surface. The silicone or hydrogel material 120M may extend substantially across the posterior surface of the device. A silicone or hydrogel material may extend along the lower surface a distance less than a distance across the device so as to provide a portion of the device without the silicone or hydrogel to engage the eye, for example the epithelium of the eye that may comprise one or more of the corneal epithelium or the conjunctival epithelium. Alternatively, a silicone or hydrogel material may extend substantially along the posterior surface of the device corresponding to the distance across the device so as to provide a portion of the device with a silicone or hydrogel material over the outer portion of the device that engages the eye.

FIG. 1C4 shows a plan view of a device having a tricurve profile to fit the cornea, limbus, and sclera with slopes of the curved profiles aligned so as to inhibit ridges at the boundaries of the curved portions as in FIG. 1B4 and having a silicone or hydrogel material on a lower surface extending less than a maximum distance across the device to engage the conjunctiva with the device away from the silicone or hydrogel material. Alternatively, the silicone or hydrogel material may extend substantially along the posterior surface of the device corresponding to the distance across the device so as to provide the silicone or hydrogel material over the outer portion of the device that engages the eye. The silicone or hydrogel device may comprise an annular shape extending along the lower surface as described herein.

FIG. 105 shows a fenestration 100F having a posterior end 100FPE covered with a layer of silicone or hydrogel material 29MHG extending along the posterior surface of the device 100, in accordance with embodiments of the present invention.

FIG. 106 shows fenestration 100F extending through a layer of silicone or hydrogel material 120MHG extending along the posterior surface of the device 100, in accordance with embodiments of the present invention.

Figure 1D:
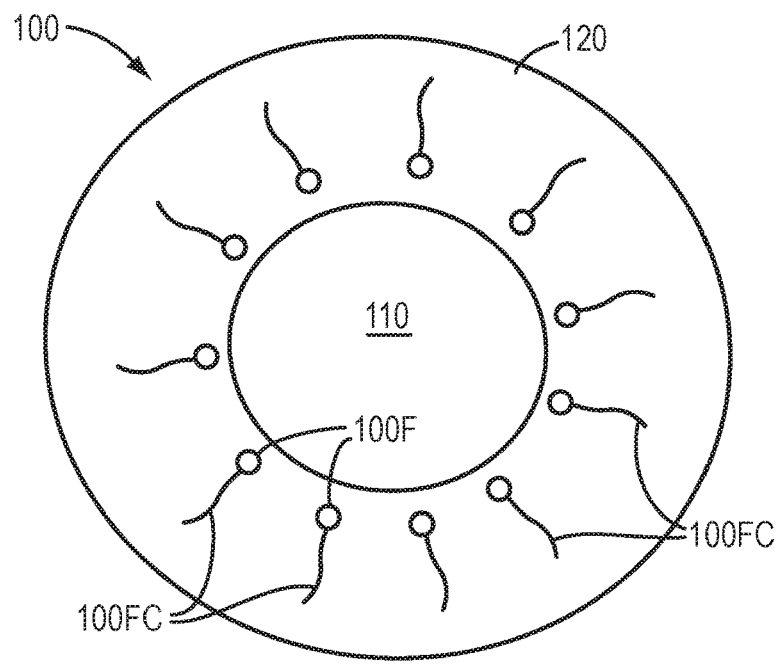
FIG. 1D shows a device comprising channels extending radially outward along a lower surface of the device, in accordance with embodiments.

FIG. 1D shows a device comprising channels 100FC extending radially outward from fenestrations 100F along a lower surface of the device, in accordance with embodiments.

Figure 1E:
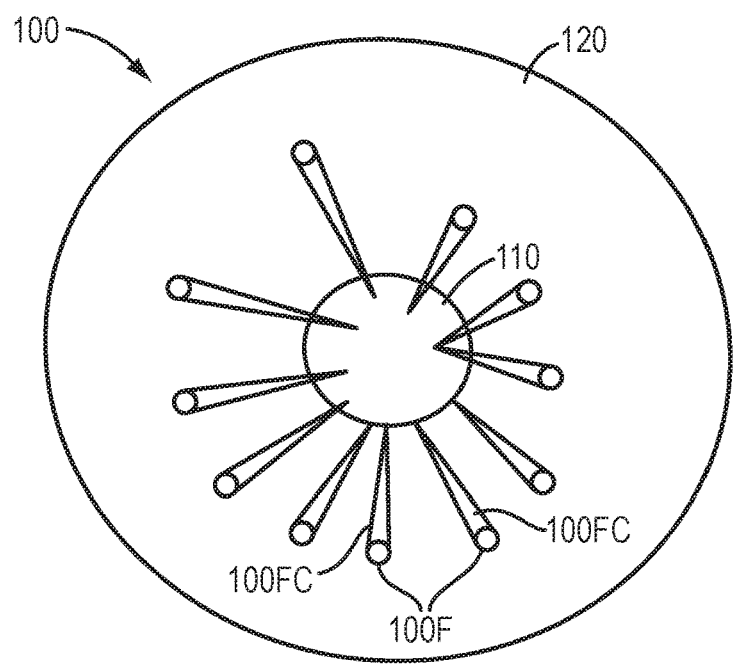
FIG. 1E shows a device comprising channels extending radially inward along a lower or posterior surface of the device, in accordance with embodiments.

FIG. 1E shows a device comprising 100FC channels extending radially inward from fenestrations 100F along a lower surface of the device, in accordance with embodiments.

Figure 1F:
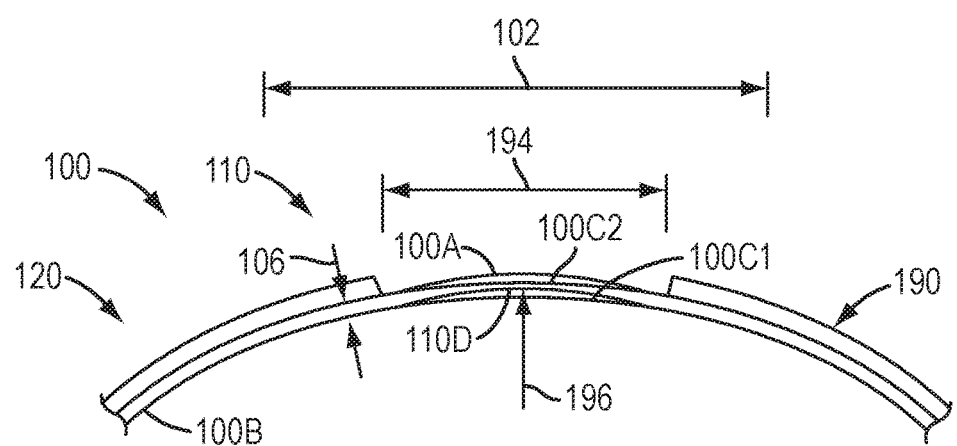
FIG. 1F shows a test apparatus to measure deflection of a portion of a lens in response to a load, in accordance with embodiments.

FIG. 1F shows a test apparatus 190 to measure deflection of a portion of a lens in response to a load. The load deflection of the devices and composite layers as described herein can be used to determine the deflection of the device and corresponding pumping. Work in relation to embodiments suggests that one or more of the inner device or the outer device contacting the epithelium may comprise a rigidity such that blinking of the eye deflects the device sufficiently with elastic deformation so as to urge tear liquid from beneath the device as described herein. For example, the inner portion 120 of the devices suited to cover the ablated cornea and provide pumping as described herein are also well suited to cover natural unablated corneas to provide vision correction with pumping of the tear liquid. The outer portion 120 may comprise a rigidity as described herein sufficient to deflect when the eye blinks and provide elastic deformation that may pump tear liquid under the device such as a contact lens.

The test apparatus 190 may comprise a rigid support having an aperture 192, such that deflection of the device 100 through the aperture 192 can be measured. The aperture 192 has a dimension across 194 that can be sized smaller than the dimension across inner portion 110, so as to measure a deflection 110D of the inner portion 110 in response to a load 196. The deflection 110D may comprise a peak deflection, for example a distance. The load 196 may comprise a point load or a load distributed over an area corresponding to diameter 104, for example a pressure from a gas or liquid on the lower side of the device. The device may comprise a first configuration C1 corresponding to the shape of the device prior to placement on the eye, and the device may comprise a second configuration C2 when placed on the eye, and the amount of force and/or pressure to deflect device 100 can be determined such that device 100 can be deflected without substantially degrading vision and so as to smooth the epithelium. For example, the device may deflect slightly so as to decrease vision no more than about 1 or 2 lines of visual acuity and such that the device can smooth the epithelium and provide environment 100E as described herein.

The modulus and thickness of the device can be used to determine an amount of relative rigidity of the device 100, the corresponding amount of force to deflect the device 100 across a distance, and the corresponding amount pressure to smooth the epithelium with the deflected device as described herein.

The amount of relative rigidity can be determined based on the modulus multiplied with cube of the thickness. The amount of deflection corresponds to the sixth power of the deflected span across the device, the modulus, and the cube of the thickness. The approximately fourth order relationship of the span to the deflection can allow the devices as described herein to conform at least partially to the ablation profile within a range from about 4 mm to 6 mm, and inhibit substantially irregularities having diameters of about 3 mm or less, for example.

The deflection can be approximated with the following equation:

Deflection≈(constant)×(Load×Span$^4$)/(Modulus×thickness$^3$)

The above approximation can be useful to understand the properties of device 100, for example with a substantially uniform thickness of the inner portion. The substantially uniform thickness may comprise a thickness that is uniform to within about ±25%, for example to within about ±10%, such that the device can conform substantially to at least a majority of the surface area of an ablation zone and inhibit irregularities over a smaller portion of the ablation zone corresponding to no more than a minority of the surface area of the ablation. In certain embodiments, a device conforms over an area having diameter of at least about 4 mm and inhibits irregularities over an area having a diameter of no more than about 4 mm, for example less inhibits irregularities over an area of no more than about 3 mm. For example, based on the above equations, the deflection is related to the fourth power of the span, such that for a comparable load, a 2 mm span will have about $\frac{1}{16}^h$ the deflection of a 4 mm span. Similarly, a 3 mm span will have a deflection that is about $\frac{1}{16}^h$ the deflection of a 6 mm span. As the deflection is related to the cube of the thickness, doubling the thickness can decrease the deflection by about a factor of 8. The above approximations can be combined with clinical testing to determine thicknesses and moduli suitable for incorporation in accordance with embodiments as described herein.

The equations for deflection of an unsupported circular span of a material having a substantially uniform thickness are:

$$E_c = E_1\left(\frac{t_1}{t_1+t_2}\right) + E_2\left(\frac{t_2}{t_1+t_2}\right)$$

"Relative" Rigidity = $E_c(t_1+t_2)^3$ $$y = \frac{3wR^4}{16Et^3}(5+v)(1-v)$$

$$w = \frac{y16Et^3}{(5+v)(1-v)3R^4}$$

where:
W=evenly distributed load over the surface, Pressure (Pa);
R=span of unsupported material (m);
E=Young's Modulus (Pa);
t=Thickness (m);
v=Poisson's Ratio (unit-less, assumed to be constant among materials); and
y=Deflection (m).

The equations for deflection are described in *Theory and analysis of elastic plates*, Junuthula Narasimha Reddy, p. 201 equation 5.3.43 (1999).

Although the above equations describe relative rigidity for a substantially flat surface, the equations can approximate a curved surface and a person of ordinary skill in the art can determine the deflection load and relative rigidity empirically based on the teachings described herein, for example with finite element modeling.

TABLE A1

Material, modulus, thickness, relative rigidity Dk/and deflection load of inner portions of coverings as described herein.

| Button Material | Uniform Button Thickness (μm) | Button Thickness (m) | Flexural Modulus (MPa) | Flexural Modulus (Pa) | Relative Rigidity (Pa*m^3) | Material Dk (×10$^{-11}$) | Dk/t (×10$^{-9}$) |
|---|---|---|---|---|---|---|---|
| Rigid Silicone | 250 | 2.50.E−04 | 35 | 35000000 | 5.47E−04 | 600 | 240 |
| Rigid Silicone | 200 | 2.00.E−04 | 35 | 35000000 | 2.80E−04 | 600 | 300 |
| Rigid Silicone | 150 | 1.50.E−04 | 35 | 35000000 | 1.18E−04 | 600 | 400 |
| Rigid Silicone | 100 | 1.00.E−04 | 35 | 35000000 | 3.50E−05 | 600 | 600 |
| Rigid Silicone | 50 | 5.00.E−05 | 35 | 35000000 | 4.38E−06 | 600 | 1200 |
| Exemplary Silicone | 293 | 2.93.E−04 | 20 | 20000000 | 5.03E−04 | 600 | 205 |

TABLE A1-continued

Material, modulus, thickness, relative rigidity Dk/and deflection load of inner portions of coverings as described herein.

| Button Material | Uniform Button Thickness (μm) | Button Thickness (m) | Flexural Modulus (MPa) | Flexural Modulus (Pa) | Relative Rigidity (Pa*m^3) | Material Dk (×10^−11) | Dk/t (×10^−9) |
|---|---|---|---|---|---|---|---|
| Exemplary Silicone | 272 | 2.72.E−04 | 20 | 20000000 | 4.02E−04 | 600 | 221 |
| Exemplary Silicone | 250 | 2.50.E−04 | 20 | 20000000 | 3.13E−04 | 600 | 240 |
| Exemplary Silicone | 215 | 2.15.E−04 | 20 | 20000000 | 1.99E−04 | 600 | 279 |
| Exemplary Silicone | 200 | 2.00.E−04 | 20 | 20000000 | 1.60E−04 | 600 | 300 |
| Exemplary Silicone | 175 | 1.75.E−04 | 20 | 20000000 | 1.07E−04 | 600 | 343 |
| Exemplary Silicone | 150 | 1.50.E−04 | 20 | 20000000 | 6.75E−05 | 600 | 400 |
| Exemplary Silicone | 100 | 1.00.E−04 | 20 | 20000000 | 2.00E−05 | 600 | 600 |
| Exemplary Material | 50 | 5.00.E−05 | 20 | 20000000 | 2.50E−06 | 600 | 1200 |
| enflufocon A (Boston ES) | 25 | 2.50.E−05 | 1900 | 1900000000 | 2.97E−05 | 18 | 72 |
| enflufocon A | 50 | 5.00.E−05 | 1900 | 1900000000 | 2.38E−04 | 18 | 36 |
| enflufocon A | 150 | 1.50.E−04 | 1900 | 1900000000 | 6.41E−03 | 18 | 12 |
| hexafocon B (Boston XO2) | 25 | 2.50.E−05 | 1160 | 1160000000 | 1.81E−05 | 141 | 564 |
| hexafocon B | 50 | 5.00.E−05 | 1160 | 1160000000 | 1.45E−04 | 141 | 282 |
| hexafocon B | 150 | 1.50.E−04 | 1160 | 1160000000 | 3.92E−03 | 141 | 94 |

As shown in Table A1, an RGP material such as an enflufocon or hexafocon having a thickness of about 50 μm can have a relative rigidity suitable for epithelial smoothing and so as to conform at least partially to the ablated stroma. The rigid silicone having a modulus of about 20 MPa and a thickness of about 250 μm will provide a relative rigidity 3E-4 and deflection under load similar to the RGP material having a thickness of about 50 μm and modulus of about 1900 MPa so as to provide a relative rigidity of about 2.4E-4. Commercially available RGP lens materials as shown in Table A1 can be combined in accordance with embodiments as described herein so as to provide device 100. Based on the teachings described herein, a person of ordinary skill in the art can determine the thickness of the device based on the modulus and the intended relative rigidity.

Work in relation to embodiments in accordance with clinical studies as described herein has shown that the inner portion 110 of the device 100 having the relative rigidity of about 3E-4 ($3\times10^{-4}$ Pa-m$^3$) can be effective so to improve vision and conform at least partially of the eye so as to provide at least some comfort and improve fitting. Many eyes have been measured with many devices and work in relation to embodiments indicates that an inner portion 110 having a relative rigidity within a range from about 1E-4 to about 5E-4 (Pa-m$^3$) can allow the device to conform to the ablation and smooth the epithelium as described herein. For example, inner portion 110 may a relative rigidity within a range from about 2E-4 to about 4E-4, and the eye can be fit accordingly based on the deflection of the device 100.

The relative rigidity can be related to the amount of deflection of the device 100 on the eye. Work in relation to embodiments indicates that a relative rigidity of inner portion 110 about 3E-4 can deflect about ±2D when placed on the eye so as to conform to an ablation to within about ±2D across the approximately 5 mm or 6 mm ablation diameter when an inner diameter of about 2 mm or 3 mm is smoothed. A device 100 having a relative rigidity of about 1.5 E-4 can deflect about ±4 D when placed on the eye so as to conform to an ablation to within about ±4 D across an approximately 5 mm or 6 mm diameter when an inner diameter of about 2 mm or 3 mm is smoothed.

The o-n, for example for coverings having a plurality of layers having a plurality of materials.

TABLE A3

Relative Rigidity of Layered Devices

| Total Thickness | Layered Material | Material 1 (Rigid) | | Material 2 (Soft) | | Composite | | Relative Rigidity (Pa-m³) |
|---|---|---|---|---|---|---|---|---|
| | | Thickness (m) | Modulus (Pa) | Flexural Thickness (m) | Modulus (Pa) | Composite Thickness (m) | Modulus (Pa) | |
| 270 μm thick | Exemplary Silicone Shield | 2.40E−04 | 2.00E+07 | 3.00E−05 | 2.00E+06 | 2.70E−04 | 1.80E+07 | 3.54E−04 |
| | Soft and Hard are Equal | 1.35E−04 | 2.00E+07 | 1.25E−04 | 2.00E+06 | 2.70E−04 | 1.13E+07 | 1.99E−04 |

TABLE A3-continued

Relative Rigidity of Layered Devices

| Total Thickness | Layered Material | Material 1 (Rigid) | | Material 2 (Soft) Flexural | | Composite | | Relative Rigidity (Pa-m$^3$) |
|---|---|---|---|---|---|---|---|---|
| | | Thickness (m) | Modulus (Pa) | Thickness (m) | Modulus (Pa) | Composite Thickness (m) | Composite Modulus (Pa) | |
| 150 µm thick | Exemplary Silicone Shield | 1.20E−04 | 2.00E+07 | 3.00E−05 | 2.00E+06 | 1.50E−04 | 1.64E+07 | 5.54E−05 |
| | Soft and Hard w/ Equal thickness | 7.50E−05 | 2.00E+07 | 7.50E−05 | 2.00E+06 | 1.50E−04 | 1.10E+07 | 3.71E−05 |

When two or more materials are combined so as to provide two or more layers, the relative rigidity of each layer can be combined so as to determine a total composite rigidity. For example, the combined rigidity can be determined for a device having first layer 110L1 of first material, a second layer 110L2 of second material M2 and third layer 110L3 of third material 110L3, in which the first and third materials can be the same material.

A weighted average system can be used to treat the two layers as one material. The relative amounts of each material and the moduli of the two materials can be combined to determine a composite modulus based on the weight average of the thickness of each layer. For example, with 90 µm of 20 MPa material layer and a 10 µm of 5 MPa material layer can be combined so as to determine the composite modulus as $$20 \text{ MPa} \times 0.9 + 5 \text{ MPa} \times 0.1 = 18.5 \text{ MPa}$$

The equations described herein accommodate many layers of different materials and thicknesses.

Based on the composite modulus, one can multiply the composite modulus by the overall thickness cubed, in the present example 18.5 MPa×100$^3$. Although these calculations can be based on approximations, a person of ordinary skill in the art can conduct simulations, for example finite element modeling simulations, so as to determine the amount of relative rigidity, pressures and deflection forces and pressures as described herein.

The index of refraction of one or more layers of device 100 may correspond substantially to the index of refraction of the cornea.

One or more of the materials 110M1, 110M2 or 110M3 may comprise an index of refraction within a range from about 1.38 to about 1.43 so as to match the index of refraction of the cornea to within about ±0.05. For example the materials 110M1 and 110M3 may comprise an optically transparent soft silicone elastomer having an index of refraction of about 1.41 and the material M2 may comprise an optically transparent rigid silicone elastomer having an index of refraction of about 1.43, for example available from NuSil. Alternatively, material 110M1 and material 110M3 may comprise silicone silicone or hydrogel and material 110M2 may silicone, for example.

While the device may comprise similar materials such as a more rigid silicone combined with a softer silicone, the device may comprise dissimilar materials. For example, an RGP material can be combined with a silicone or hydrogel, such as the bicurve or tricurve embodiments as described herein. The device can extend at least to the limbus for stability. The RGP material may comprise the second layer 110L2 of the second material 110M2, for example in accordance with Table A1, and the hydrogel may comprise the first layer 110L1 of the first material 110M1 and the third layer 110L3 of the third material 110M3. The hydrogel may have an index of refraction from about 1.38 to about 1.42 so as to match the index of refraction of the cornea of about 1.377 to within about 0.05 and may comprise one or more of HEMA, NVP, GMA, MMA, SiH, TRS, HEMA/NVP, MMA/NVP, HEMA/GMA, or SiH/TRS, commercially available from Vista Optics, UK, for example. The hydrogel comprising HEMA/NVP, MMA/NVP, or HEMA/GMA may have a water content within a range from about 40% to about 70% so as to provide an index of refraction within a range from about 1.38 to about 1.43. A water content of about 40% corresponds to an index of refraction of about 1.43 and a water content of about 70% corresponds to an index of refraction of about 1.38. A hydrogel comprising SiH/TRS may comprise water content within a range from about 20% to about 70% so as to provide an index of refraction within a range from about 1.38 to about 1.43. With these SiH hydrogels a water content of about 20% corresponds to an index of refraction of about 1.43 and a water content of about 70% corresponds to an index of refraction of about 1.38.

FIG. 2A shows a device 100 comprising a contact lens placed on the eye with the eyelids separated, in accordance with certain embodiments. A device 100 is placed on the eye such that the tear liquid TL extends under at least a portion of the device between the device and the cornea so as to provide a chamber 100C. The device 100 can be fit on K or slightly flatter than the cornea so as to provide chamber 100C. Alternatively or in combination, the flange 120F and sclera coupling portion 120S of the outer portion 120 may comprise an angle steeper than the conjunctiva such the device is urged away from the cornea near inner portion 110 so as to provide chamber 100C. The device 100 comprises a sag height 105S1 corresponding to the elevation distance from the center of the device to the outer perimeter 120P of the sclera coupling portion 130. The eyelids can be separated for the patient to see an object.

FIG. 2B shows a profile view of the device of FIG. 2A with the eyelids closing.

FIG. 2C shows a front view the device of FIG. 2A with the eyelids closing, in accordance with embodiments. The eyelids can close with a downward movement 22A of the upper eyelid and an upward movement 22B of the lower eyelid. The closing of the eyelids exerts pressure on the device 100 such that device 100 comprises second configuration 100C2. The second configuration 100C2 comprises the sag height 105 decreased to second sag height 105S2 such that the volume of chamber 100C decreases and urges pumped tear fluid 100TL from under the device. The pumped tear liquid 100TL flows radially outward under the outer portion 120P and through fenestrations 100F such as fenestrations not covered by the eyelid. The pressure of the eyelid can urge the device 100 toward cornea 100 so as to decrease the volume of chamber 100C. The volume of chamber 100C can decrease substantially when the outer portion 120 comprising flange 120F deflects with elastic deformation. Alternatively or in combination, the outer portion 120 corresponding to the cornea can deflect so as to decrease the volume of chamber 100C. In certain embodiments, the inner portion 110 comprising optical component 100A may deflect with pressure of the eyelid so as to decrease the volume of chamber 100.

Figure 2D:
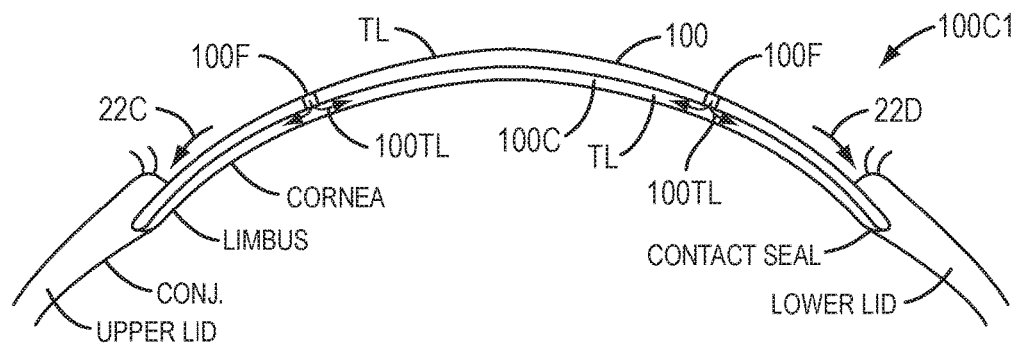
FIG. 2D shows side profile of the device of FIG. 2A with the eyelids opening, in accordance with embodiments.
Figure 21:
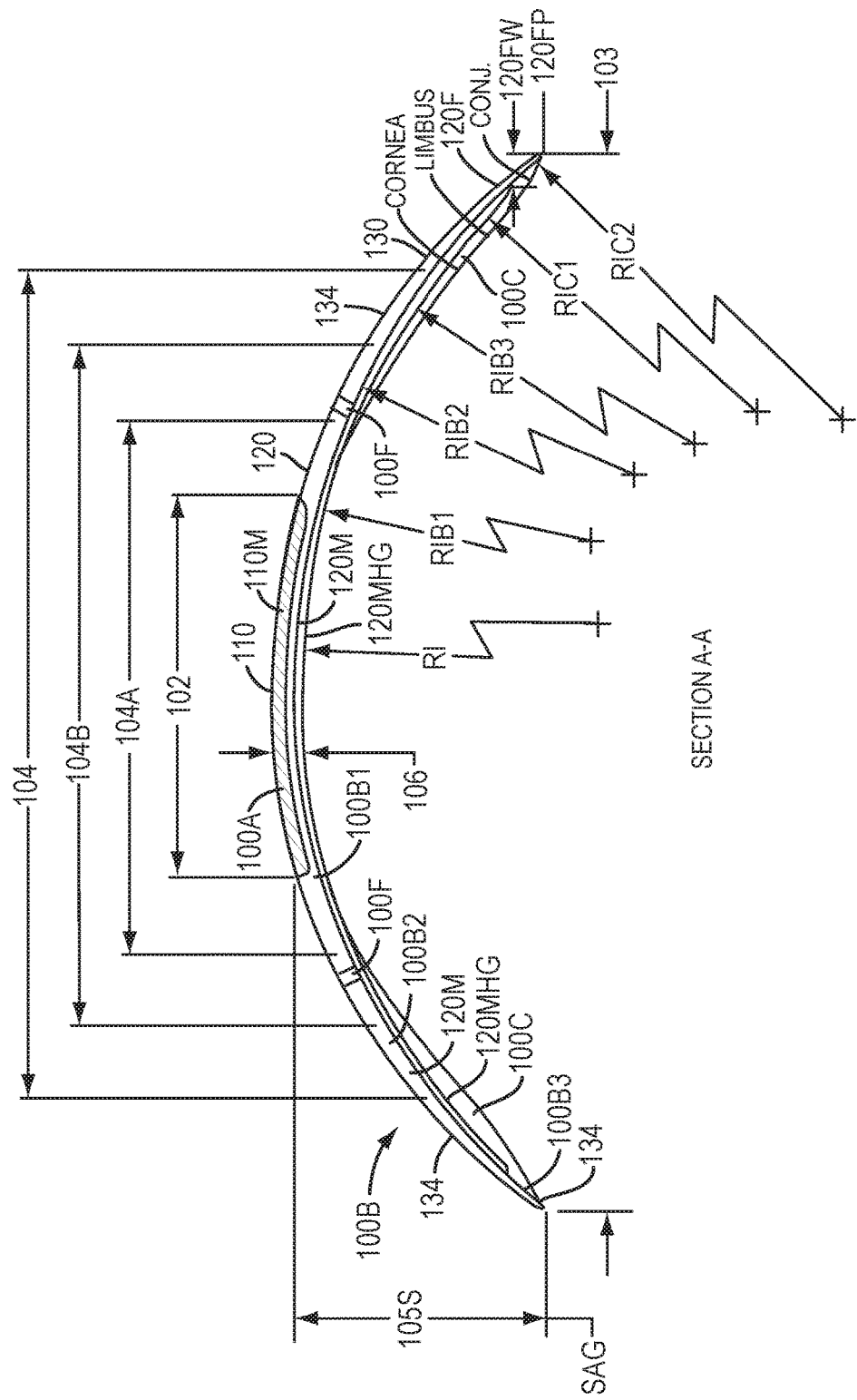

FIG. 2D shows a side profile of the device of FIG. 2A with the eyelids opening, in accordance with embodiments. When the eyelids retract with upward movement 22C of the upper eyelid and downward movement 22D of the lower eyelid, the device 100 can return to the first configuration 100C1 having first sag height 105S1, such that the volume of the chamber increases. The outer portion 120 comprising flange 120F and peripheral portion 120F of the sclera coupling portion 130 may contact the conjunctiva so as to form a contact seal with the conjunctiva. The contact seal with the conjunctiva encourages flow of the tear liquid TL through the fenestrations 100F and into the chamber 100C, such that pumped tear liquid 100TL can be located between the cornea and the device 100.

The tear rivulet of the lower lid can move upward when the eyes close so as to provide tear liquid on the surface of the eye, and at least a portion of the rivulet can couple to the upper lid when the lids contact each other. When the upper lid moves upward with movement 22C and the lower lid moves downward with movement 22D, the upper lid provide tear liquid TL near the upper fenestrations to pass through the upper fenestrations and the lower lid can provide tear liquid TL near the lower fenestrations to move through the lower fenestrations.

Repeated blinking of the eye may occur naturally, so as to pump tear liquid under the covering and rinse the cornea and conjunctiva under the device. This pumping and rinsing provided by the device can extend the amount of time the device can be worn by a patient such as a patient having a normal unablated eye, and may encourage epithelial regeneration in post-PRK eyes, for example.

FIG. 2E shows a device comprising a contact lens placed on the eye such that the device is supported with an inner portion of the cornea and the conjunctiva with the device separated from an outer portion of the cornea so as to define a chamber when the eyelids are separated, in accordance with embodiments. The device 100 may contact the cornea at an inner portion of the cornea, for example at a central location. The inner portion 110 can be sized to fit the cornea centrally as described herein, for example with on K fitting. The outer portion of the device 120 comprising flange 120F and sclera coupling portion 130 can be sized to contact the conjunctiva when the inner portion 110 contacts the sclera centrally, such that chamber 100C is formed over the outer portion of the cornea with a gap extending between the outer portion of the cornea and the device. The outer portion 120 of the device extending over the outer portion of the cornea may have a curvature less than the cornea, such that the outer portion 120 over the outer portion of the cornea can form chamber 100C when the inner portion 110 is supported with the cornea and the outer portion 120 comprising flange 120F is coupled to the conjunctiva. The fenestrations 100F can be located on the device to correspond with a location of chamber 100C and the gap when the eyelids are open. The outer portion 120 comprises a resistance to deflection sufficient to form chamber 100C when the eyelids are open an insufficient to resist deflection when the eyelids move over the outer portion such that the outer portion moves toward the cornea and decrease the gap distance when the eyelids close.

The device 100 can be fit to the cornea to encourage formation of the chamber 100C and such that device 100 comprises an initial configuration 100C1 with chamber 100C formed beneath. The cornea may comprise a limbus sag height 105L corresponding to an elevational distance extending from a vertex of the cornea to the limbus. The limbus may be located a radial distance 105RL from a measurement axis of the eye. The eye may comprise a conjunctiva sag height 105C at a radial distance 105RC from the axis of the eye. The device may comprise a limbus sag height 105LC at a location corresponding to the radial distance RL to the limbus. The device may comprise a conjunctiva sag height 105CC at a conjunctiva contacting location corresponding to the radial distance 105RC of the conjunctiva, for example along flange 120F. In certain embodiments, the sag height 105LC of the device at the location corresponding to the limbus is no more than the limbus sag height 105L, and the sag height 105CC of the device at the location corresponding to the conjunctiva is no more than the conjunctiva sag height 105C, such that pressure to the limbus is decreased. When the device is placed on the eye, the conjunctiva coupling portion 130 comprising flange portion 120F can deflect such that the sag height of the conjunctiva contacting portion is decreased from 105CC the sag height of the conjunctiva to the sag height of the conjunctiva 105C, such that the sag height of the device comprises a sag deflected sag height 105S2.

FIG. 2F shows a side sectional view of the device of FIG. 2E with the eyelids closing such that device 100 comprises a configuration 100C2 with chamber 100C having a decreased volume. When the eyelids close, the upper and lower lids exert pressure on the device such that the device is urged toward the outer portion of cornea and the conjunctiva. The outer portion of the device over the outer portion of the cornea may not have sufficient resistance to deflection such that the outer portion of the device is deflected downward toward the outer portion of the cornea. The gap distance extending between the outer portion of the device over the outer portion of the cornea is decreased, such that the volume of chamber 100C decreases and pumped tear liquid 100TL flow from chamber 100C through fenestrations 100F and under the conjunctiva contacting portion 130 comprising flange portion 120F. The upper eyelid can extend across the pupil so as to cover inferior and superior fenestrations 100F. The upper eyelid may contact the lower eyelid so as to draw the tear liquid of the rivulet superiorly when the eye opens, such that tear liquid of the rivulet can be drawn into the chamber through the inferior and superior fenestrations.

The deflection of the outer portion of the device over the outer portion of the cornea can be provided with a device having a relative rigidity within a range from about 1.0 E-6 Pa-m$^3$ to about 6 E-4 Pa-m$^3$, for example from about 2.5 E-6 Pa-m$^3$ to about 5 E-4 Pa-m$^3$. Table A2 shows values suitable of relative rigidity and corresponding ranges of outer portion 120 corresponding to the outer portion of the cornea that can be determined based on the teachings described herein so as to determine the relative rigidity of the outer portion of the device to provide resistance to deflection and form the chamber with the gap when the eyelid is away from the portion of the device and so as to deflect toward the cornea and decrease the gap and corresponding chamber volume when the eyelid covers the portion of the device.

The deflection of the sclera contacting portion 130 to couple to the conjunctiva can be provided with the sclera contacting portion 130 comprising a relative rigidity of no more than about 2 E-4 Pa-m$^3$, for example no more than about 1 E-4 Pa-m$^3$, and in certain embodiments no more than about 2 E-5 Pa-m$^3$. Table A2 shows values suitable of relative rigidity and corresponding ranges of sclera coupling portion 130 that can be determined based on the teachings described herein so as to determine the relative rigidity of the sclera coupling portion of the device to provide resistance to deflection and form the chamber with the gap when the eyelid is away from the portion of the device and so as to deflect toward the cornea and decrease the gap and corresponding chamber volume when the eyelid covers the outer portion of the device over the outer portion of the cornea.

The deflection of the flange portion 120F to couple to the conjunctiva can be provided with the flange portion 130 comprising a relative rigidity of no more than about 1 E-4 Pa-m$^3$, for example no more than about 2 E-5 Pa-m$^3$, and in certain embodiments no more than about 2.5 E-6 Pa-m$^3$. Table A2 shows values suitable of relative rigidity and corresponding ranges of outer flange portion 120F that can be determined based on the teachings described herein so as to determine the relative rigidity of the flange portion 120F of the device to provide resistance to deflection and form the chamber with the gap when the eyelid is away from the portion of the device and so as to deflect toward the cornea and decrease the gap and corresponding chamber volume when the eyelid covers the outer portion of the device over the outer portion of the cornea.

FIG. 2F1 shows a profile view of the device of FIG. 2F with rotation of the eye when the lids close such that sliding of the device along the epithelium is inhibited when tear liquid is pumped, in accordance with certain embodiments. The axis of the eye can rotate superiorly such that the device slides along the upper lid and the lower lid. The axis of the eye may comprise one or more known axis of the eye and can be determined in many ways by a person of ordinary skill in the art.

FIG. 2G shows a profile view of the device of FIG. 2E with the eyelids opening, in accordance with embodiments. The opening of the eyelids decreases pressure and allows the outer portion of the device above the outer portion of the cornea to move away from the cornea. The tear liquid TL may pass through fenestrations 100F and into the chamber 100C. The outer portion of the device comprising portion 130 and flange 120F can contact the conjunctiva to inhibit tear flow and may seal the device.

FIG. 2H shows a profile view of the device of FIG. 2E with the eyelids located at an intermediate location such that the chamber comprises an intermediate configuration 100C12 volume, in accordance with embodiments. The optical component 100A comprising inner portion 110 may comprise sufficient rigidity and resistance to deflection so as to provide vision for the patient when the device comprises intermediate portion 100C12 having outer portion 120 deflected so as to decrease volume of chamber 100C. For example, the patient can close the eyelids to the pupil margin to deflect the outer portion and the optical component 100B and inner portion 110 can remain substantially undeflected such that the patient can have vision of 20/20 or better (metric 6/6 or better) with a portion of one or more eye lids contacting the inner portion 110. Opening of the eyelids can increase the chamber volume and pump tear liquid and closing of the eyelids can decrease chamber volume and pump tear liquid.

FIG. 2I shows a side view sectional view of the device of FIG. 1C4 placed on the eye with silicone or hydrogel contacting the eye. The device 100 comprises the layer of silicone or hydrogel material 120MHG extending along the posterior surface of the device so as to contact the eye with at least a portion of the silicone or hydrogel layer. The device 100 can be dimensioned to form chamber 100C defined at least in part with the layer of silicone or hydrogel material. Fenestrations may extend through the silicone or hydrogel layer so as to provide pumping as described herein. Alternatively or in combination, the posterior end of the fenestrations can be covered with the silicone or hydrogel material to couple the cornea to the fenestrations with the layer of silicone or hydrogel material. Fenestrations covered with the layer of silicone or hydrogel material 120MHG can be located along the deflectable portion of the device so as to encourage movement of water and therapeutic agents along the silicone or hydrogel material, for example when the eye blinks. The silicone or hydrogel layer may comprise a medium to pass liquid and therapeutic agent from the fenestrations to a desired location of the cornea, for example with wicking of the liquid and therapeutic agent to a central location of the cornea. The device comprising the silicone or hydrogel layer extending along the lower surface as described herein can be fit to an unablated eye to provide refractive correction or fit to an ablated eye as described herein.

Clinical testing in accordance with embodiments has shown that the curved portions of the device can be fit with on K values in accordance with corneal curvatures and sag heights and limbus sag heights and conjunctiva sag heights of a patient population.

Appendix I shown herein below provides dimensions and fit parameters for device 100 in accordance with embodiments and teachings as described herein. The devices may comprise one or more of the materials in the Series A Tables shown herein, for example. The dimensions and fit parameters of the devices can provide pumping of the tear liquid when placed on the cornea in accordance with embodiments described herein. The tables of Appendix I identify the devices for use with steep K corneas, medium K corneas and flat K corneas, for example. The K values listed can be based on population norms, such that the devices provide pumping as described herein when placed on the eye. The devices can be used with non-ablated eyes or ablated eyes, and the device can be identified at least in part based on the first inner curvature R1.

Table B1 shows device 100 having a diameter of approximately 14 mm across and can be fit on K or flatter, for example as described herein. The table lists R1 corresponding to the center ablated portion of the cornea. The inner portion 110 comprising optical component 100A and inner coupling component 100B1 has dimension R1 extends about 5 mm across, and the ablation zone can be larger, for example about 6 mm. The portion corresponding to radius R1B1 has dimensions of about 5-7 mm across, and the curvature can be expressed with keratometry values (K-values) corresponding to the optical power of the eye in Diopters (D). The portion corresponding to radius R1B2 has dimensions of about 7 mm to 9 mm across. The portion corresponding to radius R1B3 has dimensions of about 9-11 mm across. The portion corresponding to R1C1 can extend from about 11 mm to 13.5 mm across, and may comprise curvature having one or more values between portion R1B3 and portion R1C2, for example a radius of curvature between about 8 mm and about 12 mm such as about 10 mm. The portion corresponding to R1C2 can extend from about 13.5 mm to 14 mm across. The sag height of the portion R1C2 can be from about 3.1 mm to about 3.4 mm, for example. The portion corresponding to R1C1 can be fit to the cornea in many ways as described herein, for example with the tangent of portion R1C1 aligned with R1B3 on the inner boundary and R1C2 along an outer boundary so as to inhibit ridge formation as described herein.

Table B2 shows device 100 having a diameter of approximately 14 mm across and can be fit on K or flatter, for example as described herein. The table lists R1 corresponding to the center ablated portion of the cornea. The inner portion 110 comprising optical component 100A and inner coupling component 100B1 has dimension R1 extends about 5 mm across, and the ablation zone can be larger, for example about 6 mm. The portion corresponding to radius R1B1 has dimensions of about 5-7 mm across, and the curvature can be expressed with keratometry values (K-values) corresponding to the optical power of the eye in Diopters (D). The portion corresponding to radius R1B2 has dimensions of about 7-9 mm across. The portion corresponding to radius R1B3 has dimensions of about 9-11 mm across, and these values range from about 35.75 to about 40, such that each value is somewhat flatter at the peripheral portion than corresponding values of Table B1. For example, Table B1 lists the values for R1B3 as having a range from about 36.75 to about 41 D. The portion corresponding to R1C1 can extend from about 11 mm to 13.5 mm across. The portion corresponding to R1C2 can extend from about 13.5 mm to 14 mm across. The sag height of the portion R1C2 can be from about 3.1 mm to about 3.4 mm, for example. The portion corresponding to R1C1 can be fit to the cornea in many ways as described herein, for example with the tangent of portion R1C1 aligned with R1B3 on the inner boundary and R1C2 along an outer boundary so as to inhibit ridge formation as described herein.

Table B3 shows device 100 having a diameter of approximately 16 mm across and can be fit on K or flatter, for example as described herein. The table lists R1 corresponding to the center ablated portion of the cornea. The inner portion 110 comprising optical component 100A and inner coupling component 100B1 has dimension R1 extends about 5 mm across, and the ablation zone can be larger, for example about 6 mm. The portion corresponding to radius R1B1 has dimensions of about 5-7 mm across, and the curvature can be expressed with keratometry values (K-values) corresponding to the optical power of the eye in Diopters (D). The portion corresponding to radius R1B2 has dimensions of about 7-9 mm across. The portion corresponding to radius R1B3 has dimensions of about 9-10.5 mm across, and these values range from about 36.75 to about 41. The portion corresponding to R1C can extend from about 13 to about 16 mm across. The sag height of the portion R1C2 can be less than about 3.6 mm, for example, such that portion R1C2 can be deflected when placed on the eye. The portion corresponding to R1C1 can be fit to the cornea in many ways as described herein.

Table B4 shows device 100 having curvatures for use with non-ablated eyes so as to pump tear liquid as described herein, for example with an extended wear contact lens. Device 100 has a diameter of approximately 14 mm across and can be fit on K or flatter, for example as described herein. The table lists R1 corresponding to the center ablated portion of the cornea. The inner portion 110 comprising optical component 100A and inner coupling component 100B1 has dimension R1 extends about 5 mm across. The curvatures of the inner portion corresponding to R1 have curvature values corresponding to optical powers from about 39 D to about 48 D, which can be based on population data for unablated eyes and combined with the curvatures for portions R1B1 to R1B3 and R1C1 and R1C2, for example. The portion corresponding to radius R1B1 has dimensions of about 5-7 mm across, and the curvature can be expressed with keratometry values (K-values) corresponding to the optical power of the eye in Diopters (D). The portion corresponding to radius R1B2 has dimensions of about 7-9 mm across. The portion corresponding to radius R1B3 has dimensions of about 9 mm to 11 mm across. The portion corresponding to R1C1 can extend from about 11 mm to about 13.5 mm across. The portion corresponding to R1C2 can extend from about 13.5 mm to 14 mm across. The sag height of the portion R1C2 can be from about 3.1 mm to about 3.4 mm, for example. The portion corresponding to R1C1 can be fit to the cornea in many ways as described herein, for example with the tangent of portion R1C1 aligned with R1B3 on the inner boundary and R1C2 along an outer boundary so as to inhibit ridge formation as described herein.

Although Tables B1-B4 list specific curvature values by way of example, a person of ordinary skill in the art can determine many curvature values based on the teachings and embodiments described herein and one or more of the curvatures can be combined with an aspheric surface, for example an aspheric surface having a conic constant.

Figure 3A:
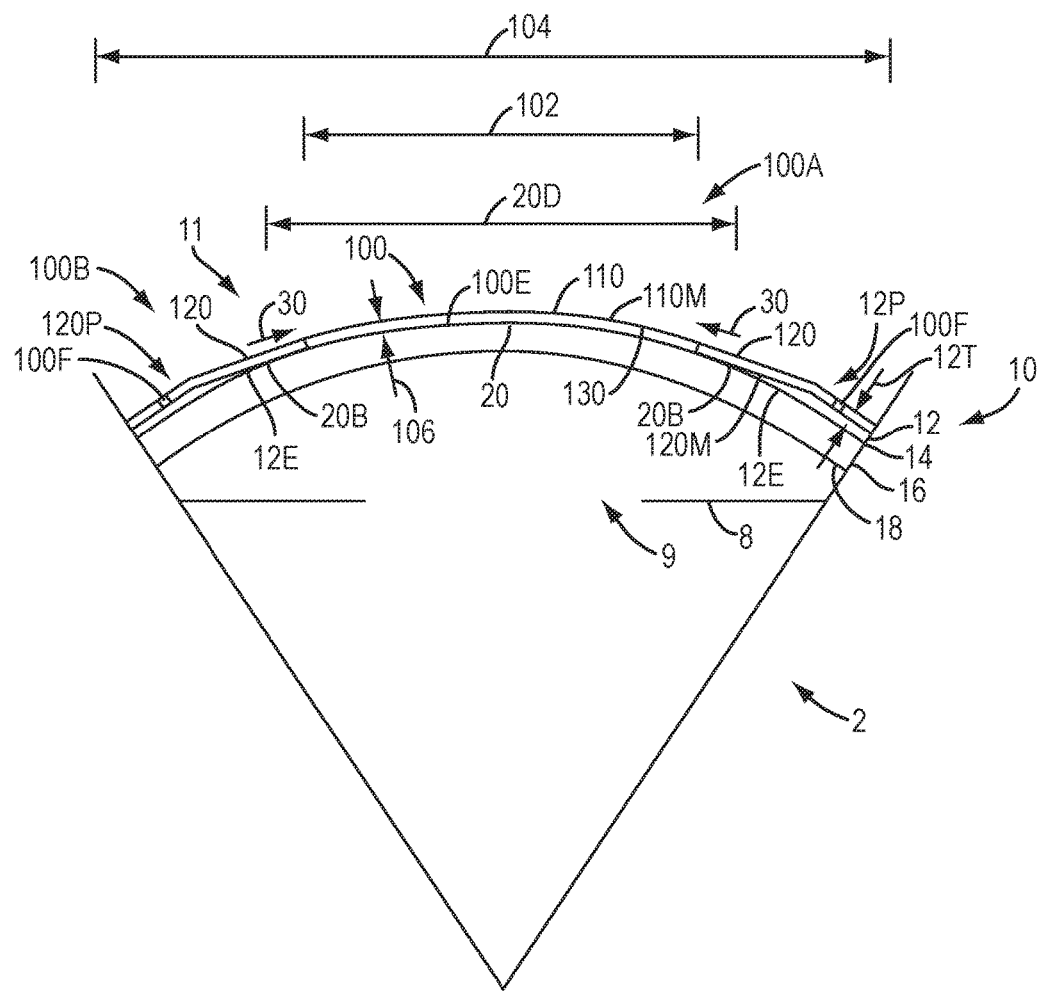
FIG. 3A shows a device positioned on cornea an eye having an epithelial defect, in accordance with embodiments.

FIG. 3A shows a device 100 positioned on cornea 10 an eye 2 having an epithelial defect 11. The device may comprise a curved body, for example a curved contact lens body shaped to fit the cornea.

The device 100 can be sized to cover the ablated profile and epithelial defect. The inner portion 110 comprises a dimension across 102 that can be sized to extend across a majority of the ablation, and the outer portion 120 comprises a dimension across 104 sized to extend across at least the epithelial defect and contact the epithelium on opposite sides of the defect.

The dimension 102 extending across a majority of the ablation may extend about 6 to 8 mm, for example, and may be sized larger than the ablation. The dimension 104 may comprise about 12 mm to 14 mm across, for example so as to extend to the limbus and can be sized to the limbus of the patient for example. Work in relation to embodiments suggests that the device sized to extend to the limbus and circumferentially around the limbus can be centered on the cornea. The device may extend such that the outer rim of the device contacts the conjunctiva disposed above the sclera peripheral to the limbus, for example, and that such configurations may center the lens on the cornea, for example.

The thickness of the device can be sized and shaped in many ways. The inner portion 110 of the device comprises a thickness 106 and the outer portion 120 of the device comprises a thickness 108. The thickness 106 of the inner portion may comprise a substantially uniform thickness such that the inner portion comprises an optical power of no more than about ±1 D prior to placement on the eye, for example when held in front of the eye and separated from the cornea by a distance. Alternatively, the thickness of the inner portion may vary so as comprise optical power, for example optical power to correct vision of the patient.

A smooth layer 12S of regenerated epithelium 12R may substantially cover an ablated profile. The environment 100E is configured to guide epithelial regeneration and smooth the regenerated epithelium. The regenerating epithelium comprises a thickness profile 12RP.

The epithelium grows centripetally from circumscribing boundary 12E toward the center of ablated profile 20 to cover the exposed stroma, as indicated by arrows 30.

The device 100 may comprise an inner portion 110 and an outer portion 120. The outer portion 110 can be configured to form a seal 100S with the cornea near the edge of the ablation and the epithelial defect, for example with a soft conformable material such as silicone elastomer or silicone hydrogel. The inner portion 120 is positioned over the pupil and configured for the patient to see, and may comprise a rigidity greater than the outer portion, so as to smooth irregularities of the epithelium when the cornea heals. Alternatively, the inner portion may comprise rigidity equal to or less than the rigidity of the outer portion as well. For example, the inner portion may comprise silicone and the outer portion may comprise silicone, and the inner portion may comprise one or more of a more rigid silicone or a greater thickness such that the inner portion can be more rigid than the outer portion so as to smooth the epithelium. Although the inner portion can be more rigid than the outer portion, the inner portion can be sufficiently soft, flexible and conformable so as to conform at least partially to the ablated profile 20 in the stroma, such that the patient receives the benefit of the vision correction with the ablation profile 20 when the patient looks through the inner portion and the inner portion smoothes the epithelium. Work in relation to embodiments of the present invention suggests that the regenerating epithelium is softer than the underlying stroma of ablation profile 20, such that the inner portion can be configured to conform to the shape of the ablation profile 20 when the inner portion smoothes the epithelium disposed under the inner portion, for example with deflection pressure as described herein.

Figure 3B:
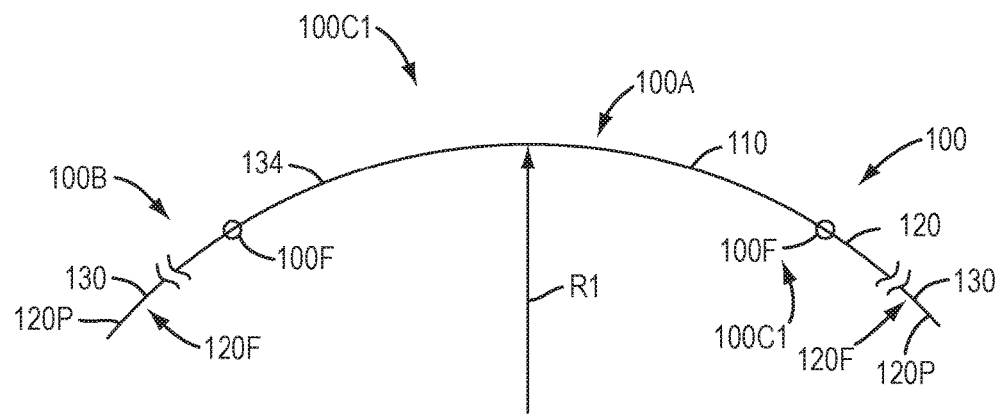
FIG. 3B shows a device in a first configuration prior to placement on cornea of an eye having an epithelial defect, in accordance with embodiments.

FIG. 3B shows device 100 in a first configuration prior to placement on the cornea of an eye having an epithelial defect, such as an eye having a PRK ablation. The device 100 comprises fenestrations 100F. The fenestrations 100F can be located on the device such that the fenestrations are located away from the epithelial defect to pump tear liquid under the device as described herein. The device 100 may comprise inner portion 110 having a base radius R1 of curvature, and the base radius of curvature may be slightly longer than the ablated cornea such that the device can be flatter than the cornea prior to placement on the cornea. The outer portion 120 comprising sclera coupling portion 130 may comprise a portion steeper than the cornea to reduce pressure to the limbus. For example flange portion 120F can be steeper than the corresponding portions of conjunctiva and sclera so as to decrease pressure of the device on the limbus.

The base radius R1 can be sized to the cornea in many ways. For example, the base radius R1 may have a radius corresponding to the post ablated eye.

The device 100 may comprise a modulus within a range from about 4 MPa to about 35 MPa, such that central portion can conform at least partially to the ablated stroma and so that the device can smooth corneal irregularities and stromal irregularities of the ablated cornea. The device may comprise an elastomeric stretchable material such that the device can stretch to fit the cornea, for example. The device having the modulus within a range from about 4 MPa to about 35 MPa can be formed in many ways as described herein. For example, the device may comprise a single piece of material having a substantially uniform thickness extending across the ablated cornea and at least a portion of the unablated cornea, and the single piece of material may comprise an elastic material such as a silicone elastomer or a hydrogel. Alternatively, the device may comprise a single piece of material having a non-uniform thickness extending across the ablated cornea and at least a portion of the unablated cornea. The device can be shaped in many ways and may comprise a single piece of one material, or may comprise a single piece composed to two similar materials, or may comprise a plurality of materials joined together.

The device 100 may comprise one or more outer portions extending outside the inner portion as described herein.

Figure 3C:
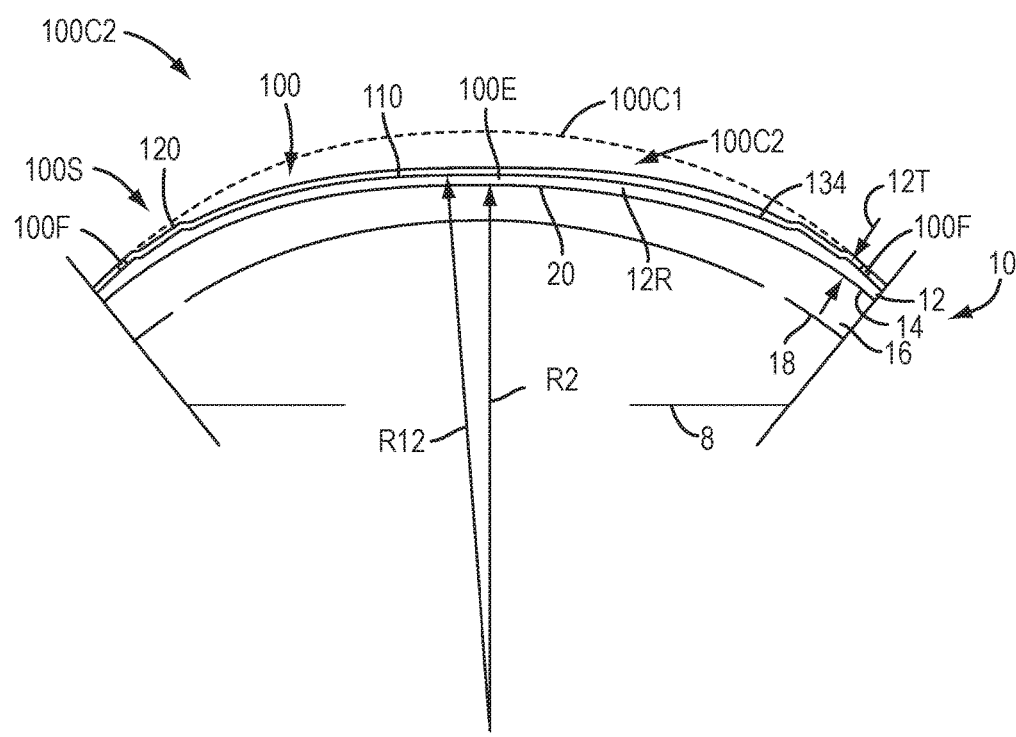
FIG. 3C shows the device of FIG. 3B placed on the eye having a second configuration, in accordance with embodiments.

FIG. 3C shows the device of FIG. 3B placed on the eye having a second configuration 100C2 conforming to ablated stromal tissue and smoothing the epithelium over the ablated stroma, such that the device can pump tear liquid as described herein. The cornea comprises an ablated surface 20 to correct vision that may have a corresponding radius of curvature, for example radius R2. The ablated profile 20 may comprise additional, alternative, or combinational shapes with those corresponding to radius R2, such as aberrations ablated into the cornea to correct aberrations of the eye and astigmatism ablated into the cornea, and the inner portion 110 of device 100 can conform to these ablated profiles of the cornea such that the patient can receive the benefit of the ablative vision correction when the device is positioned on the cornea. For example, the cornea ablation profile 20 may correspond to radius of curvature R2, and the inner portion 110 can flatten from configuration 100C1 corresponding to radius of curvature R1 prior to placement to a second configuration 100C2 corresponding substantially to the ablated profile 20, such the patient can see with the benefit of ablation profile 20. For example, the second configuration 100C2 can comprise a conforming radius of curvature R12 that corresponds substantially to radius of curvature R2. The profile corresponding to the first configuration 100C1 of the device 100 is shown positioned over cornea 10 to illustrate the change in profile of the device from configuration 100C1 prior to placement to conforming configuration 100C2 of the device 100 when positioned on the cornea.

The conformable device 100 comprises sufficient rigidity so as to smooth the epithelium when device 100 is positioned on the cornea over the ablation profile 20. The epithelium comprises a peripheral thickness 12T that may correspond substantially to a thickness of the epithelium prior to debridement of the epithelium to ablate the cornea. The epithelium also comprises regenerating epithelium 12R disposed over the ablation profile 20. The device 100 can smooth the epithelium 12R when conforming to the cornea in the second configuration 12C2. For example, irregularities 121 of the regenerating epithelium 12R disposed over the ablation can be smoothed when the epithelium regenerates along the inner portion of device 100, such that the irregularities 121 of the regenerating epithelium 12R are thinner than the thickness 12T of the peripheral epithelium.

Work in relation to the embodiments as described herein indicates that an at least partially conformable device having a modulus within a range from about 4 MPa to about 35 MPa can conform at least partially to the ablated stroma and smooth irregularities of the epithelium and stroma so as to improve vision as described herein. The device having the modulus within the range from about 4 MPa to about 35 MPa can be formed in many ways as described herein.

FIGS. 4A to 4H show a method 400 of manufacturing a device 100 and apparatus for manufacturing the device as described herein.

FIG. 4A shows a mold 600A to form an optical component 100A of a device 100 comprising material 110M as described herein. The optical component 100A may comprise an optically transparent material such as a silicone, for example. The optical component may comprise a modulus and thickness and corresponding rigidity as described herein, so as to provide vision and smoothing of the cornea. The mold 600A may comprise an optical correction on one surface and a base curvature on the opposite surface, for example. With a step 410, the optical component 100A can be formed in mold 600A.

FIG. 4B shows a mold 600B to form a device comprising the optical component of FIG. 4A and the coupling component 100B. The optical component 100A can be placed in the mold and the flowable material 120M of the coupling component injected into the mold so as to form the device. The solid inner component comprising a rigid material placed therein prior to injection of a flowable material. The mold 600B may comprise inner material 110M positioned within the mold as a solid piece of material and outer material 120M comprising a flowable material injected into mold 600B and cured around the preformed piece comprising inner material 120M. The flowable material can be injected around the inner material 100M in many ways. For example, the inner material 110M may comprise a second layer 110L2 of rigid material 110M2 of the inner portion 110 as described herein, and the flowable material can be injected around the upper and lower surfaces of second material 110M2 so as to form a first layer 110L1 of first material 110M1 and a third layer 110L3 of the third material 110M3 with the flowable material such that the first material 110M1, the third material 110M3 and the outer material 120M each comprise substantially the same soft material when cured. With a step 420, the device comprising the optical component 100A and the coupling component 100B can be formed.

FIG. 4C shows a mold 600C to form a device comprising the optical component of FIG. 4A and a layer of a soft material of the device, such that the optical component can be located between two layers of the coupling component. The optical component 100M can be removed from the mold as shown in FIG. 4A and placed in the mold 600C. The flowable material M3 corresponding to layer 110L3 can be injected into the mold and cured. The partially formed inner component comprising layer 110L2 and layer 110L3 can be removed from mold 600C. With a step 430, the portion of the device comprising the two layers can be formed.

FIG. 4D shows a mold 600D to form a device and having a solid inner component comprising the rigid material placed for injection of a flowable material, in accordance with embodiments of the present invention. The mold 600 may comprise inner material 110M positioned within the mold as a solid piece of material and outer material 120M comprising a flowable material injected into mold 600 and cured around the preformed piece comprising inner material 600. The mold may comprise an upper portion and a lower portion. In certain embodiments, the device 100 can be formed in a mold with rigid second material 110M2 placed in the mold and encapsulated within a single piece of material comprising first material 110M1, third material 110M3 and outer material 120M, such that first material 110M1, third material 110M3 and outer material 120M comprise the same material, for example silicone. The rigid second material 110M2 may comprise silicone bonded to each of first material 110M1, third material 110M3 and the outer material 120M, for example with curing such that first material 110M1, third material 110M3 and outer material 120M comprise the same soft silicone material bonded to the second material 110M2 comprising rigid silicone. With a step 440, the device comprising the solid inner component between first material 110M1 and third material 110M3 can be formed.

FIG. 4E shows formation of fenestrations in the device with energy. With a step 450 the device as described in FIG. 4B or FIG. 4D can be treated with energy 650, for example mechanical energy or electromagnetic energy such as light energy to form the fenestration extending through the device. For example, the fenestration can be removed from the mold and mechanically punched or ablated with laser light energy to form the fenestration.

FIG. 4F shows spin coating of a silicone or hydrogel material on a posterior surface of the device. An amount of a curable silicone or hydrogel forming material 660 as described herein can be deposited on the posterior surface of the device and spun with rotation 662 at rate such that the coating moves away from a center of the device toward and outer boundary of the silicone or hydrogel material. The outer boundary of the silicone or hydrogel material can be determined based on the amount of curable material 660 and spin rate, and the curable silicone or hydrogel material can be formulated to provide the desired thickness as described herein, for example a substantially uniform thickness within a range from about 1 µm to about 100 µm when fully hydrated. With a step 460, the curable silicone or hydrogel forming material 660 can be cured so as to provide the layer of silicone or hydrogel material on the lower surface of the device 100.

FIG. 4G shows chemical vapor deposition on the device having the silicone or hydrogel material formed thereon. The device 100 can be placed in a chemical vapor deposition chamber 670, and treated with one or more forms of chemical vapor deposition as described herein. With a step 460, the device 100 can be coated with the CVD to provide the wettable material on the surface of the device.

FIG. 4H shows the device comprising 100 the silicone or hydrogel material 120HG packaged in a container 680. The device can be sterilized, and can be packaged wet or dry, or combinations thereof in container 680. For example, the device can be placed with a fluid comprising saline in the container. Alternatively, the device 100 can be dry packaged in container 680, for example. With a step 480, the device 100 can be placed on container 680 and the container sealed.

It should be appreciated that the specific steps illustrated in method 400 provide a particular method of manufacturing a device, according to an embodiment of the present invention. Other sequences of steps may also be performed according to alternative embodiments. For example, alternative embodiments of the present invention may perform the steps outlined above in a different order. Moreover, the individual steps illustrated may include multiple sub-steps that may be performed in various sequences as appropriate to the individual step. Furthermore, additional steps may be added or removed depending on the particular applications. One of ordinary skill in the art would recognize many variations, modifications, and alternatives.

A method 500 of manufacturing device 100 comprising a contact lens to pump tear liquid may comprise one or more of the following steps:

505—Provide first mold for optical component
    510—Inject first flowable material into first mold
    515—Cure first flowable material to form first optical component
    520—Remove first optical component from first mold
    525—Place first optical component in second mold
    530—Inject second curable material into second mold

535—Cure second flowable material to form second component
    540—Remove second component from second mold
    545—Place second component in third mold
    550—Inject third flowable material into third mold
    555—Cure third flowable to form device
    560—Remove device
    565—Drill fenestrations
    570—Coat with wettable material The rigidity and hardness of the molded device can be determined by one or more of the material hardness, the modulus or the thickness. The molded device may comprise a device with an inner center more rigid than the outer periphery, for example, and the center can be thicker than edge. For example, the device may comprise a single piece device with an inner portion thicker than the outer portion such that the inner portion is more rigid than the outer portion. Alternatively or in combination, an optically clear inner portion can be molded; the inner portion placed in the mold, and the device molded to form the outer portion around the inner portion. For example, the molded inner portion comprising layer 110L2 of material 110M2 as described herein, and one or more of layers 110L1 or 110L3 molded around layer 110L2.

It should be appreciated that the specific steps illustrated in Method 500 provide a particular method of manufacturing a device, according to an embodiment of the present invention. Other sequences of steps may also be performed according to alternative embodiments. For example, alternative embodiments of the present invention may perform the steps outlined above in a different order. Moreover, the individual steps illustrated may include multiple sub-steps that may be performed in various sequences as appropriate to the individual step. Furthermore, additional steps may be added or removed depending on the particular applications. One of ordinary skill in the art would recognize many variations, modifications, and alternatives.

Clinical studies have been undertaken and are contemplated to show the pumping of the tear under the lens with blinking of the eye in accordance with the embodiments described herein. A person of ordinary skill in the art can determine empirically the properties of device 100 as described herein so as to provide pumping of the tear fluid under the device to provide one or more of an extended wear contact lens or a device for placement on the cornea following PRK to improve vision and promote reepithelialization.

As used herein, like reference characters indicate like structures that can be combined in accordance with the teachings and embodiments described herein.

In certain embodiments, methods for selecting ophthalmic lenses are provided. The methods may be used to correct a refractive error of an eye of a patient, the eye having a cornea with a refractive shape. In certain embodiments, methods for selecting ophthalmic lenses comprise determining a desired spherical power so as to mitigate any spherical component of the refractive error of the eye of the patient; and identifying, from among a plurality of alternative ophthalmic lenses having differing spherical powers, the ophthalmic lens corresponding to the desired spherical power. The identified ophthalmic lens may then be selected and applied to the eye of the patient to correct the spherical refractive error. The identified ophthalmic lens has an anterior surface corresponding to the desired optical power, and the anterior surface extends along an inner portion of the ophthalmic lens.

The ophthalmic lenses have an inner portion for correcting spherical refractive error and a peripheral portion for contacting an optical tissue. The inner portion of the ophthalmic lens is deformable and the peripheral portion of the ophthalmic lens is deformable. The inner portion of the ophthalmic lens has a modulus and a rigidity that is higher than the modulus and the rigidity of the peripheral portion. The peripheral portion of the ophthalmic lens has a shape suitable for engaging the eye outside the optical region so as to support the inner portion in alignment with an optical region of the eye. In certain embodiments, the peripheral portion is configured to engage a tissue of the eye such as the epithelium and to prevent or minimize motion of the ophthalmic device with respect to the optical region of the eye. In certain embodiments, the inner portion, the peripheral portion, or both the inner and peripheral portions may deform or deflect upon blinking of the eye.

In certain embodiments, the refractive shape of the epithelium extends across the optical region of the eye such that the refractive error comprises astigmatism and/or a high-order optical aberration. In such embodiments, the posterior surface extending across the optical region adjacent the eye may or may not comprise a refractive shape so as to mitigate the astigmatism and/or high-order aberration. Selection of a desired ophthalmic lens is performed so that the peripheral portion of the ophthalmic lens has a suitable shape to maintain a lenticular volume between the posterior surface of the ophthalmic device and the surface of the eye such as the epithelium. Before, during, and/or following positioning of the ophthalmic device on the eye, the lenticular volume fills with tear fluid such that the anterior shape of the ophthalmic lens corrects the refractive error. Accordingly, in certain methods, selecting an ophthalmic lens is performed so that the peripheral portion has a suitable shape such that tear fluid will fill a lenticular volume between the posterior surface and the refractive shape of the eye so as to mitigate the astigmatism and/or high-order aberration. Where tear fluid is disposed between the contact lens and the eye, and where the lens has a refractive index sufficiently close to that of the tear fluid, the refraction of the eye may be largely independent of the shape the posterior surface and/or lenticular volume, at least when the posterior surface initially contacts the lens and/or the contact lens remains disposed on the eye. In certain methods, identifying an ophthalmic lens is independent of as least one member of the group a power of the astigmatism; and orientation of the astigmatism about an optical axis of the eye, and/or as strength of the high-order aberration and/or a type of high-order aberration. As a consequence of the lenticular volume as defined by posterior surface of the eye and the refractive shape being filled with tear fluid, it is not necessary to orient an axis or position of the ophthalmic device with the eye.

Ophthalmic lens provided by the present disclosure may also be used for treating presbyopia. Methods for treating presbyopia comprise, for example, positioning an ophthalmic lens on an eye so that an inner portion of the ophthalmic lens is disposed over the optical region of the cornea of the eye, and supporting the inner portion of the ophthalmic lens by engagement between a peripheral portion of the ophthalmic lens and a tissue of the eye outside the optical region. The inner portion of the ophthalmic lens and the peripheral portion of the ophthalmic lens can be deformable such that the inner portion has a modulus and rigidity that is greater than the modulus and rigidity of the peripheral portion. To correct for presbyopia, the inner portion comprises a presbyopia-mitigating refractive shape. In certain embodiments, a presbyopia-mitigating shape is selected from an add region, a multifocal shape, an aspherical shape, and a combination of any of the foregoing. In certain embodiments, the peripheral portion comprises one or more radius of curvature configured to engage a tissue of the eye such as the epithelium so as to prevent or minimize motion of the inner portion with respect to the optical region of the cornea. The anterior portion of ophthalmic lens and the posterior surface of the eye define a lenticular volume that is configured to fill with tear fluid. To facilitate filling and/or flow of the tear fluid a plurality of fenestrations extending through the thickness of the peripheral region may be disposed in the peripheral region. The fenestrations are disposed so as to facilitate, in conjunction with motion of the ophthalmic lens, transfer of tear fluid through the lenticular volume. Such methods of treating presbyopia using an ophthalmic lens provided by the present disclosure may not require precise alignment of the ophthalmic lens with respect to the eye.

Similarly, methods for correcting a refractive error of an eye, such as astigmatism and/or spherical aberration, where the eye has a cornea with a refractive shape extending a cross an optical region of the eye are also provided. Methods for correcting a refractive error comprise positioning an ophthalmic lens on the eye so that an inner portion of the ophthalmic lens is disposed over the optical region of the cornea, wherein a posterior surface of the positioned ophthalmic lens extends adjacent the eye and has shape diverging from the refractive shape of the epithelium so that a lenticular volume is disposed between the posterior surface and the epithelium. A peripheral portion of the ophthalmic lens may comprise a plurality of fenestrations extending through the thickness of the peripheral portion and allowing passage of tear fluid between the lenticular volume and the posterior (outer) surface of the ophthalmic lens. In such embodiments, the inner portion of the positioned ophthalmic lens is supported by engagement of a peripheral portion of the ophthalmic lens and a tissue of the eye such as the epithelium outside the optical region. The peripheral portion is configured to support the inner portion of the ophthalmic lens, to prevent or minimize motion of the inner portion with respect to the optical region of the eye, and to facilitate filling of the lenticular volume with tear fluid.

Fenestrations may be disposed outside the optical region of the ophthalmic lens and inward of a region of engagement between the peripheral portion of the ophthalmic lens and a tissue of the eye. The inner portion and the peripheral portion of the ophthalmic lens are deformable, for example, deformable upon motion of an eyelid and/or over locally protruding epithelial regions so as to inhibit pain, such that the inner portion has a modulus and rigidity that is higher than the modulus and rigidity of the peripheral portion. In certain embodiments, the deformability of the inner portion and the outer portion of the ophthalmic lens are configured so that blinking of the eye induces flow of tear fluid through the fenestrations into and out of the lenticular volume, and that when the eye is not blinking the inner portion retains a shape that corrects the refractive error of the eye.

In certain embodiments, the peripheral portion comprises one or more radius of curvature configured to engage a surface of the eye and thereby resist motion of the inner portion with respect to the optical region of the eye. For example, in certain embodiments, a peripheral portion comprises a plurality of radii of curvature wherein the radii of curvature become smaller from the center of the ophthalmic lens toward the periphery. In certain embodiments, the engagement between the peripheral portion and the tissue surface of the eye along the engagement region inhibits lateral movement of the inner portion relative to the cornea during blinking.

In certain embodiments, methods of correcting refractive error provided by the present disclosure can, for example, mitigate the refractive error, when viewing with the eye through the anterior surface, substantially independent of a shape of the lenticular volume throughout a range of astigmatic errors of at least about 0.5 D, at least about 1.0 D, and in certain embodiments, at least bout 1.5 D, and is independent of a rotational orientation of the ophthalmic lens about a viewing axis of the eye.

Methods provided by the present disclosure further comprise methods of remodeling the shape of the epithelium of an eye. In certain embodiments, methods for optically remodeling the relative shape of the epithelium comprise positioning an ophthalmic lens on the eye so that an inner portion of the ophthalmic lens is disposed over the optical region of the cornea, wherein a posterior surface of the positioned ophthalmic lens extends adjacent the eye and has a shape diverging from the refractive shape of the epithelium so that a lenticular volume is disposed therebetween; and supporting the inner portion of the ophthalmic lens by engagement between a peripheral portion of the ophthalmic lens and the eye outside the optical region so that fluid fills the lenticular volume and viewing with the eye through an anterior surface of the ophthalmic lens mitigates the refractive error. In methods of remodeling the shape of the epithelium to correct refractive error of the eye, the ophthalmic lens may (though not always) does not comprise fenestrations. The posterior surface of the ophthalmic lens defines a refractive shape for correcting spherical power and when positioned on the eye defines a lenticular volume with the surface of the eye. Over time, the epithelium and/or underlying tissue of the eye may fill or otherwise occupy some, most, or all of the lenticular volume disposed over the optical region. As with certain other embodiments, an ophthalmic lens for use in remodeling the shape of the epithelium comprises a deformable inner portion and a deformable peripheral portion such that the inner portion has a higher modulus and rigidity than that of the peripheral portion and the peripheral portion is configured to engage a tissue surface of the eye and to inhibit lateral movement of the inner portion with respect to the optical region of the cornea.

In certain embodiments, methods of remodeling the refractive shape of the epithelium mitigate the refractive error when viewing with the eye through the anterior surface, substantially independent of a shape of the lenticular volume throughout a range of astigmatic errors of at least about 0.5 D, at least about 1.0 D, and in certain embodiments, at least bout 1.5 D, and is independent of a rotational orientation of the ophthalmic lens about a viewing axis of the eye.

Furthermore, when the ophthalmic lens is removed from the eye the optical remodeling of the epithelium mitigates the refractive error of the eye by at least about 1½ D at least about 8 hours, at least about 24 hours, and in certain embodiments, at least about 48 hours, after removal of the ophthalmic lens from the eye.

Certain embodiments provided by the present disclosure comprise sets of alternatively selectable ophthalmic lenses for correcting refractive errors of eyes of a population of patients. Such sets of ophthalmic lenses may be used in the methods disclosed herein. The plurality alternative ophthalmic lenses have differing spherical powers representing different refractive corrections. Each of the plurality of alternative ophthalmic lenses comprises an anterior surface corresponding to an associated desired spherical power, the anterior surface extending along an inner portion of the ophthalmic lens, wherein the inner portion of the ophthalmic lens is deformable; and a peripheral portion of the ophthalmic lens extending radially outward from the inner portion, the peripheral portion having a rigidity lower than that of the inner portion and configured for engaging tissue outside the optical region so as to support the inner portion in alignment with an optical region.

In certain embodiments, ophthalmic lenses suitable for use in methods provided by the present disclosure comprise an inner portion configured to be disposed over the optical region of the cornea of an eye, and a peripheral portion configured to support the inner portion of the ophthalmic lens by engagement between the peripheral portion of a tissue of an eye such as an epithelium disposed outside the optical region. The inner portion and the peripheral portion are deformable such that the modulus and rigidity of the inner portion is higher than that of the peripheral portion. In certain embodiments, the peripheral portion comprises one or more radii of curvature whereby the peripheral portion engages a surface tissue of an eye to prevent or mitigate motion of the inner portion with respect to the optical region of the cornea during blinking.

For treatment of presbyopia, the inner portion of the ophthalmic lens comprises a surface extending along the inner portion comprising a presbyopia-mitigating refractive shape.

For treatment of spherical refractive error the surface extending along the inner portion of the ophthalmic lens comprises a shape configured to correct spherical refractive error.

In certain embodiments, the inner portion may be configured to correct non-spherical refractive errors such as astigmatic error, multifocal error, higher order aberrations, and custom optically corrective functions such as pin holes.

Certain embodiments provided by the present disclosure include devices comprising an optical component and a coupling component, the optical component comprising a first material having a first modulus, and the coupling component comprising a second material having a second modulus, wherein the first modulus is greater than the second modulus. FIG. 5 shows device 500, comprising optical component 501 and coupling component 502.

In certain embodiments, device 500 has a diameter 510 from about 9 mm to about 16 mm, in certain embodiments, from about 10 mm to about 15 mm, and in certain embodiments, from about 12 mm to about 14 mm.

In certain embodiments, optical component 501 comprises a center thickness from about 150 μm to about 500 μm, from about 200 μm to about 400 μm, and in certain embodiments, from about 250 μm to about 350 μm.

In certain embodiments, optical component 501 comprises a first material having a first thickness 505 and a second material having a second thickness 503. In such embodiments, the second material may be disposed on the inner surface of optical component 501, e.g., the surface facing the cornea, and may be the same material as the material forming coupling component 502. The second material may have a thickness 503 from about 5 μm to about 60 μm, from about 10 μm to about 50 μm, and in certain embodiments, from about 20 μm to about 40 μm. In such embodiments, where optical component 501 comprises two materials, the total thickness of the optical component may be from about 100 μm to about 550 μm, from about 200 μm to about 450 μm, and in certain embodiments, from about 250 μm to about 350 μm.

In certain embodiments, optical component 501 comprises an optically clear material having a modulus from about 10 MPa to about 70 MPa, from about 20 MPa to about 60 MPa, from about 20 MPa to about 50 MPa, and in certain embodiments from about 30 MPa to about 40 MPa.

Optical component 501 may be configured to correct vision or may not be configured to correct vision.

In certain embodiments, optical component 501 comprises a material selected from silicone, silicone hydrogel, and a combination thereof. In certain embodiments, optical component 501 comprises silicone, in certain embodiments, silicone hydrogel, and in certain embodiments a combination of silicone and silicone hydrogel.

In certain embodiments, optical component 501 comprises a center thickness from about 150 μm to about 500 μm, a diameter from about 3 mm to about 9 mm, a radius of curvature from about 7 mm to about 12 mm, and a modulus from about 20 MPa to about 50 MPa.

In certain embodiments, coupling component 502 extends from optical component 501 to an outer periphery 504, where the thickness at the juncture with optical component 501 is the same as or similar to that of optical component 502, and gradually tapers toward outer periphery 504, wherein the thickness of the coupling component at the periphery us from about 5 μm to about 60 μm, from about 10 μm to about 50 μm, and in certain embodiments, from about 20 μm to about 40 μm.

In certain embodiments, coupling component 502 comprises at least one radius of curvature 512. For example, in certain embodiments, coupling component 502 comprises a single radius of curvature, and in certain embodiments, coupling component 502 comprises more than one radius of curvature such as two, three, four, five, six, or more than six radii of curvature. The at least one radius of curvature can be, for example, from about 5 mm to about 15 mm, from about 6 mm to about 13 mm, from about 7 mm to about 12 mm, and in certain embodiments, from about 6 mm to about 10 mm. The one or more radius of curvature 512 characterizing coupling component 502 are less than the radius of curvature of optical component 501.

In certain embodiments, coupling component 502 comprises a material having a modulus from about 0.05 MPa to about 4 MPa, from about 0.1 MPa to about 3 MPa, from about 0.1 MPa to about 2 MPa, and in certain embodiment from about 0.2 MPa to about 1.5 MPa.

In certain embodiments, coupling component 502 comprises a material selected from silicone, silicone hydrogel, and a combination thereof. In certain embodiments, coupling component comprises silicone, in certain embodiments, silicone hydrogel, and in certain embodiments a combination of silicone and silicone hydrogel.

In certain embodiments, coupling component 502 comprises a plurality of fenestrations 509 extending through the thickness of the coupling component. Coupling component 502 may comprise, for example, from 1 to about 30 fenestrations, from 1 to about 20 fenestrations, and in certain embodiments, from about 1 to about 10 fenestrations. Fenestrations 509 may have any suitable shape to provide egress of tear fluid. Suitable shapes include, for example, circular, elliptical, oval, rectangular, square, slot, or combination of any of the foregoing. Each of the plurality of fenestrations 509 may have the same shape or at least some of the fenestrations may have different shapes. In certain embodiments, the fenestrations have a maximum dimension (hole size) from about 50 μm to about 700 μm, from about 100 μm to about 500 μm, and in certain embodiments, from about 200 μm to about 400 μm. Each of the fenestrations may have the same maximum dimension or at least one of the fenestrations may have a different dimension.

In certain embodiments, coupling component 502 does not include fenestrations.

In certain embodiments, coupling component 502 comprises a thickness tapering from the thickness of optical component 501 to a thickness of about 30 µm at the periphery 504 of the coupling component; a plurality or radius of curvature from about 7 mm to about 12 mm; and comprises a material having a modulus from about 0.1 MPa to about 2 MPa. In embodiments in which coupling component 502 comprises a plurality of radii of curvatures 512, the radius of curvature decreases from the optical component toward the periphery.

The device, including optical component 501 and coupling component 502, is configured to provide a seal to a tissue of an eye such as an epithelium to thereby resist movement of the optical component on an eye.

Figure 6C:
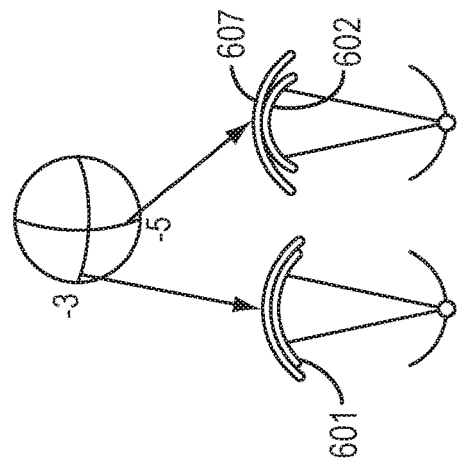
FIG. 6C shows views of radials for an example of a device according to certain embodiments of the present invention positioned on an astigmatic eye.
Figure 6B:
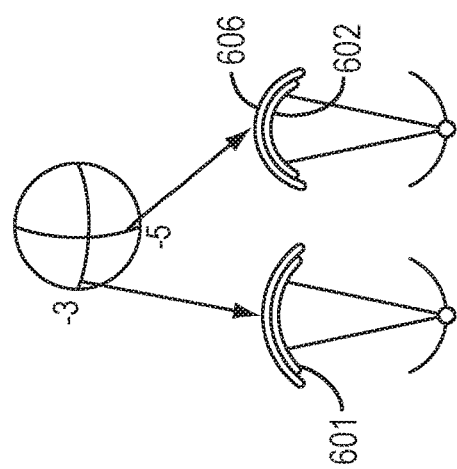
FIG. 6B shows views of radials for an example of a soft lens positioned on an astigmatic eye.
Figure 6A:
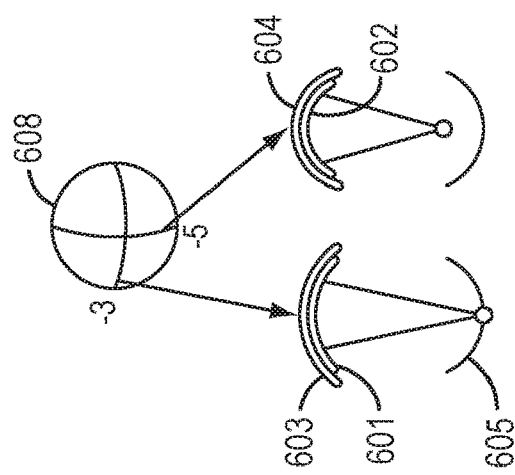
FIG. 6A shows views of radials for an example of a hard lens positioned on an astigmatic eye.

FIGS. 6A-6C show various lenses positioned on an astigmatic eye. For each of FIGS. 6A-6C, the left image shows the configuration of the first radial and the right image shows the configuration of the second radial corresponding to the aspheric projection 608. In FIG. 6A, the configuration corresponding to the first radial includes the optical surface of the eye 601 and soft refractive lens 603, which provides a focus on retina 605. In the right image of FIG. 6A, the second radial direction corresponds to a different refractive shape 602 that does not focus on the retina. Soft, conformable ophthalmic lens 604 conforms to shape 602 and thereby fails to correct the non-spherical aberration. FIG. 6B shows aspheric correction using a hard, non-conformable ophthalmic lens 606. Again, the first radial and the second radial correspond to different optical shapes 601 and 602, respectively. Although hard ophthalmic lens 606 corrects vision, the lens must be oriented to correct the asymmetric profile of the eye. FIG. 6C schematically shows correction of non-spherical aberration using ophthalmic lenses and methods provided by the present disclosure (with the peripheral portion of the eye and lens outside the optical region omitted for simplicity). Ophthalmic lenses provided by the present disclosure have a modulus and rigidity that is configured to provide a lenticular volume between the optical surface of the eye 602 and the ophthalmic lens 607. For correction of presbyopia, the ophthalmic lens is configured such that the lenticular volume fills with tear fluid. As can be appreciated, it is not necessary to orient ophthalmic lens 607 to correct non-spherical optical aberrations.

Devices provided by the present disclosure may be used as platforms in a number of ophthalmic applications including, for example, epithelium healing, spherical correction of astigmatism, presbyopic solutions, epithelial reshaping, and dry eye.

In certain embodiments, devices may be used to facilitate epithelial healing. Epithelial defects can occur, for example, as the result of PRK, filamentary keratitis, evaporative dry eye, or physical injury to the eye. In these and other applications, including applications in which vision is corrected, When positioned on the eye of a patient, the inner surface of the device and the outer surface of the eye, which may include, for example, the cornea, Bowman's membrane, and/or epithelium, can define a chamber to facilitate healing and/or growth of the epithelium. In such applications it is desirable that a device control moisture content and exhibit a high Dk to facilitate extended wear. Using devices and methods provided by the present disclosure, complete epithelial regrowth following PRK surgery can occur within about 48 hours, about 72 hours, 96 hours, and in for certain patients, within about 1 week following PRK.

When used for spherical correction of corneal astigmatism, devices and methods provided by the present disclosure exhibit the advantages of improved comfort compared to gas permeable lenses, enhanced vision compared to soft contact lenses, and reduced fitting time compared to toric and GP lenses. Devices and methods can, in certain embodiments, correct greater than 95% of astigmatic errors, irregular astigmatism such as induced by trauma or RK, and early kerotoconus.

In certain embodiments, a device comprises an optical component that corrects vision. Thus, in addition to spherical correction, the optical component can be configured to support multifocal, higher order aberration or custom optical designs such as pin holes.

In epithelial reshaping applications, devices and methods provided by the present disclosure can be used to reshape the epithelial during wear, and correct vision for a period of time after the device is removed from the eye. For example, to correct myopia, a device can be used to guide the epithelium toward the periphery of the eye and to create a flatter center curve. To correct hyperopia, a device may be used to guide the epithelium toward the center of the eye and to create a steeper center curve. In certain embodiments, a device can be used to induce multifocality for vision correction by guiding the epithelium toward a desired location or locations on a cornea by molding with an aspheric optic. The induction of multifocality through epithelial resphaping can be useful to correct vision in presbyopia and myopia.

In certain embodiments, ophthalmic lenses provided by the present disclosure are configured to correct refractive error such as astigmatism. The lenses provide a smooth spherical anterior surface and minimize lens-induced distortions by reducing flexure of the inner optical portion and by maintaining lens centration during wear. Reduced flexure of the inner optical portion can in part be accomplished by increasing the rigidity of the inner portion and by creating a tear lens. Centration of the inner optical portion minimizes astigmatic and prismatic effects caused by tilting of the optic and also minimizes edge distortion.

Ophthalmic lenses provided by the present disclosure can achieve visual correction at least equivalent to that of soft toric contact lenses and achieve a superior comfort level compared to soft toric contact lenses. Furthermore, because the ophthalmic lenses provided by the present disclosure are radially symmetric, fitting to an eye of the patient involves only accommodating the spherical correction and an inventory of lenses for correcting cylindrical error is not required.

Ophthalmic lenses provided by the present disclosure include an inner optic portion configured to be disposed over the optical region of the cornea and a peripheral or outer portion that is disposed radially outward of the inner portion. An ophthalmic lens includes a posterior surface that extends along the inner portion of the lens and is adjacent an eye when applied to an eye of a patient. An ophthalmic lens also includes an anterior surface that extends along the outer surface of the lens and opposite the posterior surface. In general, the inner portion of a lens is configured to improve vision and the peripheral portion is configured to improve comfort. However, the configuration of the inner portion can play a role in determining patient comfort, and the peripheral portion, at least in part, by maintaining centration of the inner optical portion on the optical portion of the cornea during wear enhances the visual outcome.

The inner optical portion of a lens is configured so that engagement of the posterior surface against the eye deforms the posterior surface so that the posterior surface of the inner portion has a shape diverging from the refractive shape of the epithelium and optical portion of the cornea. The anterior surface of the inner portion of the ophthalmic lens provides a spherical surface to correct a patient's vision.

In certain embodiments, the inner optical portion of a lens is characterized by a diameter from about 5 mm to about 10 mm, from about 7 mm to about 9 mm, from about 7.5 mm to about 8.5 mm, from about 7.8 mm to about 8.2 mm, and in certain embodiments, about 8 mm. The anterior inner portion of a lens is characterized by a substantially spherical profile without a cylindrical component. In certain embodiments, an inner portion is characterized by a thickness from about 100 µm to about 900 µm, from about 200 µm to about 900 µm, from about 300 µm to about 700 µm, 500 µm to 900 µm, from 550 µm to 850 µm, from 600 µm to 750 µm, from 600 µm to 800 µm, from 600 µm to 725 µm, and in certain embodiments, from 600 µm to 700 µm. In comparison, commercially available toric contact lenses for correcting refractive error are characterized by a thickness from about 150 µm to about 250 µm.

In certain embodiments, the inner portion comprises a first layer of material forming the posterior surface of the lens and a second layer of material forming the anterior surface of the lens. The first layer is thin and can be formed from the same material as that of the peripheral portion. In certain embodiments, first layer is from 10 µm to 60 µm, from 20 µm to 50 µm, and in certain embodiments from about 25 to about 35 µm thick. The first layer retains the inner portion. In certain embodiments, an inner portion comprises a third layer overlying the anterior surface of the second layer. Again, as with the first layer, the third layer is thin, having for example a similar thickness to that of the first layer, can be formed from the same material as the material forming the peripheral region, and retains the second layer, which is also referred to as the button. The second layer or button provides the bulk of the thickness of the inner portion of a lens.

The inner optical portion of a lens is characterized by a rigidity where the rigidity of the inner portion is greater than the rigidity of the peripheral portion of the lens. In certain embodiments, the inner portion is characterized by a rigidity from about 8E8 MPa-µm$^3$ to about 2 E10 MPa-µm$^3$. As disclosed herein, the rigidity is a function of the thickness and the modulus of the material. Ophthalmic lenses provided by the present disclosure employ a soft, low modulus material for the inner portion and achieve increased rigidity by increasing the cross-sectional thickness. For example, in certain embodiments, the modulus of the material forming the inner optical portion is from about 10 MPa to about 100 MPa. It is believed that the soft, low modulus material improves patient comfort.

In certain embodiments, the rigidity of the inner portion of the device is greater than the rigidity of the outer portion. For example, in certain embodiments, a device can have an inner rigidity from about 1.2E-6 Pa-m$^3$ to about 3.1E-3 Pa-m$^3$, from about 1E-5 Pa-m$^3$ to about 1E-3 Pa-m$^3$, and in certain embodiments, from about 1E-4 Pa-m$^3$ to about 1E-3 Pa-m$^3$.

In certain embodiments, a device can have an outer rigidity from about 5.4E-9 Pa-m$^3$ to about 1.5E-4 Pa-m$^3$, from about 1E-8 Pa-m$^3$ to about 1E-4 Pa-m$^3$, from about 1E-7 Pa-m$^3$ to about 1E-5 Pa-m$^3$, and in certain embodiments, from about 1E-6 Pa-m$^3$ to about 1E-5 Pa-m$^3$.

The rigidity of a portion of the device can be increased by increasing the thickness of a single material, using a material having a higher modulus for the same thickness, or by combining materials having different moduli and thicknesses.

The rigidity of a portion of a device is approximated by the modulus of the material comprising the portion multiplied by the cube of the thickness. When a portion comprises more than one material, the rigidity can be approximated based on the average modulus of the portion multiplied by the thickness cubed of the portion. For example, a portion comprising a first material with a modulus of 20 MPa and a thickness of 90 µm and a second material with a modulus of 5 MPa and a thickness of 10 µm will have an average modulus of 18.5 MPa. The rigidity of the portion can then be approximated by multiplying the average modulus times the cube of the thickness, which for the present example is determined to be 18.5E-6 Pa-m$^3$. Although these calculations can be based on approximations, a person skilled in the art can conduct simulations, for example finite element modeling simulations, so as to more accurately estimate relative rigidity and/or can measure pressures and deflection forces to determine rigidities of the various portions of the device.

In certain embodiments, an inner portion of a device is further characterized by an index of refraction that may correspond substantially to the index of refraction of the cornea, for example the index of refraction may be within a range from about 1.38 to about 1.43 so as to match the index of refraction of the cornea to within about ±0.05. In certain embodiments, the inner portion and the outer portion are characterized by an index of refraction from about 1.38 to about 1.43 so as to match the index of refraction of the cornea to within about ±0.05.

In certain embodiments, for example, where the device provides vision correction, the inner portion may be characterized by an index of refraction that is different than the refractive index of the cornea.

In certain embodiments, an inner portion comprises an optically clear material having a modulus from about 10 MPa to about 100 MPa, 10 MPa to about 70 MPa, from about 20 MPa to about 60 MPa, from about 20 MPa to about 50 MPa, and in certain embodiments from about 30 MPa to about 40 MPa. In certain embodiments, the inner portion comprises a material characterized by a modulus from about 20 MPa to about 30 MPa, from about 22 MPa to about 28 MPa and in certain embodiments about 25 MPa.

In certain embodiments, the inner portion of a device comprises a single material having a modulus from about 1.2 MPa to about 25 MPa, a thickness from about 100 µm to about 500 µm, and a rigidity from about 1.2E-6 Pa-m$^3$ to about 3.1E-3 Pa-m$^3$. In certain embodiments, the outer portion of a device comprises a single material having a modulus from about 0.2 MPa to about 1.4 MPa, a thickness from about 30 µm to about 500 µm (e.g., tapering from the thickness of the inner portion), and a rigidity from about 5.4E-9 Pa-m$^3$ to about 1.5E-4 Pa-m$^3$. In certain embodiments, the inner portion of a device comprises a single material having a modulus from about 1.2 MPa to about 25 MPa, a thickness from about 100 µm to about 500 µm, and a rigidity from about 1.2E-6 Pa-m$^3$ to about 3.1E-3 Pa-m$^3$; and the outer portion of a device comprises a single material having a modulus from about 0.2 MPa to about 1.4 MPa, a thickness from about 30 µm to about 500 µm (e.g., tapering from the thickness of the inner portion), and a rigidity from about 5.4E-9 Pa-m$^3$ to about 1.5E-4 Pa-m$^3$.

In certain embodiments, an inner portion comprises a material selected from silicone, silicone hydrogel, a hydrogel, and a combination of any of the foregoing. In certain embodiments, an inner portion comprises silicone, in certain embodiments, silicone hydrogel, in certain embodiments, a hydrogel, and in certain embodiments a combination of silicone and silicone hydrogel.

FIG. 7 shows a cross-section view of a device according to certain embodiments of the present invention. The device shown in FIG. 7 has a least a tri-curve profile including a central curvature, a mid-periphery curvature, and a peripheral curvature. The central curvature refers to the curvature of the inner portion of the device spanning an approximately 3 mm diameter region in the center of the device. The mid-periphery curvature refers to the curvature in a radial region about 5 mm from the center of the device. The peripheral curvature refers to the curvature toward the edge of the device. In certain embodiments, as shown for example in FIG. 7, the transition from the peripheral curvature region to other parts of the device may not be smooth and may be characterized by an angle. FIG. 7 shows a centerline 701 of devices 700 provided by the present disclosure, having a central region 702 and mid-peripheral regions 704 on either side of the central region 702. In certain embodiments, the diameter 703 of central region 702 is from about 5 mm to about 7 mm, from about 5.5 mm to about 6.5 mm, and in certain embodiments is about 6 mm. In certain embodiments, the mid-peripheral regions 704 extend form the edge diameter of center region 702 to about 5 mm from centerline 701. Accordingly, the diameter of the mid-peripheral region can be from about 7 mm to about 11 mm, from about 7 mm to about 10 mm, from about 6.5 mm to about 11 mm, from about 6.5 mm to about 10 mm, and in certain embodiments, from about 6 mm to about 10 mm. In certain embodiments, the peripheral diameter 707 of a device can be from about 11 mm to about 16 mm, from about 12 mm to about 15 mm, and in certain embodiments, about 14 mm. As referred to herein, the outer portion comprises the mid-peripheral regions, which are also referred to as intermediate portions, and the peripheral portion.

In certain embodiments, an outer portion comprises a material having a modulus from about 0.05 MPa to about 4 MPa, from about 0.1 MPa to about 3 MPa, from about 0.1 MPa to about 2 MPa, and in certain embodiment from about 0.2 MPa to about 1.5 MPa. In certain embodiments, the outer portion comprises a material characterized by a modulus from about 0.9 MPa to about 1.5 MPa, from about 1 MPa to about 1.4 MPa, and in certain embodiments, about 1.2 MPa. In certain embodiments, the material forming the peripheral portion is characterized by a modules from about 0.01 MPa to about 10 MPa, from about 0.01 MPa to about 8 MPa, from about 0.01 MPa to about 5 MPa, and in certain embodiments, from about 0.01 MPa to about 2 MPa. In certain embodiments, a device comprises an inner portion formed from a material such as a silicone polymer, silicone hydrogel, or hydrogel characterized by a modulus of about 25 MPa, and an outer portion formed from a material such as a silicone polymer or silicone hydrogel characterized by a modulus of about 1.2 MPa.

In certain embodiments, an outer portion comprises a material selected from silicone, silicone hydrogel, a hydrogel, and a combination of any of the foregoing. In certain embodiments, coupling component comprises silicone, in certain embodiments, silicone hydrogel, a hydrogel, and in certain embodiments a combination of silicone, silicone hydrogel, and/or a hydrogel.

In certain embodiments, the material forming a device including both the inner and outer portions have low water content and is characterized by low water or ion permeability. In certain embodiments, the water content is less than about 5%, less than about 4%, and in certain embodiments, less than about 3%. In certain embodiments, the material forming a device has a water content less than about 1%, less than about 0.6%, and in certain embodiments, less than about 0.3%. In certain embodiments, the material less than about $0.4 \times 10^{-6}$ cm$^2$/sec, less than about $0.2 \times 10^{-6}$ cm$^2$/sec, and in certain embodiments, less than about $0.1 \times 10^{-6}$ cm$^2$/sec.

In certain embodiments, the inner portion comprises a different material than the outer portion. In certain embodiments, the inner portion and the outer portion comprise the same material. In embodiments in which the inner portion and the outer portion comprise the same material, the different moduli may be realized by the detailed chemistry of the polymer used, such as characterized by different crosslinking densities.

In certain embodiments, the inner portion of a device and the outer portion of a device comprise a first material characterized by a first modulus and extending along a lower surface of the device; and the inner portion comprises a second material characterized by a second modulus disposed anteriorly to the first material, the second modulus being greater than the first modulus. In such embodiments, the first material is a thin layer that is configured to promote comfort of the device when applied to the cornea by cushioning between the anterior surface of the cornea and the layer of the first material. The second material is configured to promote a beneficial optical shape of an anterior surface of the applied device over the eye.

As a measure reflecting the rigidity of the inner portion, the flexure of the inner portion can be determined using the ISO 18369-4 flexure test method. The flexure of inner portions or buttons was determined for various thicknesses of a silicone material having a modulus of about 25 MPa.

A peripheral portion is radially disposed radially outward of the inner portion of an ophthalmic lens. In general, the peripheral portion retains the inner portion and is characterized by approximately the same thickness as the inner portion at the interface between the inner and peripheral portions, and the thickness of the peripheral portion tapers toward the peripheral edge. In certain embodiments, the diameter of the peripheral edge is from about from about 12 mm to 16 mm, 13 mm to about 16 mm, from about 13.5 mm to about 15.5 mm, from about 14 mm to about 15 mm, and in certain embodiments, from about 14.2 mm to about 14.8 mm.

The peripheral portion is characterized by a lower rigidity than the inner portion and can be formed from a material having a lower modulus than that of the inner portion. In certain embodiments, the material forming the peripheral portion is characterized by a modulus from about 0.5 MPa to about 2.0 MPa, from about 0.8 MPa to about 1.7 MPa, from about 1.0 MPa to about 1.4 MPa, and in certain embodiments, about 1.2 MPa.

The peripheral portion is configured to provide tear flow between the anterior surface of the device and the epithelium. In certain embodiments, the peripheral portion comprises a plurality of fenestrations extending from the anterior to the posterior surface of the peripheral portion. In certain embodiments, the plurality of fenestrations are disposed at a radius from a central optical axis of the ophthalmic lens such as for example, at a radius proximate to the interface between the inner portion and the peripheral portion. The plurality of fenestrations may be symmetrically or asymmetrically disposed. The fenestrations may be configured to pump tear liquid between the peripheral portion and the epithelium when the eye blinks so as to maintain a tear layer between the posterior surface of the lens and the epithelium and/or across the anterior surface of the lens. In certain embodiments, the plurality of fenestrations may be configured to facilitate removal of the lens from the eye. In certain embodiments, the plurality of fenestrations may be configured to facilitate air dissipation if air bubbles are trapped underneath the lens. In certain embodiments, the plurality of fenestrations facilitates the removal of air bubble entrapped within any lenticular volumes following application of a lens to a patient's eye. The plurality of fenestrations may facilitate both removal of the lens form the eye and dissipation of air bubbles. In certain embodiments, the plurality of fenestrations improves the reproducibility of visual outcome in a population of patients wearing the lens compared to the visual outcome in a population of patients wearing a comparable lens without fenestrations.

In certain embodiments, the inner portion, the peripheral portion, or both the inner and peripheral portions of an ophthalmic lens provided by the present disclosure are radially symmetric. In certain embodiments, the anterior surface of the inner portion and the posterior surface of the inner portion are radially symmetric.

In certain embodiments of ophthalmic lenses provided by the present disclosure, the inner portion and the peripheral portion are configured to allow movement of the lens relative to the eye in response to blinking of the eye. In such embodiments, an ophthalmic lens is configured such that the inner optical portion centers on the optical portion of the cornea following blinking. During blinking the inner portion, the peripheral portion, or both the inner and peripheral portions may deform and/or move with respect to the center optical axis of the cornea. When an ophthalmic lens is worn by a patient, depending at least in part by the shape of the patient's eye and the configuration of the lens, the ophthalmic lens may move during blinking or may exhibit only micro-movement. However, in certain embodiments, a lens is not configured to resist movement such that, for example, the peripheral edge of the lens is not configured to fixedly engage the epithelium or sclera such that the inner portion resists movement relative the cornea.

In certain embodiments of ophthalmic lenses provided by the present disclosure, the inner portion and the peripheral portion are configured to provide a tear fluid flow between the peripheral portion of the ophthalmic lens and the epithelium.

Figure 15A:
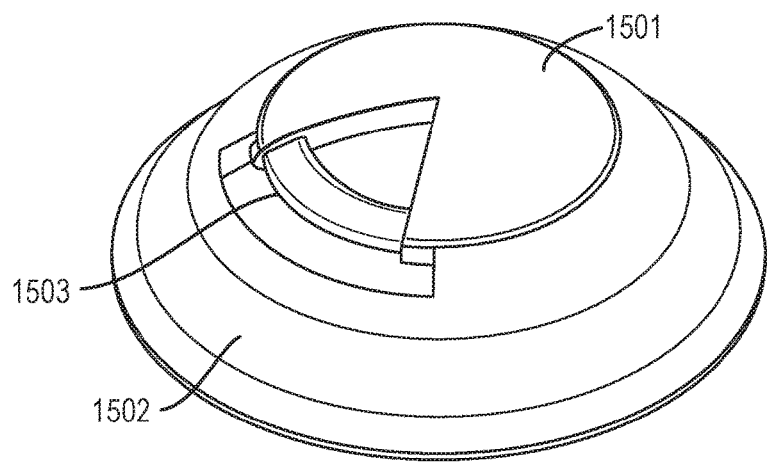
FIGS. 15A and 15B shows perspective and cross-sectional views, respectively, of an ophthalmic lens for correcting refractive error according to certain embodiments.
Figure 15B:
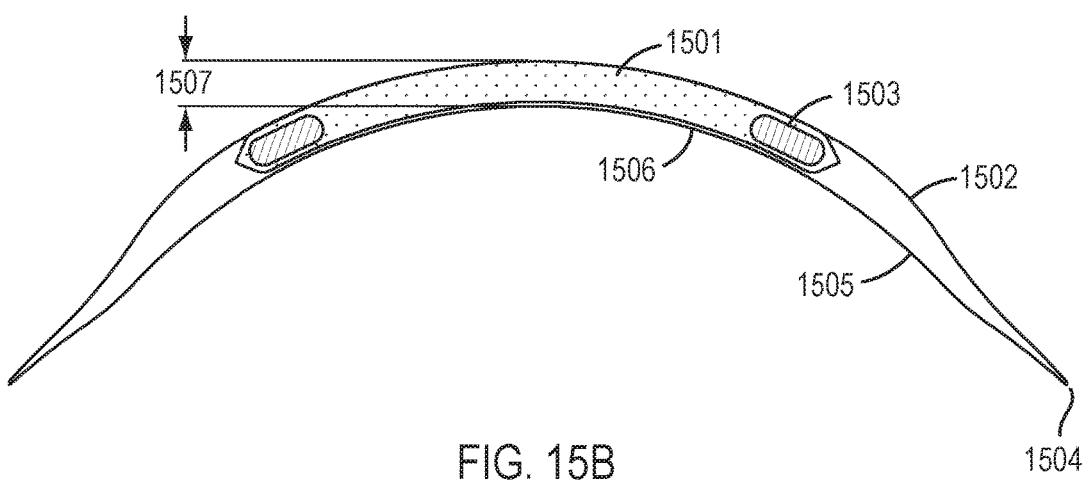

In certain embodiments, an ophthalmic lens provided by the present disclosure includes a reinforcement ring disposed toward the interface between the inner portion and the peripheral portion. FIGS. 15A and 15B show perspective and cross-sectional views of an ophthalmic device provided by the present disclosure incorporating a reinforcement ring. FIGS. 15A and 15B show an ophthalmic lens having a central optic portion 1501, a peripheral portion or skirt 1502, mechanically coupled to the inner portion 1501, in part by thin layer 1506 disposed along the posterior surface of the inner portion. Inner portion 1501 is characterized by a substantially uniform thickness 1507 and a rigidity that is greater than the rigidity of peripheral portion 1502. Peripheral portion 1502 includes a heal 1505 and a peripheral edge 1504. Reinforcement ring 1503 is disposed toward the interface between the central optic portion 1501 and the peripheral portion 1502 and in the embodiment shown in FIGS. 15A and 15B the reinforcement ring 1503 is embedded within central optic portion 1501. In FIG. 15A the different elevations of the central optic portion and the peripheral portion are intended to show that these portions may have one or more radius of curvature. A reinforcement ring may be disposed or embedded within the inner portion, disposed or embedded within the peripheral portion, or disposed at the interface between the inner and peripheral portions. A reinforcement ring is configured to prevent or minimize flexure of the inner optic portion from forces on the eye and/or forces of the eye lids such as during blinking. A reinforcement ring is disposed at a radial location such that the ring does not interfere with vision. A reinforcement ring may be a radially symmetric ring and can be configured to facilitate centering of the ophthalmic lens on the optical region of the cornea during wear. In certain embodiments, a reinforcement ring may be made from a material having a higher modulus than that of the materials forming the inner portion and the peripheral portion of the lens. In certain embodiments, a reinforcement ring may be made from a rigid, optically opaque or translucent material such as, for example, polyimide, polyether ether ketone, polyetherimide, polysulfone, polyether sulfone, polycarbonate, silicone-acrylate, fluorosilicone-acrylate, or a combination of any of the foregoing. In certain embodiments, a reinforcement ring may be made of a transparent rigid gas permeable polymer such as, for example, polymethylmethacrylate, fluorosilicone acrylate, a silicone acrylate or a combination of any of the foregoing. In certain embodiments, a reinforcement ring may be made from a metal such as, for example, titanium, stainless steel, cobalt steel, or a combination of any of the foregoing. In certain embodiments, the material forming the reinforcement ring has the same index of refraction as that of the material forming the inner portion. In certain embodiments, a reinforcement ring may have, for example, an inner diameter from about 4 mm to about 12 mm, from about 6 mm to about 12 mm, from about 8 mm to about 12, and in certain embodiments, from about 8 mm to about 10 mm. In certain embodiments, a reinforcement ring may have, for example, a width from about 0.1 mm to about 5 mm, from about 1 mm to about 4 mm, from about 2 mm to about 3 mm, and in certain embodiments, from about 0.5 mm to about 2 mm. In certain embodiments, a reinforcement ring may have, for example, a thickness from about 0.05 mm to about 0.5 mm, from about 0.1 mm to about 0.4 mm, from about 0.2 mm to about 0.3 mm, and in certain embodiments from about 0.2 mm to about 0.4 mm. A reinforcement ring may or may not include features to enhance adhesion of the ring to the material forming the center optic portion and/or the material forming the peripheral portion of the lens. For example, a reinforcement ring may include concave and/or convex surfaces, indentations, partial through-holes, full through-holes, perforations, serrated or irregular edges, or a combination of any of the foregoing.

Figure 14A:
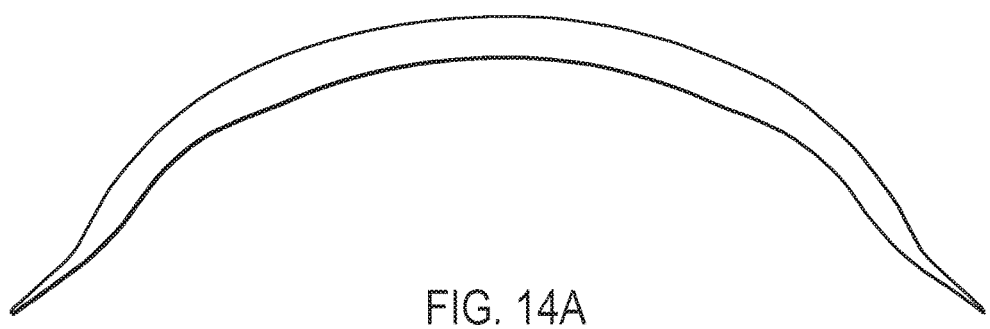
FIGS. 14A-14C shows cross-sectional profiles for three examples of ophthalmic lenses provided by the present disclosure.
Figure 14B:
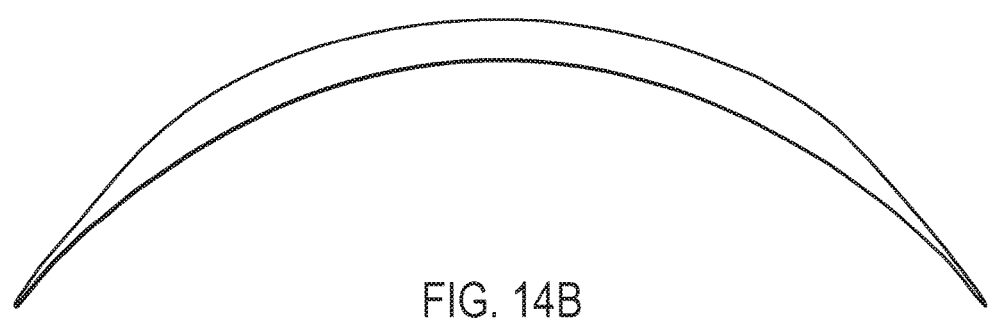
Figure 14C:
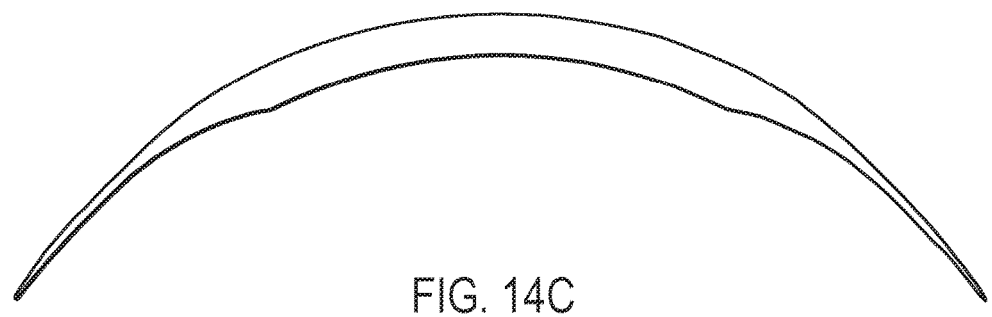

The peripheral portion of a lens can be tapered toward the peripheral edge. The taper may be continuous or discontinuous. The peripheral portion may be flared outward toward the peripheral edge and is referred to as a modified heeled configuration. A cross-sectional profile of a lens is determined by the inner portion characterized by a substantially constant thickness and the shape of the taper of the peripheral portion. Examples of cross-section lens profiles are shown in FIGS. 14A-14C. In general, the cross-sectional shape of an ophthalmic lens is configured to correct refractive error of any eye, center the lens on the optical portion of the cornea, facilitate motion of the lens with respect to the eye, provide flow of tear liquid between the posterior surface of the lens and epithelium, and to provide comfort to a patient wearing the lens. The ability of the lens to move, provide a fluid layer, and exchange tear fluid facilitates eye health and improves comfort for extended wear.

The flexure of the inner portion of lenses provided by the present disclosure is presented in Table 1. Table 1 provides the force (gm) required to flex an inner portion having thicknesses from 200 µm to 850 µm a certain percent of the un-flexed diameter. For thicknesses of 200 µm, 325 µm, and 550 µm, the force required to displace the inner portion by 1% was too small for the instrument to measure accurately. The results for a 150 µm-thick inner portion of a standard RGP toric lens and for a 250 µm-thick hybrid toric lens, used to correct refractive error are also presented in Table 1. As is shown by the results presented in Table 1, significantly more force is required to flex the toric lenses than ophthalmic lenses provided by the present disclosure having a similar thickness. This is at least in part the consequence of the toric lenses being made of a material having a much higher modulus than that of the present design.

TABLE 1

| Lens Design | Thickness (µm) | Force (gm) to flex | | |
|---|---|---|---|---|
| | | 1% | 10% | 20% |
| NXV Rigid | 200 | N/A | 1.2 | 1.6 |
| Silicone | 325 | N/A | 4.9 | 6.7 |
| | 550 | N/A | 20 | 25 |
| | 600 | 8 | 35 | 36 |
| | 725 | 15 | 65 | 69 |
| | 850 | 20 | 101 | 96 |
| RGP | 150 | 6.4 | 29 | 39 |
| Soft Toric | 250 | 16 | 116 | 167 |

In certain embodiments, the force required to flex the inner portion using the ISO 18369-4 flexure test method by 1% is from about 0.5 gm to about 50 gm, from about 1 gm to about 40 gm, and in certain embodiments, from about 5 gm to about 25 gm.

In certain embodiments, the inner portion is characterized by a rigidity from about 5.0E10 Pa-µm$^3$ to about 5.0E8 Pa-µm$^3$, 2.0E10 MPa-µm$^3$ to about 8E9 MPa-µm$^3$, from about 1.8E10 MPa-µm$^3$ to about 8.5E9 MPa-µm$^3$, from about 1.6E10 MPa-µm$^3$ to about 8.8E9 MPa-µm$^3$, and in certain embodiments, from about 1.5E10 MPa-µm$^3$ to about 9E9 MPa-µm$^3$. In certain of such embodiments, the thickness of the inner portion is from about 650 µm to about 850 µm, in certain embodiments, from 200 µm to 800 µm, and in certain embodiments, from 400 µm to 800 µm. And, in certain of such embodiments, the modulus of the material forming the inner portion is from about 20 MPa to about 30 MPa, from about 23 MPa to about 27 MPa, and in certain embodiments, about 25 MPa. This can be compared to soft toric lenses having a central optic thickness of about 70 µm, a modulus of 1.7 MPa, and a rigidity of about 5.8E5 MPa-µm$^3$. This can also be compared to a RGP lens having a center optic thickness of 150 µm, a modulus of 1,200 MPa and rigidity of 4E9 MPa-µm$^3$. Compared to a soft toric lens, in certain embodiments, ophthalmic lenses provided by the present disclosure have a relative rigidity of the central optic portion that is from about 10,000 to 30,000 times greater than the rigidity of the central portion of a soft toric lens.

In certain embodiments, the inner portion is characterized by a rigidity from 4E8 MPa-µm$^3$ to 1E10 MPa-µm$^3$, from 6E8 MPa-µm$^3$ to 1E10 MPa-µm$^3$, from 8E8 MPa-µm$^3$ to 1E10 MPa-µm$^3$, from 1E9 MPa-µm$^3$ to 1E10 MPa-µm$^3$ from 2E9 MPa-µm$^3$ to 1E10 MPa-µm$^3$, from 4E9 MPa-µm$^3$ to 1E10 MPa-µm$^3$, and in certain embodiments, from 6E9 MPa-µm$^3$ to 1E10 MPa-µm$^3$. In certain of such embodiments, the thickness of the inner portion is from about 100 µm to 900 µm, in certain embodiments, from 200 µm to 800 µm, and in certain embodiments, from 400 µm to 800 µm. And, in certain of such embodiments, the modulus of the material forming the inner portion is from about 20 MPa to about 30 MPa, from about 23 MPa to about 27 MPa, and in certain embodiments, about 25 MPa.

In certain embodiments, ophthalmic lenses provided by the present disclosure are characterized by a center rigidity of at least about 6E9 MPa-µm$^3$, at least about 8E9 MPa-µm$^3$, at least about 1E10, at least about 1.2E10 MPa-µm$^3$ and in certain embodiments, at least about 1.4E10 MPa-µm$^3$. The center rigidity can be selected based on the modulus and thickness of the material or materials used to form the center optical portion of a lens. In general, the rigidity of the central portion of a lens is selected to maintain a spherical anterior surface during use. In certain embodiments, the thickness of the center of the optical portion is at least 200 µm, at least 300 µm, at least 400 µm, at least 500 µm, at least 600 µm, at least 700 µm, and in certain embodiments at least 800 µm. In certain embodiments, the thickness of the center of the optical portion is from 100 µm to 900 µm, from 200 µm to 900 µm, from 300 µm to 900 µm, from 400 µm to 900 µm, from 500 µm to 900 um, from 600 µm to 700 µm, from 700 µm to 800 µm, and in certain embodiments at least 300 µm to 600 µm. In general, lenses with a thinner central thickness are more comfortable to wear. In certain embodiments, the inner portion of an ophthalmic lens is formed from a material characterized by a modulus less than 1,000 MPa, less than 750 MPa, less than 500 MPa, less than 250 MPa, less than 200 MPa, less than 100 MPa, less than 50 MPa, less than 30 MPa, less than 20 MPa, and in certain embodiments, less than 10 MPa. In certain embodiments, an ophthalmic lens is characterized by a center rigidity of at least about 6E9 MPa-µm$^3$, a thickness from 200 µm to 900 µm, and a modulus from 10 MPa to 1,000 MPa, and in certain embodiments a modulus from 10 MPa to 200 MPa.

In certain embodiments, an inner optic portion is characterized by a thickness from 100 µm to 900 µm, by a modulus from about 10 MPa to about 1,000 MPa, and a rigidity of at least about 4E8 MPa-µm$^3$. In certain embodiments, an inner optic portion is characterized by a thickness from 100 µm to 900 µm, by a modulus from about 10 MPa to about 600 MPa, and a rigidity of at least about 4E8 MPa-µm$^3$. In certain embodiments, an inner optic portion is characterized by a thickness from 100 µm to 900 µm, by a modulus from about 10 MPa to about 300 MPa, and a rigidity of at least about 4E8 MPa-µm$^3$. In certain embodiments, an inner optic portion is characterized by a thickness from 100 µm to 900 µm by a modulus from about 10 MPa to about 100 MPa, and a rigidity of at least about 4E8 MPa-µm$^3$.

In certain embodiments, an inner portion of an ophthalmic lens is characterized by a center rigidity of at least about 1E9 MPa-µm$^3$, a thickness from 100 µm to 800 µm, and a modulus from 10 MPa to 800 MPa, and in certain embodiments a modulus from 10 MPa to 200 MPa. In certain embodiments, an ophthalmic lens is characterized by a center rigidity of at least about 5E8 MPa-µm$^3$, a thickness from 100 µm to 800 µm, and a modulus from 10 MPa to 800 MPa, and in certain embodiments a modulus from 10 MPa to 200 MPa.

In certain embodiments and depending at least in part on the shape of a patient's cornea, the posterior surface of an ophthalmic lens may not completely conform to the surface of the epithelium during wear. Thus, at least a portion of the inner portion, the peripheral portion, or both the inner and peripheral portions by form a vault over at least certain portions of the underlying epithelium to form one or more lenticular volumes. The lenticular volumes may be filled with tear liquid. The ability of the lens to move on the eye during blinking and any fenestrations if present can circulate tear fluid the lenticular volume and exchange tear fluid with other parts of the eye.

In certain embodiments, the inner portion and the peripheral portion are formed from silicone, a silicone hydrogel, a hydrogel, or a combination of any of the foregoing.

Figure 8A:
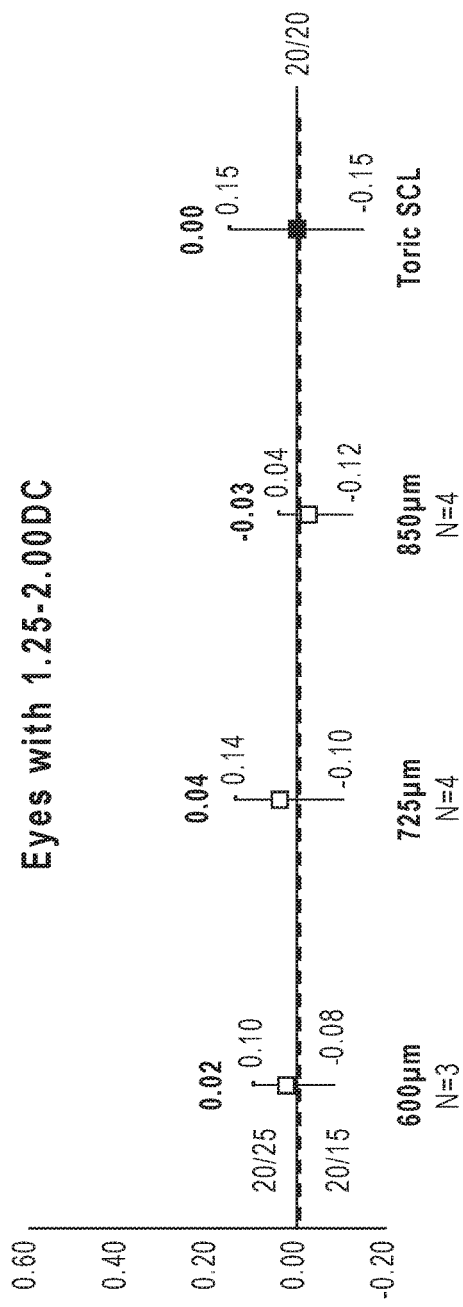
FIG. 8A shows the average spherical lens corrected visual acuity (Log MAR) for a population of patients having eyes with 1.25DC to 2.00DC uncorrected cylindrical error and wearing an ophthalmic lens provided by the present disclosure characterized by different thickness of the inner optical region.

FIG. 8A shows the average spherical lens corrected visual acuity (Log MAR) in a population of patients having uncorrected 1.25DC to 2.00DC cylindrical error (low to moderate astigmatism) when wearing a lens of the present disclosure. The average spherical lens visual acuity (Log MAR) for each thickness of lens is shown above the minimum and maximum values. The number of patients tested is also indicated in the figure. Soft toric contact lenses suitable for correcting low to moderate astigmatism provide 20/20 vision (Toric SCL) 0.00 Log MAR with a standard deviation of ±0.15 (±1 SD). Similar corrected visual acuities are obtained with lenses provided by the present disclosure in which the thickness of the inner portion is from 600 µm to 800 µm and a modulus of 25 MPa. As reflected by the minimum and maximum for the lenses provided by the present disclosure, the deviation in the corrected visual acuities are less than those for the toric soft contact lens product tested.

Figure 8B:
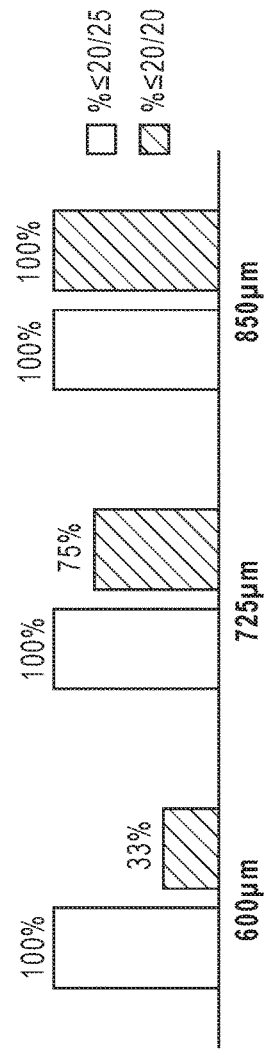
FIG. 8B shows the percent of patients in a population of patients having a visual acuity of less than 20/25 or less than 20/20 when wearing ophthalmic lenses provided by the present disclosure having different thicknesses and where the patients have eyes with uncorrected cylindrical error of 1.25DC to 2.00DC.

The results presented in FIG. 8A are represented in a different format in FIG. 8B to show the percent of patients having equal to or better than 20/25 vision or having equal to or better than 20/20 vision when wearing a lens having a central thickness of 600 µm, 725 µm, or 850 µm, provided by the present disclosure. Prior to wearing the lens, the patients had an uncorrected cylindrical error from 1.25DC to 2.00DC. As shown in FIG. 8B, 100% of patients had 20/25 vision or better for each thickness tested. Also, the percent of patients seeing 20/20 or better increased with the thickness of the inner portion of the lens.

In certain embodiments, devices for correcting refractive error in patients having low to moderate astigmatism corresponding to an uncorrected cylindrical error from about 1.25DC to about 2.00DC when worn by a patient provide at least 20/25 vision or 20/20 vision.

FIG. 9A and FIG. 9B show results similar to those provided in FIG. 8A and FIG. 8B for patients having uncorrected cylindrical error of 2.25DC to 3.00DC consistent with moderate to high astigmatism. The average spherhical lens visual acuity (Log MAR) for each thickness of lens is shown above the minimum and maximum of the measure values. The number of patients tested is also indicated in the figure. For patients with moderate to high astigmatism, soft toric lenses provide an average spherical lens corrected visual acuity (Log MAR) of 0.15±0.15 (±1 SD). As shown in FIG. 9A, ophthalmic lenses provided by the present disclosure having a central thickness from 600 µm to 850 µm and a modulus of 25 MPa provide an average spherical lens corrected visual acuity that is equivalent to or better than that of the tested toric soft contact lens. The histogram in FIG. 9B shows that for patients having moderate to severe astigmatism, the percent of patients seeing 20/25 or better and 20/20 increases with increasing thickness of the inner portion of the lens.

In certain embodiments, devices for correcting refractive error in patients having moderate to high astigmatism corresponding to an uncorrected cylindrical error from about 2.25DC to about 3.00DC when worn by a patient provide at least 20/25 vision or 20/20 vision.

In certain embodiments, when wearing an ophthalmic lenses provided by the present disclosure an average corrected visual acuity in a population of patients having from 2.25DC to 3.00DC cylindrical error is 0.1±0.15 Log MAR or better.

In certain embodiments, when wearing an ophthalmic lenses provided by the present disclosure an average corrected visual acuity in a population of patients having from 1.25DC to 2.00DC cylindrical error is 0.0±0.15 Log MAR or better.

Ophthalmic lenses provided by the present disclosure are configured to provide refractive correction equivalent to or better than RGP and soft toric lens, and to provide enhanced comfort. The comfort of lenses provided by the present disclosure is compared to that of commercially available soft toric contact lenses in FIG. 10A. A comfort score was determined by asking patients to rate the level of comfort experienced while wearing a particular lens on a scale from 1 to 10 with a score of 10 reflecting extreme comfort. The average comfort score for each thickness of lens is shown above the error bars for ±1 SD. The number of patients tested is also indicated in the figure. The average (±1 SD) comfort scores for patients wearing lenses of the present disclosure having an inner thickness from 275 µm to 850 µm are compared with the comfort score for five (5) different soft toric contact lens designs A-E. The results for the present lenses were obtained within 30 minutes after a lens was applied to an eye. For a 275 µm-thick lens, the comfort was also determined at the end of one day. The results for the soft toric contact lens were determined either one week or at the end of one day following application to the eye. The best soft toric contact lens provided a mean comfort score of 8.3 (±1.12) after one week of wearing. The lenses provided by the present disclosure provided an enhanced comfort score with thinner lenses exhibiting greater comfort.

In certain embodiments, devices for correcting refractive error exhibit a mean comfort level in a population of patients of at least 6.5, at least 7.5, at least 8, or at least 9 following wearing the device for at least one day or for at least one week. In certain embodiments, devices for correcting refractive error exhibit a mean comfort level in a population of patients of at least 6.5, at least 7.5, at least 8, or at least 9 following wearing the device for at least 30 minutes. The comfort scale is based on a scale from 0 to 10 where 10 is the highest comfort level corresponding to a patient not wearing a lens.

The percent of patients experiencing a comfort level equal to or greater than 8 or a comfort level equal to or greater than 9 for inner region thicknesses of 600 µm, 725 µm, and 850 µm are presented in FIG. 10B. The results generally demonstrate that the percent of patients experiencing high comfort increases for lenses having a thickness around 725 µm and less.

In certain embodiments, ophthalmic lenses provided by the present disclosure do not increase the risk of contact lens-related adverse events such as corneal ulcers, microbial keratitis, and iritis.

Figure 11:
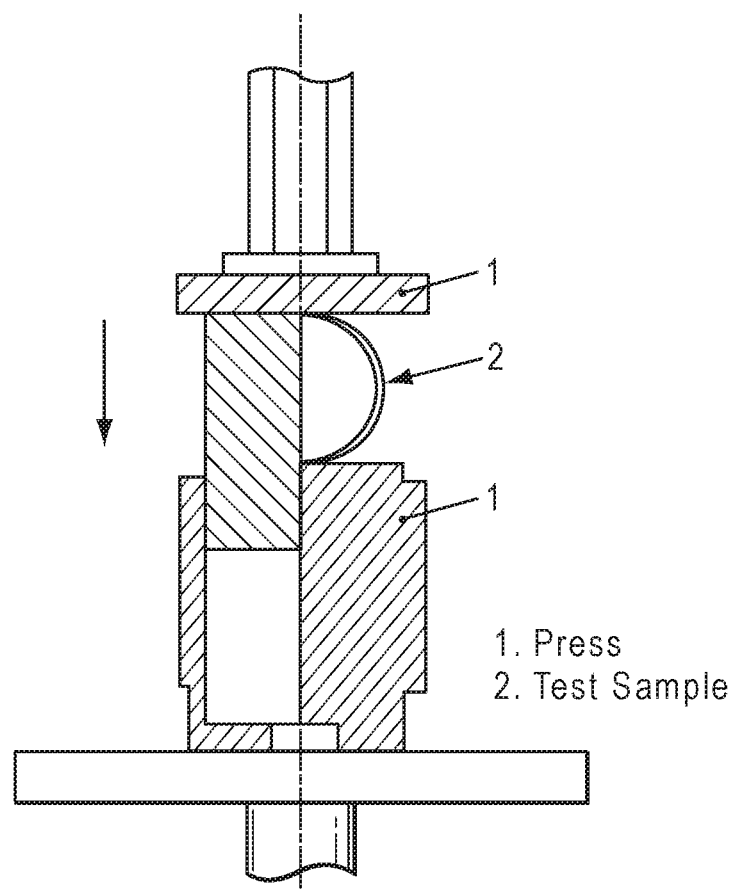
FIG. 11 shows the experimental configuration for measuring flexure of the inner portion of an ophthalmic lens according to ISO 18369-4.

FIG. 11 is a schematic diagram of instrumentation for testing the flexure of an inner portion or button of a contact lens consistent with ISO 18369-4.

Figure 12:
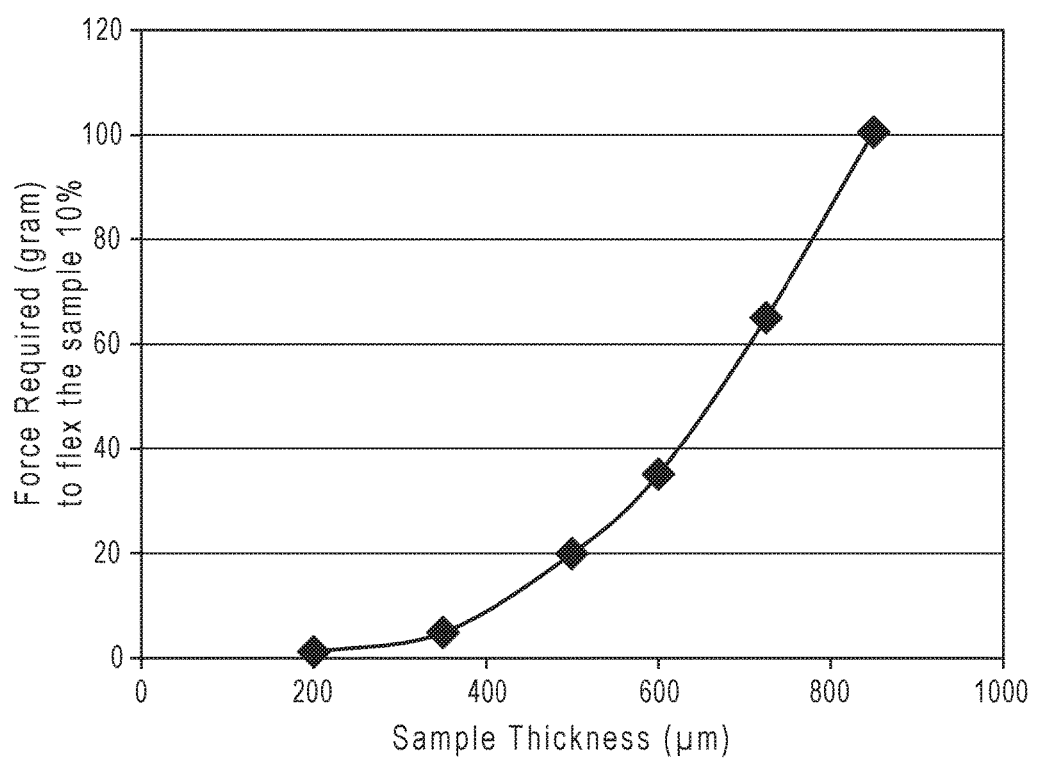
FIG. 12 is a graph showing the force (gm) required to flex certain embodiments of an inner portion of an ophthalmic lens provided by the present disclosure having different cross-sectional thicknesses.

FIG. 12 is a graph showing the relationship between thickness and flexure for certain ophthalmic lenses provided by the present disclosure. The force (gm) required to flex a central portion or button of a lens having a thickness from 200 µm to 800 µm by 10% is shown in FIG. 12.

Figure 13:
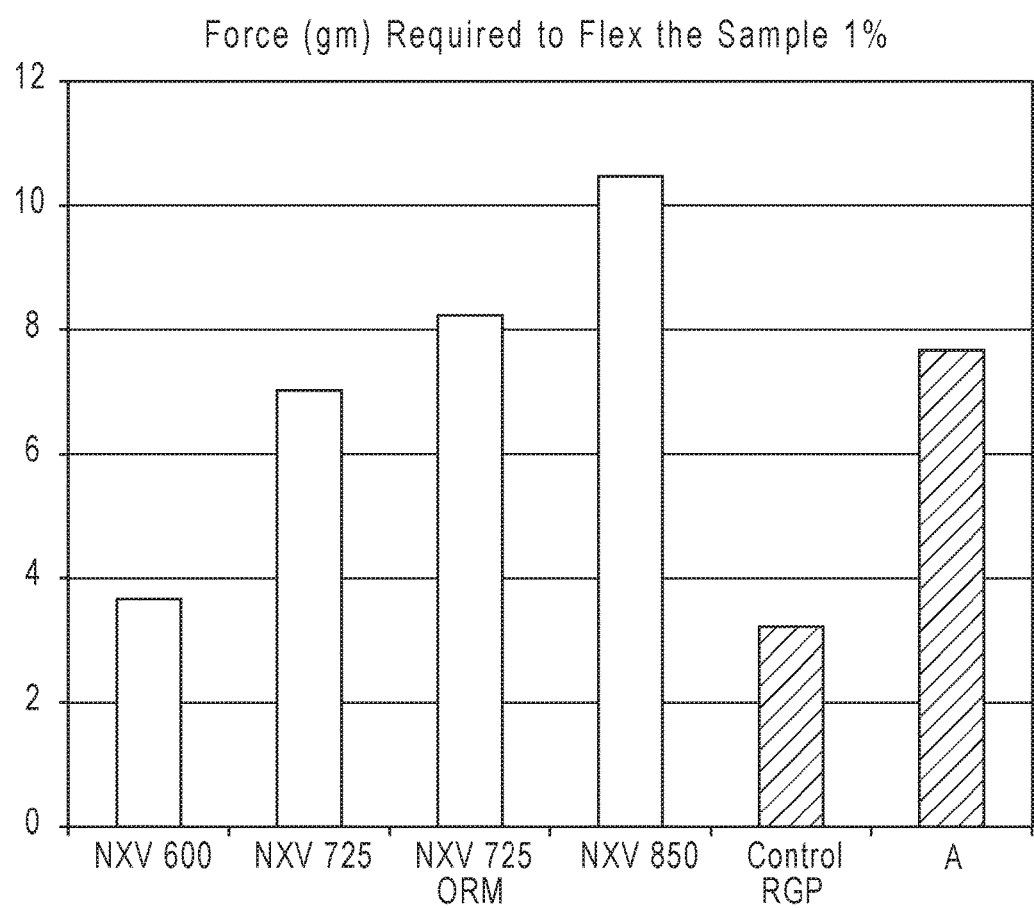
FIG. 13 is a histogram comparing the force (gm) required to flex an inner portion of ophthalmic lenses provided by the present disclosure by 1% with two commercially available lenses used to correct refractive error.

FIG. 13 is a histogram showing the force (gm) required to flex an inner portion or button of a lens by 1%. The flexure of lenses provided by the present disclosure (NXV) having a central thickness from 600 µm to 850 µm is compared to the flexure of a rigid gas permeable (RGP) lens and a soft toric contact lens (A) used for treating astigmatic error.

Devices and methods provided by the present disclosure can also be used to address dry eye. In such applications, the device material comprises a material such as silicone that has a low water content and low water absorption, water evaporation from the eye can be controlled and a tear or lubricant reservoir maintained.

Ophthalmic lenses provided by the present disclosure include features intended to confer attributes of benefit to a person wearing the lens. For example, the semi-rigid inner optic portion provides a near spherical anterior surface and maintains the intended near spherical curvature during wear. By minimizing toricity and irregularities of the anterior surface of the lens and minimizing flexure, the lens provides good vision. Vision and health of the eye are enhanced by the presence of fenestrations. Furthermore, the semi-rigid inner optic portion is sufficiently flexible to accommodate a range of corneal curvatures and is able to mask corneal toricity by forming a lenticular tear volume between the posterior surface of the lens and the cornea.

The fenestrations provide a supply of fluid between the posterior surface of the lens and the epithelium of the eye to maintain a tear layer, which supports the intended curvature of the lens to provide good vision. Fenestrations also maintain eye health by allowing for rapid tear exchange to circulate metabolic waste and to transmit oxygen to the tear layer. Fenestrations also prevent a lens from creating vacuum seal to the eye, allowing the lens to move on the eye and facilitating lens removal.

The materials forming the inner optic portion and the outer peripheral portion have a low Young's modulus that improves patient comfort. Also, a thickness of a material along the posterior surface of the inner optic portion having a Young's modulus less than the modulus of the material forming the inner optic portion may provide additional comfort. In addition to the effect of the fenestrations, eye health is further enhanced by the use of silicones and/or silicone hydrogels to form the lens. Silicones and/or silicone hydrogels are physiologically compatible and can provide high oxygen permeability and ion permeability.

In certain embodiments, ophthalmic lenses provided by the present disclosure include a plurality of fenestrations. The fenestrations can provide a supply of tear fluid to establish and maintain a tear volume between the posterior surface of the inner optic portion and the cornea to support the intended lens curvature, allow exchange of tear fluid to circulate metabolic waste, and to supply and maintain a high oxygen content at the surface of the cornea.

Fenestrations can be disposed within the inner optic portion of the ophthalmic lens, within the peripheral portion of the ophthalmic lens, or within both the inner optic and peripheral portions of the ophthalmic lens. In certain embodiments, the fenestrations may be disposed along one or more rings situated at a radius from the central axis of the ophthalmic lens. Each ring may include from one (1) to twenty (20) fenestrations. In certain embodiments, fenestrations may be disposed along one or more rings disposed at different radii from the central axis of the ophthalmic lens.

For example, in certain embodiments the plurality of fenestrations is disposed at a combination of a first radius, a second radius, a third radius, and a fourth radius from a central optical axis of the ophthalmic lens, wherein: the first radius is disposed within the inner optic portion and from 0.5 mm to 1.0 mm from an interface between the inner optic portion and the peripheral portion; the second radius is disposed within the peripheral portion and from 0.5 mm to 1.5 mm from the interface between the inner optic portion and the peripheral portion; the third radius is disposed within the peripheral portion and from 1.5 mm to 2.5 mm from the interface between the inner optic portion and the peripheral portion; and the fourth radius is disposed within the peripheral portion and from 0.5 mm to 2.5 mm from an edge of the peripheral portion.

Figure 16:
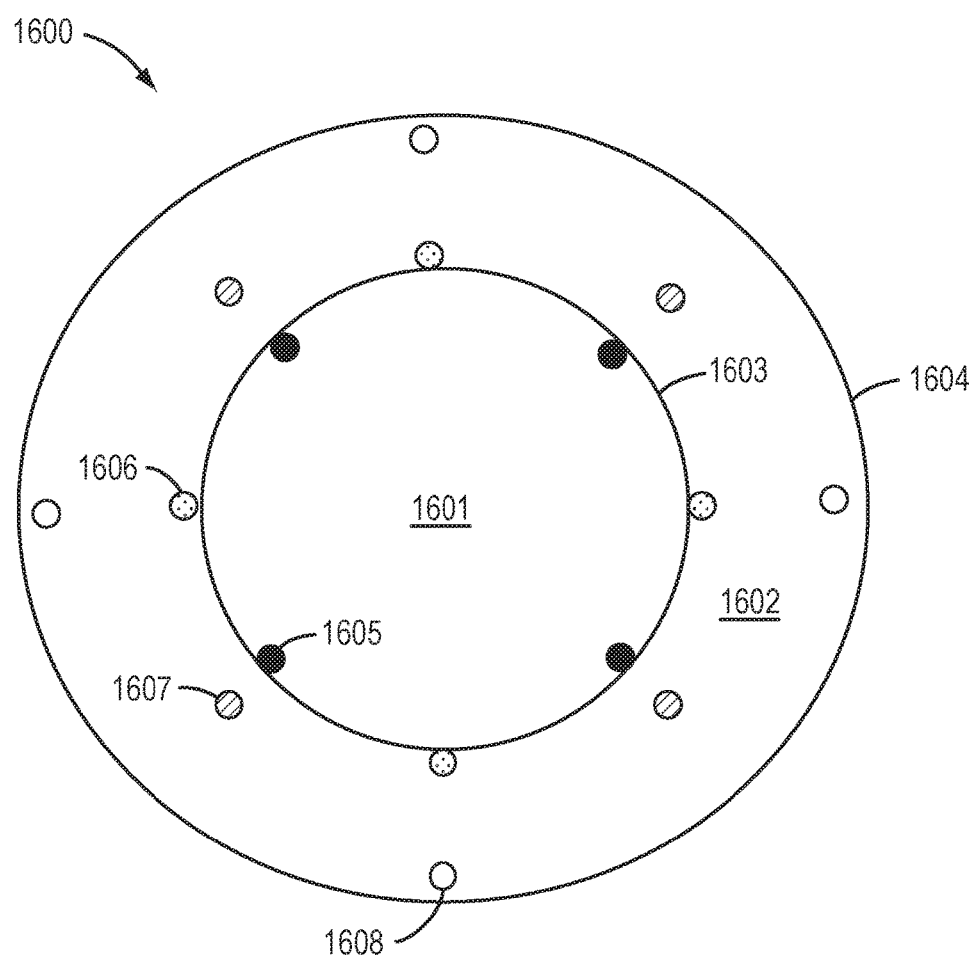
FIG. 16 shows fenestrations at various locations of an ophthalmic lens according to certain embodiments.

An example of an ophthalmic lens provided by the present disclosure is shown in FIG. 16, which shows the disposition of fenestrations in four rings disposed at different radial distance from the center axis of the ophthalmic lens. Other configurations of the fenestrations are included within the scope of the invention.

FIG. 16 shows an ophthalmic lens 1600 having an inner optic portion 1601 and a peripheral portion 1602 disposed radially outward of the inner optic portion 1601. Interface 1603 denotes the boundary between the inner optic portion 1601 and the peripheral portion 1602. Outer peripheral portion 1602 includes outer edge 1604 of the ophthalmic lens. As shown in FIG. 16, a plurality of fenestrations may be disposed within the inner optic portion, within the peripheral portion, or both the inner optic portion and the peripheral portion of the ophthalmic lens. At least some of the fenestrations 1605 may be disposed within the inner optic portion of the lens proximate the interface 1603. In certain embodiments, fenestrations within the inner optic portion are disposed at a location that is not coincident with the optical region of the cornea such that the fenestrations do not interfere with vision. In certain embodiments, at least some of the fenestrations 1606 may be disposed within the peripheral portion proximate the interface 1603. In certain embodiments, at least some of the fenestrations 1607 may be located at one or more positions within a middle of the peripheral portion and/or at least some of the fenestrations may be located proximate the peripheral edge 1604 of ophthalmic lens. In FIG. 16, the fenestrations are shown as being located at specific radii from the center of the ophthalmic lens; however, the locations shown in FIG. 16 are only examples.

In certain embodiments, an ophthalmic lens may comprise anywhere from 1 to 20 fenestrations. The location and cross-section of certain fenestrations may be configured to pump tear liquid between the posterior surface of the lens and the epithelium when the eye blinks. Circulation of tear fluid can help to maintain eye health. Certain fenestrations may be configured to maintain a tear layer between the eye and one or more portions of the posterior surface of the inner optic portion. The tear layer can help to maintain health of the eye, can help to provide comfort, and can facilitate removal of the lens from the eye. Certain portions of an ophthalmic lens may conform to the cornea while other portions may create one or more lenticular volumes between the posterior surface of a lens and the cornea. Certain fenestrations can be configured to maintain tear fluid within the lenticular volumes. The lenticular volumes in conjunction with the ophthalmic lens form a tear lens for improving vision. Fenestrations located proximate to the interface between the inner optic portion and the peripheral portion may serve to maintain tear fluid within lenticular volumes. Certain fenestrations such as those located within the peripheral portion may be configured to maintain eye health and to facilitate removal of the lens from the eye.

In certain embodiments, a plurality of fenestrations is disposed within the inner optic portion to provide for sufficient tear flow beneath the inner optic portion to establish and maintain a lenticular tear volume between the posterior surface of the inner optic portion and the cornea.

The tear volume maintains the spherical shape of the lens on the eye to improve patient vision. While certain portions of the posterior surface of the lens can conform to the surface of the cornea, where the cornea is characterized by toric and/or cylindrical irregularities, the inner optic portion is sufficiently rigid that it bridges the corneal irregularities creating a lenticular volume which is filled with tear fluid.

The number and location of the fenestrations can be configured to achieve one or more of these benefits.

In certain embodiments, the tear volume beneath certain portions of the inner optic portion of the ophthalmic lens can be maintained by fenestrations located just outside the diameter of the inner optic portion of the lens.

Fenestrations located within the peripheral portion of the lens can maintain eye health, provide tear film that facilitates motion of the lens on the cornea, and/or facilitate removal of the lens from the eye.

Fenestrations may be any suitable shape, be situated and any suitable orientation with respect to the cross-sectional profile of the lens. In certain embodiments, fenestrations are characterized by a circular cross-section having a diameter from about 50 μm to about 300 μm, from about 80 μm to about 250 μm, and in certain embodiments, from about 100 μm to about 200 μm.

In certain embodiments, ophthalmic lenses provided by the present disclosure include a sag height from about 3 to about 5, in certain embodiments, from about 3.5 to about 4.5, and in certain embodiments, from 3.5 to about 4.2. The sag height refers to the distance from the center of the lens to a line extending from the peripheral edge of a lens. For a particular optic curvature, lenses may be provided with several different sag heights to accommodate different eyeball sizes among a general population of patients. For example, lenses having particular optic curvature may be provided with three different sag heights from a nominal sag height of 4.0 in steps from about 0.15 to 0.3. For example, for lenses having a particular optic curvature, lenses having sag heights of 3.7, 4.0, and 4.3 can be provided. In certain embodiments, for lenses having a particular optic curvature, lenses having sag heights of 3.85, 4.0, and 4.15; sag heights of 3.8, 4.0, and 4.2; and in certain embodiments, sag heights of 3.75, 4.0, and 4.25, can be provided.

To enhance comfort, ophthalmic lenses provided by the present disclosure may include a thickness of a material having a low Young's modulus disposed on the posterior surface of the inner optic portion of the lens. The thickness may be less than about 50 μm, less than about 40 μm, less than about 30 μm, less than about 20 μm, and in certain embodiments, less than 10 μm. The material forming the thin layer or web may have a Young's modulus from about 0.01 MPa to about 10 MPa The material forming the thin layer underlying the inner optic portion may be the same as or different than the material forming the peripheral portion of the ophthalmic lens.

In certain embodiments, the thin layer or web underlying the inner optic portion may comprises a material selected from silicone, silicone hydrogel, a hydrogel, and a combination of any of the foregoing.

In certain embodiments, an ophthalmic lens for correcting a refractive error of an eye, the eye having a cornea with a refractive shape extending across an optical region of the eye, comprises: an inner optic portion configured to be disposed over the optical region of the cornea; a posterior surface extending along the inner optic portion adjacent the eye when the inner portion is disposed over the optical region, the inner optic portion configured so that engagement of the posterior surface against the eye deforms the posterior surface and so that the posterior surface has a shape diverging from the refractive shape of the cornea; a peripheral portion of the ophthalmic lens disposed radially outward of the inner optic portion; and an anterior surface of the ophthalmic lens extending along the inner optic portion opposite the posterior surface configured to mitigate the refractive error; wherein, the inner optic portion is characterized by an inner rigidity and the peripheral portion is characterized by a peripheral rigidity; the inner rigidity is greater than the outer rigidity; and the inner rigidity is from about 1E6 MPa-μm$^3$ to about 1E11 MPa-μm$^3$. In certain embodiments, the inner rigidity is from about 1E7 MPa-μm$^3$ to about 1E11 MPa-μm$^3$, from about 1E8 MPa-μm$^3$ to about 1E11 MPa-μm$^3$, from about 1E6 MPa-μm$^3$ to about 1E10 MPa-μm$^3$, from about 1E6 MPa-μm$^3$ to about 1E9 MPa-μm$^3$, and in certain embodiments, from about 1E6 MPa-μm$^3$ to about 1E8 MPa-μm$^3$.

In certain embodiments of an ophthalmic lens, the inner optic portion comprises a material having a modulus from about 10 MPa to about 150 MPa and the peripheral portion comprises a material having a modulus from about 0.01 MPa to about 10 MPa.

In certain embodiments, an inner optic portion is characterized by an inner rigidity and the peripheral portion is characterized by a peripheral rigidity, where the inner rigidity is greater than the outer rigidity; and the inner rigidity is from about 1E6 MPa-μm$^3$ to about 1E11 MPa-μm$^3$. In certain embodiments, the inner optic portion comprises a material having a modulus from about 10 MPa to about 150 MPa and the peripheral portion comprises a material having a modulus from about 0.01 MPa to about 10 MPa.

In certain embodiments of an ophthalmic lens, the inner optic portion and the peripheral portion comprise a material selected from silicone, silicone hydrogel, a hydrogel, or a combination of any of the foregoing.

In certain embodiments of an ophthalmic lens, the inner optic portion is characterized by a substantially spherical profile.

In certain embodiments of an ophthalmic lens, the inner optic portion and the peripheral portion are characterized by a water content less than about 5%.

In certain embodiments of an ophthalmic lens, the refractive error of the eye includes a cylindrical error; and the inner optic portion is characterized by a substantially spherical surface so that correction of the cylindrical error by the lens is primarily effected by the divergence of the shape of the inner optic portion from the refractive shape of the cornea.

In certain embodiments of an ophthalmic lens, the inner optic portion and the peripheral portion are configured to allow movement relative to the eye.

In certain embodiments of an ophthalmic lens, the inner optic portion and the peripheral portion are configured to provide a tear fluid flow between the inner optic portion of the ophthalmic lens and the cornea.

In certain embodiments of an ophthalmic lens, the refractive error of the eye comprises astigmatism; and the anterior surface of the inner optic portion and the posterior surface of the inner optic portion are radially symmetric.

In certain embodiments of an ophthalmic lens, the ophthalmic lens further comprises a plurality of fenestrations, wherein the plurality of fenestrations is disposed within the inner optic portion, the peripheral portion, or both the inner optic portion and the peripheral portion.

In certain embodiments of an ophthalmic lens, at least some of the plurality of fenestrations are disposed proximate an interface between the inner optic portion and the peripheral portion.

In certain embodiments of an ophthalmic lens, at least some of the plurality of fenestrations are configured to pump tear liquid between the posterior surface of the lens and the epithelium when the eye blinks.

In certain embodiments of an ophthalmic lens, at least some of the plurality of fenestrations are configured to maintain tear fluid within one or more lenticular volumes between the posterior surface of the inner optic portion and the cornea.

In certain embodiments of an ophthalmic lens, the inner optic portion is primarily configured to correct vision and the peripheral portion is primarily configured to enhance comfort.

In certain embodiments of an ophthalmic lens, the posterior surface of the inner optic portion comprises a thickness of a low modulus material.

In certain embodiments of an ophthalmic lens, the ophthalmic lens is characterized by a sagittal height (SAG) from 3 to 5.

In certain embodiments of an ophthalmic lens, the anterior surface is characterized by a spherical profile without a cylindrical component.

In certain embodiments of an ophthalmic lens, the ophthalmic lens comprises a reinforcement ring disposed proximate an interface between the inner optic portion and the peripheral portion.

In certain embodiments of an ophthalmic lens, the reinforcement ring is embedded within the inner optic portion.

In certain embodiments of an ophthalmic lens, the reinforcement ring is disposed within the inner optic portion and at a location that is not coincident with the optical region of the cornea.

In certain embodiments of an ophthalmic lens, the reinforcement ring is formed from a material having a higher modulus than a modulus of a material forming the inner optic portion.

In certain embodiments of an ophthalmic lens, the ophthalmic lens is configured to center on the optical region of the cornea following blinking of the eye.

In certain embodiments, methods for correcting a refractive error of an eye, the eye having a cornea with a refractive shape extending across an optical region of the cornea, comprise: positioning an ophthalmic lens on the eye so that an inner optic portion of the ophthalmic lens is disposed over the optical region of the cornea, wherein at least a portion of a posterior surface of the positioned ophthalmic lens extends adjacent the eye and is deformed by the eye; and wherein a shape of the posterior surface diverges from the refractive shape of the cornea so that the ophthalmic lens mitigates the refractive error.

In certain methods for correcting refractive error, an ophthalmic lens comprises: a peripheral portion of the ophthalmic lens is disposed radially outward of the inner optic portion; and an anterior surface of the ophthalmic lens extends along the inner optic portion opposite the posterior surface, wherein, the inner optic portion is characterized by an inner rigidity and the peripheral portion is characterized by a peripheral rigidity; the inner rigidity is greater than the outer rigidity; and the inner rigidity is from about 1E6 MPa-$\mu m^3$ to about 1E11 MPa-$\mu m^3$; and the posterior surface extends along the inner optic portion adjacent the eye when the inner optic portion is disposed over the optical region, the posterior surface having a shape diverging from the refractive shape of the cornea.

In certain methods for correcting refractive error, following wearing the lens for at least 30 minutes, an average comfort score in a population of patients is at least 6.5 out of 10 with a score of 10 being most comfortable and corresponding to a comfort level without wearing the lens.

In certain methods for correcting refractive error, following the positioning of the lens, an average corrected visual acuity in a population of patients having from 2.25DC to 3.00DC cylindrical error is 0.1±0.15 Log MAR or better.

In certain methods for correcting refractive error, following the positioning of the lens, an average corrected visual acuity in a population of patients having from 1.25DC to 2.00DC cylindrical error is 0.0±0.15 Log MAR or better.

In certain methods for correcting refractive error, the refractive error of the eye comprises astigmatism, spherical defocus, or a combination thereof; the ophthalmic lens further comprises a plurality of fenestrations, wherein the plurality of fenestrations is disposed within the inner optic portion, the peripheral portion, or both the inner optic portion and the peripheral portion; the inner portion of the ophthalmic lens is deformable and a peripheral portion of the ophthalmic lens disposed outward of the inner optic portion is characterized by a rigidity lower than a rigidity of the inner portion; and mitigation of the refractive error when viewing with the eye through the anterior surface is substantially independent of the shape of the peripheral portion throughout a range of astigmatic errors of at least about 1.5 D, and is independent of a rotational orientation of the ophthalmic lens about a viewing axis of the eye.

In certain embodiments, an ophthalmic lens for correcting a refractive error of an eye, the eye having a cornea with a refractive shape extending across an optical region of the eye, comprises: an inner optic portion configured to be disposed over the optical region of the cornea; a posterior surface extending along the inner optic portion adjacent the eye when the inner optic portion is disposed over the optical region, the inner optic portion configured so that engagement of the posterior surface against the eye deforms the posterior surface and so that the posterior surface has a shape diverging from the refractive shape of the cornea; a peripheral portion of the ophthalmic lens disposed radially outward of the inner optic portion; and a plurality of fenestrations disposed within the inner optic portion, the peripheral portion, or both the inner optic portion and the peripheral portion; and at least some of the plurality of fenestrations are configured to maintain tear fluid within one or more lenticular volumes between the posterior surface of the inner optic portion and the cornea, and wherein: the anterior surface is characterized by a spherical profile without a cylindrical component; the inner optic portion is characterized by an inner rigidity and the peripheral portion is characterized by a peripheral rigidity; the inner rigidity is greater than the outer rigidity; and the inner rigidity is from about 1E6 MPa-$\mu m^3$ to about 1E11 MPa-$\mu m^3$; and the inner optic portion and the peripheral portion are characterized by a water content less than 5%.

In certain embodiments, the inner optic portion is characterized by a maximum thickness from about 50 μm to about 900 μm. The maximum thickness refers to the thickness at the center of the lens. In certain embodiments in which the lens has a spherical power, the thickness of the inner optic portion may decrease from the thickness at the center toward the periphery of the inner optic portion. In certain embodiments, the maximum thickness of the inner optic portion may be from about 50 μm to 700 μm, from 100 μm to 600 μm, or from 100 μm to 400 μm.

In embodiments in which the inner optic portion is configured to provide a spherical correction, the thickness of the inner portion will not be uniform, and will be shaped to provide, for example, a spherical power from about −3.00 D to about +3.00 D. In such embodiments the thickness of the inner optic portion can taper from the center toward the peripheral portion depending on the spherical power.

In embodiments, in which correction of spherical power is not required, the thickness of the inner portion may be substantially uniform.

In certain embodiments, ophthalmic lenses are radial symmetric.

Certain embodiments of ophthalmic lenses provided by the present disclosure can be configured to provide one or more lenticular volumes between at least a portion of the posterior surface of the inner optic portion and the surface of the cornea.

When placed on the cornea, the posterior surface of the inner optic portion of the ophthalmic lens comprises a shape diverging from the refractive shape of the cornea and define a lenticular volume. In certain embodiments, at least a portion of the peripheral portion may also diverge from the refractive shape of the cornea and may define a lenticular volume. The peripheral portion of the lens may diverge from the refractive shape of the cornea near the interface of the inner optic portion and the peripheral portion. Depending upon the shape of the cornea, one or more lenticular volumes may be formed A lenticular volume defined by the peripheral portion of a lens may be fluidly connected to a lenticular volume defined by the inner portion and may facilitate exchange of tear fluid within one or more lenticular volumes. Tear exchange within a lenticular volume and to and from a lenticular volume may be facilitated by fenestrations through the ophthalmic lens. Such fenestrations may serve to pump tear fluid to and from a lenticular volume during blinking of the eye.

In certain embodiments, the inner optic portion comprises a shape configured to provide a spherical power to correct refractive error, and in certain embodiments, comprises a shape configured to correct non-spherical refractive error.

In certain embodiments, the anterior surface of the inner optic portion is characterized by a substantially spherical shape.

In certain embodiments, the posterior surface of the inner optic portion may be characterized by a substantially spherical shape.

In other embodiments, the posterior surface of the inner optic portion may be characterized by a non-spherical shape such as, for example, a toric shape. A lens in which the posterior surface is characterized by a non-spherical shape such as a toric shape is referred to as a bicurve or bitoric configuration. In embodiments in which the posterior surface is characterized by a toric shape, the shape can be configured such that the toric shape of inner optic portion aligns with an astigmatic axis of the cornea. The toric shape can reduce the lenticular volume compared to a spherical shape. The reduced lenticular volume results in less lens flexure of the contact lens during blinking.

A bitoric ophthalmic lens may have a bicurve surface on the posterior surface of the lens. A back surface bicurve design can improve the alignment of the lens with an astigmatic axis of the cornea. This has the advantage that there can be less space between the lens and the cornea, i.e., the lenticular volumes will be less, and may reduce the extent of flexure. In certain embodiments, a back surface bitoric design can induce a small amount of astigmatism such as, for example, 20%.

In certain embodiments, an ophthalmic lens will have a spherical power effect bitoric design that is independent of lens orientation. By adding a spherical power to the anterior surface of a back surface bicurve lens, the induced astigmatism can be corrected resulting in an optically spherical lens that is not sensitive to lens orientation.

In certain embodiments, the inner optic portion comprises a single material throughout the thickness.

In certain embodiments, the inner optic portion comprises more than one material, with different materials disposed in different axial portions of the inner optic portion. For example, the inner optic portion may comprise a first portion disposed toward and/or forming the anterior surface of the inner optic portion, toward and/or forming the posterior surface of the inner optic portion, or toward the center of the inner optic portion. In such embodiments, the first portion comprises a material characterized by a modulus higher than that of a material forming the peripheral portion. The first portion comprises a material and is characterized by a thickness sufficient to provide correction of refractive error.

In such embodiments, a first portion is configured to provide an optical function by providing one or more lenticular volumes between the posterior surface and the cornea, by providing spherical power, and/or in bicurve designs providing a toric component. The first portion comprises a material characterized by a modulus from about 100 MPa to about 1500 MPa and can have a maximum thickness from about 50 μm to about 900 μm. The thickness of the first portion may taper toward the interface between the inner optic portion and the peripheral portion. The first portion can have a spherically shaped anterior surface and may be shaped to provide a spherical power from about −3.00 D to about +3.00 D.

One or more portions may be disposed anterior to the first portion, posterior to the first portion, or both anterior to and posterior to the first portion. In certain embodiments, an anterior and/or posterior portion is formed from a material having a lower modulus than that of the first portion. In certain embodiments, an anterior and/or posterior portion is characterized by a maximum thickness that is less than that of the first portion. In certain embodiments, the anterior and/or posterior portions are configured to provide comfort, to modify the hydrophilicity/hydrophobicity of the inner optic portion, and/or to retain the first portion with the peripheral portion of the lens. In general, the anterior portion and/or posterior portion do not provide an optical function. In certain embodiments, the anterior portion and/or the posterior portion comprises a material having a modulus from about 0.1 MPa to about 10 MPa and may have a maximum thickness from about 5 μm to about 100 μm. The thickness of the anterior portion and/or posterior portion may be substantially the same across the radial profile or may vary across the radial profile of the lens. The thickness of the anterior portions and the posterior portions may depend at least in part on the shape of the first portion. In certain embodiments, an anterior portion and/or posterior portion comprises a hydrogel.

By virtue of being characterized by at least different moduli, the material forming the first portion is not structurally the same as the anterior material and/or the posterior material, although the materials may be based on similar chemistries and/or materials. In certain embodiments, the anterior material can be the same as the posterior material and in certain embodiments the anterior material can be different than the posterior material. In certain embodiments, the anterior material, the posterior material, and the peripheral material are the same and the anterior material and the posterior material extend from the inner optic portion to the peripheral portion.

In certain embodiments, one or more surfaces of the first portion may be treated to enhance the mechanical integrity and/or adhesion of the interface with the first portion and the anterior portion and/or the posterior portion.

Figure 17A:
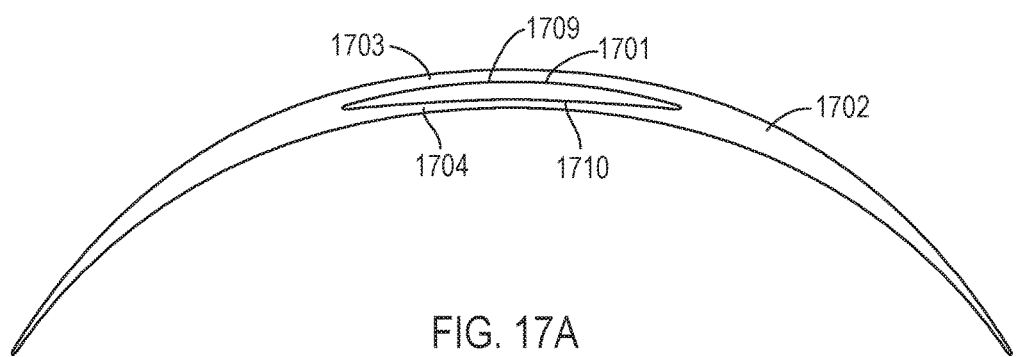
FIG. 17A shows a bimodular contact lens having a center optic portion and a peripheral portion.

FIG. 17A shows an ophthalmic lens having a first optic portion 1709 having an anterior surface 1701 and a posterior surface 1710. Anterior surface 1701 is characterized by a spherical shape. First optic portion 1709 is embedded or encapsulated within an anterior portion 1703 and a posterior portion 1704, which can be formed from a different material than that of the first optic portion. As shown in FIG. 17A, anterior portion 1703 and posterior portion 1704 are contiguous with peripheral portion 1702 and can be formed from the same material.

Figure 17B:
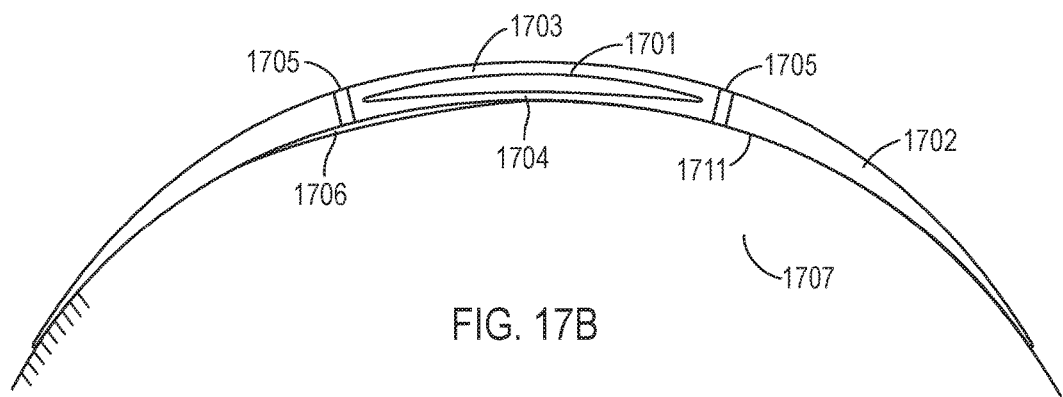
FIG. 17B shows the bimodular contact lens of FIG. 17A including fenestrations positioned on a cornea to form a lenticular volume.

FIG. 17B shows the ophthalmic lens of FIG. 17A positioned on a cornea 1707. When positioned on a cornea having a non-spherical shape, the peripheral portion 1702 of the lens deforms to engage the anterior surface 1711 of the cornea 1707, and in certain regions, defines lenticular volumes 1706 between the posterior surface of the lens 1711 and the anterior surface of the cornea. Rigidity provided by optic portion 1701 establishes a spherical profile of the posterior surface of the lens across the inner optic region such that the posterior surface of the lens spans non-spherical regions of the cornea to define one or more lenticular volumes. FIG. 17B also shows fenestrations 1705 extending through the ophthalmic lens, one of which is fluidly connected to lenticular volume 1706. Fenestrations 1705 can facilitate tear exchange between the anterior surface of the lens and the lenticular volume and between the anterior surface of the lens and the anterior surface of the cornea. Tear exchange can promote eye health and can maintain fluid within lenticular volumes.

In certain embodiments, the inner optic portion, the peripheral portion, or both the inner optic portion and the peripheral portion may comprise one or more coatings on the anterior surface, the posterior surface, or both the anterior surface and the posterior surface.

The one or more coatings may be selected, for example, to improve comfort, to facilitate tear flow, and/or to modify the hydrophilicity/hydrophobicity of the lens or portion of the lens. The one or more coatings may be the same in both the inner optic portion and in the peripheral portion or may be different in different portions of the lens.

In certain embodiments, the materials forming the inner optic portion, the peripheral portion, or both the inner optic portion and the peripheral portion are non-hydrous. A non-hydrous material refers to a material characterized by a water content less than about 10 wt %, less than about 5 wt %, and in certain embodiments, less than about 1 wt % in its fully hydrated state.

A material may be intrinsically non-hydrous or may be rendered functionally non-hydrous by situating or encapsulating a material between non-hydrous materials and/or by a coating with a non-hydrous and/or hydrophobic material. For example, a hydrophobic coating such as an Oc Dy coating may be used to prevent hydration of a hydrous material.

The material forming the inner optic portion and the peripheral portion may be characterized by the same or by a different water content.

In embodiments in which the inner optic portion comprises more than one axial portion, the first or optical portion may comprise a non-hydrous material and the anterior portion and/or posterior portions may comprise a hydrous material, such as a hydrogel.

The inner optic portion comprises an inner material characterized by an inner modulus, and the peripheral portion comprises a peripheral material characterized by a peripheral modulus, wherein the inner modulus is greater than the outer modulus.

In certain embodiments, the inner optic portion comprises a material characterized by an inner modulus from about 100 MPa to about 3000 MPa. In certain embodiments, the inner modulus is from about 200 MPa to about 3000 MPa, from about 200 MPa to about 2000 MPa, from about 200 MPa to about 1500 MPa, from about 200 MPa to about 1000 MPa, and in certain embodiments, from about 200 MPa to about 700 MPa.

In certain embodiments, the peripheral portion comprises a material characterized by a peripheral modulus from about 0.1 MPa to about 10 MPa, from about 0.1 MPa to about 5 MPa, from about 0.5 MPa to about 5 MPa, and in certain embodiments, from about 1 MPa to about 5 MPa.

The materials forming the inner optic portion and the peripheral portion may be polymers, copolymers, homopolymers, graft polymers, or graft copolymers. The materials may comprise a combination of more than one different types of materials. In certain embodiments, the materials may be hydrogels. A hydrogel refers to a cross-linked polymeric material, which is not water-soluble and contains at least 10 wt % water within the polymer matrix when fully hydrated. In certain embodiments, a material forming the inner optic portion and/or the peripheral portion is not a hydrogel and contains less than 10 wt % water.

Examples of suitable materials for forming the inner optic portion include, for example, silicones, fluorosilicones, polyurethanes, polyether block amides, polycarbonates, polymethyl methacrylates, polystyrenes, and acrylonitrile butadiene styrene, polymers of methacrylate and acrylate esters of various alcohols, including aliphatic, aromatic, siloxane-containing, fluorocarbon-containing alcohols, and combinations of any of the foregoing. Such materials for the inner optic portion are characterized by a modulus from about 100 MPa to about 3000 MPa.

Examples of suitable materials for forming the peripheral portion include, for example, silicone, silicone hydrogels, and hydrogels of optically clear materials such as those listed for the inner portion modified with a suitable hydrophilic material such as polyhydroxyethylmethacrylate hydrogels, polyvinylpyrrolidone hydrogels, polyvinylalcohol hydrogels, silicone hydrogels.

Ophthalmic lenses provided by the present disclosure may be manufactured using any suitable contact lens manufacturing technology including, for example, cast molding, injection molding, insert molding, transfer molding, thermoforming, vacuum forming, or a combination of any of the foregoing.

In certain embodiments, the inner optic portion comprising a higher modulus material may be thermoplastic and can be fabricated by injection molding. The inner optic portion may then be inserted into a mold cavity and the peripheral portion formed to retain the inner optic portion. This may be accomplished, for example, using insert molding or cast molding technologies. In certain embodiments, the material forming the peripheral portion also covers the anterior surface, the posterior surface, or both the anterior surface and the posterior surface of the inner portion. Cast molding resins may be, for example, heat cured or radiation cured such as UV cured.

EXAMPLES

Embodiments provided by the present disclosure are further illustrated by reference to the following examples, which describe the use of certain ophthalmic devices provided by the present disclosure. It will be apparent to those skilled in the art that many modifications, both to materials, and methods, may be practiced without departing from the scope of the disclosure.

Example 1

A subject requiring an optical correction of −2.63 Diopters (OD) and −2.13 Diopters (OS) characteristic for a subject having myopia wore ophthalmic lenses on both eyes for (very roughly) about 40 hours. The inner and peripheral radii of curvature for the ophthalmic devices are provided in Table 1. After about 40 hours, the ophthalmic lenses were removed and the amount of optical correction (Diopters) need to correct vision was determined at various times. The amount of optical correction (Diopters) needed after the ophthalmic lens was removed from the subjects is presented in Table 2.

TABLE 2

Amount of optical correction (Diopters) needed after wearing an ophthalmic lens.

|  | Amount of correction needed (prior to shield wear) | Radii of curvature for ophthalmic lens | | Time following ophthalmic lens removal | | | | | | |
|---|---|---|---|---|---|---|---|---|---|---|
|  |  | Inner Curve (degrees) | Peripheral Curve (degrees) | 5 min | 2 hr | 4 hr | 8 hr | 24 hr | 30 hr | 48 hr |
| Subject #1 OD | −2.63 | 39.5 | 43.0 | −0.63 | +0.13 | +0.13 | NM | −0.50 | −0.75 | −1.25 |
| Subject #1 OS | −2.13 | 39.5 | 41.5 | −0.63 | −0.13 | NM | NM | 0.00 | 0.00 | −2.38 |

*NM = No Measurement

Example 2

A subject requiring an optical correction of +0.13 Diopters (OD) and +0.25 Diopters (OS) characteristic for a subject having hyperopia wore ophthalmic lenses on the right eye for (very roughly) about 35 hours, and on the left eye for (very roughly) about 17. The inner and peripheral radii of curvature for the ophthalmic devices are provided in Table 2. After about the specified number of hours, the ophthalmic lenses were removed and the amount of optical correction (Diopters) need to correct vision was determined at various times. The amount of optical correction (Diopters) needed after the ophthalmic lens was removed from the subjects is presented in Table 3.

TABLE 3

Amount of optical correction (Diopters) needed after wearing an ophthalmic lens.

|  | Amount of correction needed (prior to shield wear) | Radii of curvature for ophthalmic lens | | Time following ophthalmic lens removal | | | | | | |
|---|---|---|---|---|---|---|---|---|---|---|
|  |  | Inner Curve (degrees) | Peripheral Curve (degrees) | 5 min | 2 hr | 4 hr | 8 hr | 24 hr | 30 hr | 48 hr |
| Subject #2 OD | +0.13 | 39.5 | 43.0 | −2.38 | −3.13 | −3.37 | −2.00 | NM | NM | NM |
| Subject #2 OS | +0.25 | 39.5 | 41.5 | −1.00 | −1.25 | NM | NM | 0.00 | NM | NM |

*NM = No Measurement

Example 3

A subject requiring an optical correction of −6.00DS-2.25DCX170 for the right eye (OD) and −6.50DS-2.50DCX005 for the left eye (OS). The K value for the right eye was 45.9/44.2 corresponding to a ΔK consistent with a 1.70DC corneal cylinder, and the K value for the legt eye was 46.6/44.3 orresponding to a ΔK consistent with a 2.30DC corneal cylinder. With an appropriately fitted conventional lens, the visual acuity in both eyes was 20/20.

Following wearing an ophthalmic lens having an inner optic portion with spherical surfaces and characterized by a rigidity of about 1.1E10 MPa-μm$^3$ and a the peripheral portion comprises a material having a modulus from about 0.01 MPa to about 10 MPa, the visual acuity when viewing with the right eye was 20/15-2 and with the left eye was 20/15.

While the exemplary embodiments have been described in some detail, by way of example and for clarity of understanding, those of skill in the art will recognize that a variety of modifications, adaptations, and changes may be employed. Hence, the scope of the present invention should be limited solely by the appended claims.

TABLE B1

| 14 mm multicurve designs | R1 center BC (D) | R1B1 5-7 mm K (D) | R1B2 7-9 mm K (D) | R1B3 9-11 mm K (D) | R1 C2 13.5-14 mm K (D) | SAG mm | DIA |
|---|---|---|---|---|---|---|---|
| Steep K | 36.5 | 43.50 | 42.25 | 39.50 | <12 mm BC (140 micron thick) | 3.1-3.4 | 13.8-14.1 mm |
| Medium | 36.5 | 42.00 | 40.75 | 38.25 | <12 mm BC (140 micron thick) | 3.1-3.4 | 13.8-14.1 mm |
| Flat K | 36.5 | 40.50 | 39.25 | 36.75 | <12 mm BC (140 micron thick) | 3.1-3.4 | 13.8-14.1 mm |
| Steep K | 38.5 | 44.25 | 43.00 | 40.25 | <12 mm BC (140 micron thick) | 3.1-3.4 | 13.8-14.1 mm |
| Medium | 38.5 | 42.75 | 41.50 | 39.00 | <12 mm BC (140 micron thick) | 3.1-3.4 | 13.8-14.1 mm |
| Flat K | 38.5 | 41.25 | 40.00 | 37.50 | <12 mm BC (140 micron thick) | 3.1-3.4 | 13.8-14.1 mm |
| Steep K | 40.5 | 45.00 | 43.75 | 41.00 | <12 mm BC (140 micron thick) | 3.1-3.4 | 13.8-14.1 mm |
| Medium | 40.5 | 43.50 | 42.25 | 39.75 | <12 mm BC (140 micron thick) | 3.1-3.4 | 13.8-14.1 mm |
| Flat K | 40.5 | 42.00 | 40.75 | 38.25 | <12 mm BC (140 micron thick) | 3.1-3.4 | 13.8-14.1 mm |

TABLE B2

| Flatter periphery design | | | | | | | |
|---|---|---|---|---|---|---|---|
| 14 mm multicurve designs | R1 Center BC (D) | R1B1 5-7 mm K (D) | R1B2 7-9 mm K (D) | R1B3 9-11 mm K (D) | R1 C2 13.5-14 mm K (D) | SAG (mm) | DIA |
| Steep K | 36.5 | 43.50 | 42.25 | 38.50 | <12 mm BC (140 micron thick) | 3.1-3.4 | 13.8-14.1 mm |
| Medium | 36.5 | 42.00 | 40.75 | 37.25 | <12 mm BC (140 micron thick) | 3.1-3.4 | 13.8-14.1 mm |
| Flat K | 36.5 | 40.50 | 39.25 | 35.75 | <12 mm BC (140 micron thick) | 3.1-3.4 | 13.8-14.1 mm |
| Steep K | 38.5 | 44.25 | 43.00 | 39.25 | <12 mm BC (140 micron thick) | 3.1-3.4 | 13.8-14.1 mm |
| Medium | 38.5 | 42.75 | 41.50 | 38.00 | <12 mm BC (140 micron thick) | 3.1-3.4 | 13.8-14.1 mm |
| Flat K | 38.5 | 41.25 | 40.00 | 36.50 | <12 mm BC (140 micron thick) | 3.1-3.4 | 13.8-14.1 mm |
| Steep K | 40.5 | 45.00 | 43.75 | 40.00 | <12 mm BC (140 micron thick) | 3.1-3.4 | 13.8-14.1 mm |
| Medium | 40.5 | 43.50 | 42.25 | 38.75 | <12 mm BC (140 micron thick) | 3.1-3.4 | 13.8-14.1 mm |
| Flat K | 40.5 | 42.00 | 40.75 | 37.25 | <12 mm BC (140 micron thick) | 3.1-3.4 | 13.8-14.1 mm |

TABLE B3

| Large shield (16 mm) multicurve designs | R1 center BC | R1B1 5-7 mm K (D) | R1B2 7-9 mm K (D) | R1B3 9-10.5 mm K (D) | 10.5-13 mm K (D) | 13-16 mm* | SAG (mm) | DIA |
|---|---|---|---|---|---|---|---|---|
| Steep K | 36.5 | 43.50 | 42.25 | 39.50 | <10.0 mm/33.75 D | <14.5 mm/23 D | ≤3.6 | 15.6-16.1 mm |
| Medium | 36.5 | 42.00 | 40.75 | 38.25 | <10.0 mm/33.75 D | <14.5 mm/23 D | ≤3.6 | 15.6-16.1 mm |
| Flat K | 36.5 | 40.50 | 39.25 | 36.75 | <10.0 mm/33.75 D | <14.5 mm/23 D | ≤3.6 | 15.6-16.1 mm |
| Steep K | 38.5 | 44.25 | 43.00 | 40.25 | <10.0 mm/33.75 D | <14.5 mm/23 D | ≤3.6 | 15.6-16.1 mm |
| Medium | 38.5 | 42.75 | 41.50 | 39.00 | <10.0 mm/33.75 D | <14.5 mm/23 D | ≤3.6 | 15.6-16.1 mm |
| Flat K | 38.5 | 41.25 | 40.00 | 37.50 | <10.0 mm/33.75 D | <14.5 mm/23 D | ≤3.6 | 15.6-16.1 mm |
| Steep K | 40.5 | 45.00 | 43.75 | 41.00 | <10.0 mm/33.75 D | <14.5 mm/23 D | ≤3.6 | 15.6-16.1 mm |
| Medium | 40.5 | 43.50 | 42.25 | 39.75 | <10.0 mm/33.75 D | <14.5 mm/23 D | ≤3.6 | 15.6-16.1 mm |
| Flat K | 40.5 | 42.00 | 40.75 | 38.25 | <10.0 mm/33.75 D | <14.5 mm/23 D | ≤3.6 | 15.6-16.1 mm |

*may not tangent with previous curve (may insert an outer curve to help it flare)

TABLE B4

| Multicurve CL designs | | R1 center BC (D) | R1B1 5-7 mm K (D) | R1B2 7-9 mm K (D) | R1B3 9-11 mm K (D) | R1C 13.5-14 mm K (D) | SAG (mm) | DIA |
|---|---|---|---|---|---|---|---|---|
| CL central curve 1 | Steep K | 40 | 41.75 | 39.00 | 39.00 | <12 mm BC (140 micron thick) | 3.1-3.4 | 13.8-14.1 mm |
| | Medium | 40.00 | 39.75 | 37.25 | 37.25 | <12 mm BC (140 micron thick) | 3.1-3.4 | 13.8-14.1 mm |
| | Flat K | 40.00 | 37.75 | 35.25 | 35.25 | <12 mm BC (140 micron thick) | 3.1-3.4 | 13.8-14.1 mm |
| CL central curve 2 | Steep K | 42.00 | 43.75 | 41.00 | 41.00 | <12 mm BC (140 micron thick) | 3.1-3.4 | 13.8-14.1 mm |
| | Medium | 42.00 | 41.75 | 39.25 | 39.25 | <12 mm BC (140 micron thick) | 3.1-3.4 | 13.8-14.1 mm |
| | Flat K | 42.00 | 39.75 | 37.25 | 37.25 | <12 mm BC (140 micron thick) | 3.1-3.4 | 13.8-14.1 mm |
| CL central curve 3 | Steep K | 44.000 | 44.75 | 42.00 | 42.00 | <12 mm BC (140 micron thick) | 3.1-3.4 | 13.8-14.1 mm |
| | Medium | 44.00 | 43.25 | 40.75 | 40.75 | <12 mm BC (140 micron thick) | 3.1-3.4 | 13.8-14.1 mm |
| | Flat K | 44.00 | 41.75 | 39.25 | 39.25 | <12 mm BC (140 micron thick) | 3.1-3.4 | 13.8-14.1 mm |
| CL central curve 4 | Steep K | 46.00 | 46.75 | 44.00 | 44.00 | <12 mm BC (140 micron thick) | 3.1-3.4 | 13.8-14.1 mm |
| | Medium | 46.00 | 45.25 | 42.75 | 42.75 | <12 mm BC (140 micron thick) | 3.1-3.4 | 13.8-14.1 mm |
| | Flat K | 46.00 | 43.75 | 41.25 | 41.25 | <12 mm BC (140 micron thick) | 3.1-3.4 | 13.8-14.1 mm |

What is claimed is:

1. An ophthalmic lens for correcting a refractive error of an eye, the eye comprising a cornea with a refractive shape extending across an optical region of the cornea, the ophthalmic lens comprising:
   an inner optic portion configured to be disposed over the optical region of the cornea, wherein the inner optic portion comprises an anterior surface, a first portion, and a posterior portion disposed posteriorly to the first portion;
   a posterior surface extending along the inner optic portion adjacent the eye and configured so that engagement of the posterior surface against the cornea deforms the posterior surface and so that the posterior surface has a shape diverging from the refractive shape of the cornea and providing one or more lenticular volumes between the posterior surface and the cornea;
   a peripheral portion of the ophthalmic lens disposed radially outward of the inner optic portion; and
   a plurality of fenestrations disposed within the inner optic portion, the peripheral portion, or both the inner optic portion and the peripheral portion; wherein at least some of the plurality of fenestrations are configured to maintain tear fluid within the one or more lenticular volumes between the posterior surface of the inner optic portion and the cornea;

wherein the first portion comprises a material characterized by a first modulus from about 20 MPa to about 1500 MPa.

2. The ophthalmic lens of claim 1, wherein the anterior surface is characterized by a spherical profile.

3. The ophthalmic lens of claim 1, wherein the first portion is characterized by a maximum thickness from about 50 μm to about 900 μm.

4. The ophthalmic lens of claim 1, wherein,
the posterior portion comprises a posterior material characterized by a posterior modulus; and
the posterior modulus is less than the first modulus.

5. The ophthalmic lens of claim 4, wherein the posterior modulus is from about 0.1 MPa to about 10 MPa.

6. The ophthalmic lens of claim 4, wherein the posterior portion is characterized by a thickness from about 5 μm to about 100 μm.

7. The ophthalmic lens of claim 4, wherein the posterior material comprises a hydrogel.

8. The ophthalmic lens of claim 1, wherein the first portion comprises a hydrogel.

9. The ophthalmic lens of claim 1, wherein the first portion and the posterior portion comprise silicon.

10. The ophthalmic lens of claim 1, wherein the inner optic portion is characterized by a shape configured to provide spherical power from +10.00 D to −10.00 D.

11. The ophthalmic lens of claim 1, wherein the inner optic portion is characterized by a rigidity from 4E8 MPa-μm$^3$ to 1E10 MPa-μm$^3$.

12. The ophthalmic lens of claim 1, wherein the posterior surface is characterized by a bicurve profile.

13. The ophthalmic lens of claim 12, wherein the bicurve profile comprises a toric component.

14. The ophthalmic lens of claim 1, wherein,
the cornea is characterized by an optical axis; and
the ophthalmic lens is configured to correct refractive error independent of radial orientation with respect to the optical axis.

15. The ophthalmic lens of claim 1, wherein:
the refractive error of the eye comprises a cylindrical error; and
the inner optic portion is characterized by a substantially spherical surface so that correction of the cylindrical error by the lens is primarily effected by the divergence of the shape of the inner optic portion from the refractive shape of the cornea.

16. The ophthalmic lens of claim 1, wherein at least some of the plurality of fenestrations are disposed proximate an interface between the inner optic portion and the peripheral portion.

17. The ophthalmic lens of claim 1, wherein at least some of the plurality of fenestrations are configured to maintain tear fluid within the one or more lenticular volumes between the posterior surface of the inner optic portion and the cornea.

18. The ophthalmic lens of claim 1, wherein at least some of the plurality of fenestrations are configured to pump tear fluid between the posterior surface of the lens and the one or more lenticular volumes between the posterior surface and the cornea when the eye blinks.

19. The ophthalmic lens of claim 1, wherein,
the refractive error of the eye comprises astigmatism; and
the anterior surface of the inner optic portion and the posterior surface of the inner optic portion are radially symmetric.

20. A method for correcting a refractive error of an eye, the eye having a cornea with a refractive shape extending across an optical region of the cornea, the method comprising positioning the ophthalmic lens of claim 1 on an eye comprising a refractive error, to correct the refractive error.

21. The method of claim 20, wherein correction of the refractive error is substantially independent of the shape of the peripheral portion throughout a range of astigmatic errors of at least about 1.5 D, and is independent of a rotational orientation of the ophthalmic lens about a viewing axis of the eye.

* * * * *